US010717029B2

(12) United States Patent
McLeod et al.

(10) Patent No.: US 10,717,029 B2
(45) Date of Patent: *Jul. 21, 2020

(54) METHOD OF MAKING AN ACETATE TOW BAND WITH SHAPE AND SIZE USED FOR CODING

(71) Applicant: Eastman Chemical Company, Kingsport, TN (US)

(72) Inventors: Andrew Ervin McLeod, Jonesborough, TN (US); Scott Gregory Gaynor, Bristol, TN (US); Steven Anthony Wilson, Kingsport, TN (US); Lydia J. Salyer, Kingsport, TN (US); Humberto Collazo, Kingsport, TN (US); Larry Wayne Renfro, Kingsport, TN (US); Jeremy Kenneth Steach, Kingsport, TN (US); Brian Douglas Seiler, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 167 days.

This patent is subject to a terminal disclaimer.

(21) Appl. No.: 15/824,200

(22) Filed: Nov. 28, 2017

(65) Prior Publication Data
US 2018/0078887 A1 Mar. 22, 2018

Related U.S. Application Data

(63) Continuation of application No. 14/748,738, filed on Jun. 24, 2015, now abandoned.
(Continued)

(51) Int. Cl.
B42D 25/355 (2014.01)
B42D 25/40 (2014.01)
(Continued)

(52) U.S. Cl.
CPC .......... B01D 39/1623 (2013.01); A24D 3/00 (2013.01); A24D 3/04 (2013.01); C08L 1/12 (2013.01);
(Continued)

(58) Field of Classification Search
CPC ........ B42D 25/355; B42D 25/40; D01D 5/04; D01D 5/06; D01D 5/253; D01F 1/02;
(Continued)

(56) References Cited

U.S. PATENT DOCUMENTS 951,147 A 3/1910 Porter
1,721,564 A 7/1929 Lawson
(Continued)

FOREIGN PATENT DOCUMENTS

CN 202298350 U 7/2012
WO WO 97/13896 A1 4/1997
(Continued)

OTHER PUBLICATIONS

Konwarh, Rocktotpal et al.; "Electrospun cellulose acetate nanofibers: The present status and gamut of biotechnological applications"; Biotechnology Advances, vol. 31; pp. 421-437; 2013.
(Continued)

Primary Examiner — Leo B Tentoni
(74) Attorney, Agent, or Firm — Dennis V. Carmen

(57) ABSTRACT

Disclosed are fibers comprising identification fibers which can be used for tracking and tracing fibers, yarns, fiber bands, and/or articles comprising the fibers through at least part of the supply chain. Each identification fiber exhibits at least one distinct feature. Each group of distinguishable identification fibers can exhibit a taggant cross-section shape, a taggant cross-section size, or combination of the same taggant cross-section shape and same taggant cross-section size. The distinct features and the number of fibers
(Continued)

in each group of distinguishable identification fibers can represent at least one supply chain component of the fibers. The distinct features can be detectable in an article comprising the fibers.

18 Claims, 14 Drawing Sheets

Related U.S. Application Data

(60) Provisional application No. 62/018,182, filed on Jun. 27, 2014, provisional application No. 62/105,011, filed on Jan. 19, 2015, provisional application No. 62/160,930, filed on May 13, 2015.

(51) Int. Cl.
| | |
|---|---|
| D01D 5/04 | (2006.01) |
| D01D 5/06 | (2006.01) |
| D01F 1/02 | (2006.01) |
| D01F 1/04 | (2006.01) |
| D01F 1/06 | (2006.01) |
| D01F 1/10 | (2006.01) |
| D01F 2/02 | (2006.01) |
| D01F 2/24 | (2006.01) |
| D01F 2/30 | (2006.01) |
| D21H 15/06 | (2006.01) |
| B01D 39/16 | (2006.01) |
| D21H 21/42 | (2006.01) |
| A24D 3/00 | (2020.01) |
| D01D 5/253 | (2006.01) |
| D01F 2/28 | (2006.01) |
| G07D 7/12 | (2016.01) |
| A24D 3/04 | (2006.01) |
| G07D 7/2033 | (2016.01) |
| C08L 1/12 | (2006.01) |
| D02G 1/12 | (2006.01) |
| D02G 1/20 | (2006.01) |
| D02J 1/02 | (2006.01) |
| D02G 3/02 | (2006.01) |
| D02G 3/22 | (2006.01) |
| D02G 3/44 | (2006.01) |
| G06K 9/46 | (2006.01) |
| G06K 9/52 | (2006.01) |
| G06K 9/62 | (2006.01) |
| G06T 7/00 | (2017.01) |

(52) U.S. Cl.
CPC .............. *D01D 5/253* (2013.01); *D01F 2/28* (2013.01); *D02G 1/12* (2013.01); *D02G 1/20* (2013.01); *D02G 3/02* (2013.01); *D02G 3/22* (2013.01); *D02G 3/44* (2013.01); *D02J 1/02* (2013.01); *D21H 21/42* (2013.01); *G06K 9/46* (2013.01); *G06K 9/52* (2013.01); *G06K 9/6267* (2013.01); *G06T 7/0004* (2013.01); *G07D 7/12* (2013.01); *G07D 7/2033* (2013.01); *B01D 2239/064* (2013.01); *B01D 2239/0636* (2013.01); *C08L 2205/025* (2013.01); *G06K 2009/4666* (2013.01)

(58) Field of Classification Search
CPC ..... D01F 1/04; D01F 1/06; D01F 1/10; D01F 2/02; D01F 2/24; D01F 2/28; D01F 2/30; D21H 15/06; D21H 21/42
USPC .... 264/103, 171.1, 177.13, 178 F, 187, 207; 40/625, 628, 629; 131/106; 252/965
See application file for complete search history.

(56) References Cited

U.S. PATENT DOCUMENTS

| | | |
|---|---|---|
| 1,787,995 A | 1/1931 | Reilly |
| 1,822,098 A | 9/1931 | Huntress |
| 2,208,653 A | 7/1940 | Whitehead |
| 2,825,120 A | 3/1958 | Smith |
| 2,838,364 A | 6/1958 | Smith |
| 2,966,857 A | 1/1961 | Swerdloff et al. |
| 4,280,925 A | 7/1981 | Kiefer |
| 4,496,619 A | 1/1985 | Okamoto |
| 4,640,035 A | 2/1987 | Kind et al. |
| 4,756,557 A | 7/1988 | Kaule et al. |
| 5,540,994 A | 7/1996 | Hernandez |
| 5,750,446 A | 5/1998 | Nguyen et al. |
| 5,876,650 A | 3/1999 | Burlone et al. |
| 6,036,885 A | 3/2000 | Krutak, Sr. et al. |
| 6,887,701 B2 | 5/2005 | Anderson et al. |
| 7,122,248 B2 | 10/2006 | Tam et al. |
| 7,128,848 B2 | 10/2006 | Pourdeyhimi et al. |
| 7,163,744 B2 | 1/2007 | Nightingale et al. |
| 7,357,986 B2 | 4/2008 | Tam et al. |
| 7,684,652 B2 | 3/2010 | Zorab et al. |
| RE42,188 E | 3/2011 | Tam et al. |
| 8,177,938 B2 | 5/2012 | Sumnicht |
| 8,862,264 B2 | 10/2014 | Phan et al. |
| 9,320,994 B2 | 4/2016 | McLeod et al. |
| 9,358,486 B2 | 6/2016 | McLeod et al. |
| 9,442,074 B2 | 9/2016 | McLeod et al. |
| 9,633,579 B2 | 4/2017 | McLeod et al. |
| 9,851,341 B2 | 12/2017 | Gaynor et al. |
| 9,863,920 B2 | 1/2018 | Gaynor et al. |
| 9,865,182 B2 | 1/2018 | McLeod et al. |
| 9,916,482 B2 | 3/2018 | McLeod et al. |
| 9,972,224 B2 | 5/2018 | Renfro et al. |
| 2002/0160188 A1 | 10/2002 | Tam et al. |
| 2003/0006324 A1 | 1/2003 | Pettigrew et al. |
| 2003/0058990 A1 | 3/2003 | Kaiser et al. |
| 2004/0034214 A1 | 2/2004 | Nightingale et al. |
| 2005/0227068 A1 | 10/2005 | Dugan |
| 2005/0227563 A1 | 10/2005 | Bond |
| 2007/0243234 A1 | 10/2007 | Gabriele et al. |
| 2010/0149531 A1 | 6/2010 | Tang |
| 2012/0000480 A1 | 1/2012 | Sebastian et al. |
| 2012/0231690 A1 | 9/2012 | Pourdeyhimi et al. |
| 2013/0255704 A1 | 10/2013 | Sampson et al. |
| 2013/0313484 A1 | 11/2013 | Sun |
| 2015/0375149 A1 | 12/2015 | McLeod et al. |
| 2015/0376818 A1 | 12/2015 | McLeod et al. |
| 2015/0376819 A1 | 12/2015 | McLeod et al. |
| 2015/0377792 A1 | 12/2015 | Renfro et al. |
| 2015/0377841 A1 | 12/2015 | Gaynor et al. |

FOREIGN PATENT DOCUMENTS

| | | |
|---|---|---|
| WO | WO 99/63145 A1 | 12/1999 |
| WO | WO 00/15692 A1 | 3/2000 |
| WO | WO 01/37207 A1 | 5/2001 |
| WO | WO 02/068736 A1 | 9/2002 |
| WO | WO 2006/020109 A2 | 2/2006 |
| WO | WO 2012/054675 A2 | 4/2012 |
| WO | WO 2016/179220 A1 | 11/2016 |

OTHER PUBLICATIONS

Lomas, B. and Simmens, S. C.; "The preparation of cross-sections of textile materials by grinding"; Journal of Microscopy, vol. 92, Part 1; pp. 37-45; Aug. 1970.

McBride, Murdoch; "Tobacco's Illicit Trade—How Legislation, Enforcement and Public Awareness Are Key to Tackling Illicit Trade, Part I—Overview"; Tobacco International; pp. 17-27; Dec. 2013.

Notification of Transmittal of the International Search Report and the Written Opinion of the International Searching Authority, or the Declaration dated Sep. 30, 2015 received in International Application No. PCT/US2015/037583.

(56) References Cited

OTHER PUBLICATIONS

Notification of Transmittal of the International Search Report and the Written Opinion of the International Searching Authority, or the Declaration dated Jan. 18, 2016 received in International Application No. PCT/US2015/037595.
Notification of Transmittal of the International Search Report and the Written Opinion of the International Searching Authority, or the Declaration dated Nov. 30, 2018 received in International Application No. PCT/US2018/049692.

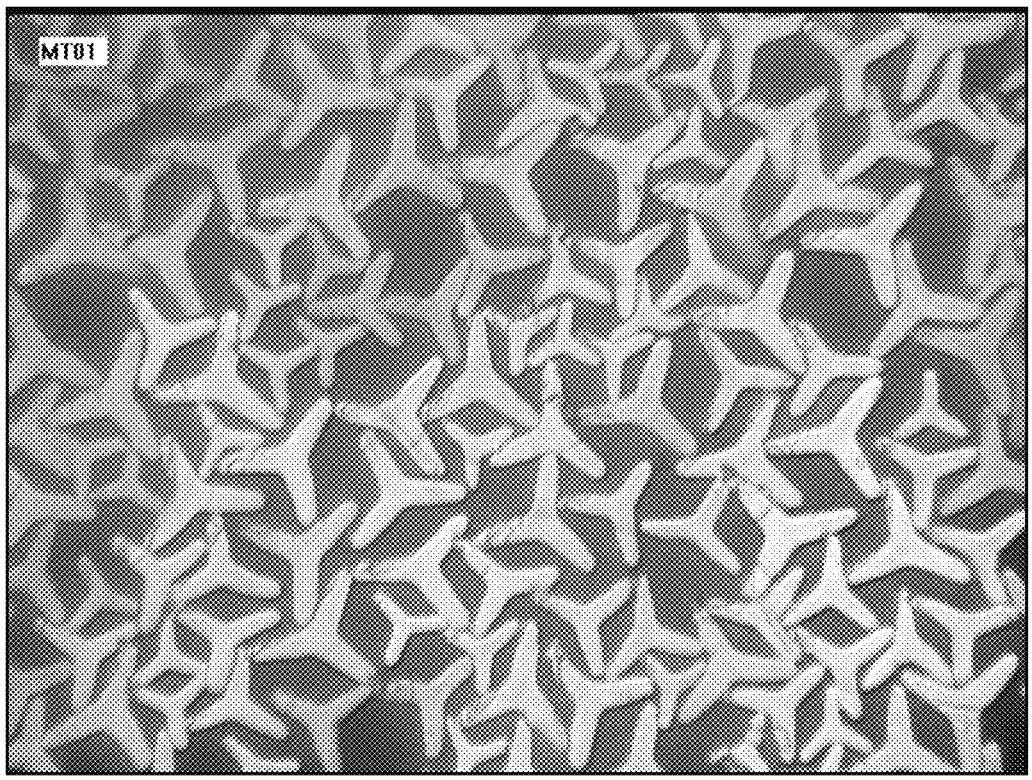
Figure 1 Photomicrograph of fibers with different sizes

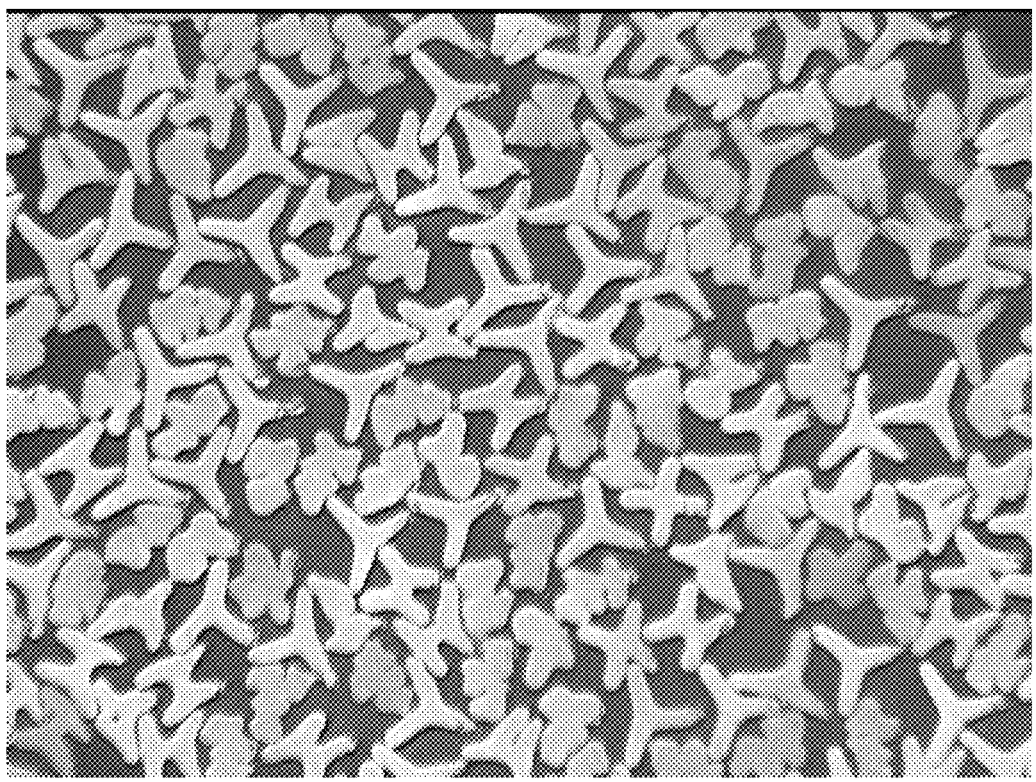
Figure 2 – Photomicrograph of fibers produced using triangle, circle, and square shaped spinneret holes

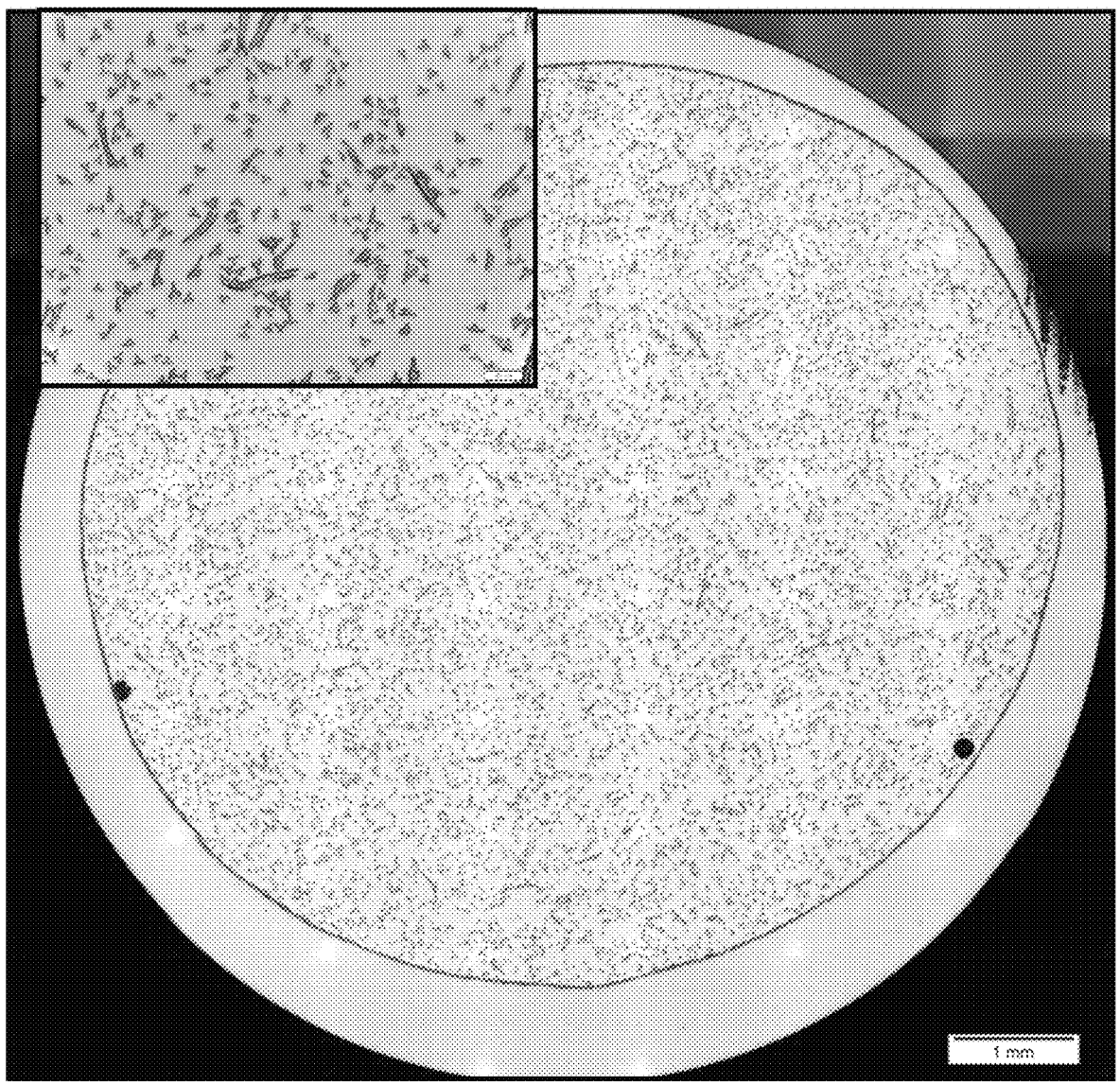
Figure 3. Stitched image of full filter rod cross-section of Example 3 with an expanded region

| Example | Description | Hole shape | Fiber image |
|---|---|---|---|
| 11 | Flattened Round | 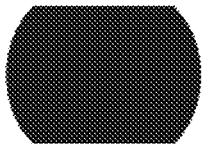 |  |
| 12 | Hexagon | 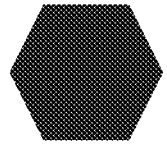 |  |
| 13 | Pentagon | 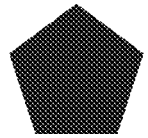 |  |
| 14 | "D" |  | 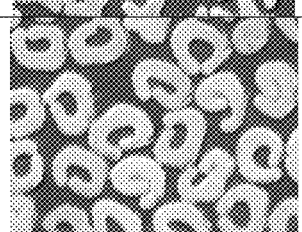 |
Figure 4. Description of taggant filaments for Examples 12-15

METHOD OF MAKING AN ACETATE TOW BAND WITH SHAPE AND SIZE USED FOR CODING

CROSS REFERENCES TO RELATED APPLICATIONS

This application is a continuation application of U.S. Non-Provisional application Ser. No. 14/748,738, abandoned, which claims priority under 35 U.S.C. 119(e) to U.S. Provisional Application Ser. No. 62/018,182, filed Jun. 27, 2014, U.S. Provisional Application Ser. No. 62/105,011, filed Jan. 19, 2015, and U.S. Provisional Application Ser. No. 62/160,930, filed May 13, 2015, each of which is incorporated herein by reference in its entirety.

TECHNICAL FIELD

The present disclosure relates to fibers comprising identification fibers with certain shapes, sizes, and numbers of distinguishable identification fibers. The characteristics of the identification fibers can be representative of specific supply chain information. The characteristics of the identification fibers can allow fibers to be tracked from manufacturing through intermediaries, conversion to final product, and/or the consumer. The present disclosure also relates to the method of making the fibers and the method of characterizing the fibers.

BACKGROUND

Many industries have a need to mark, tag, or identify products that allows for the tracking and tracing of products through the supply chain. One of the primary purposes for such track and trace systems is the combating of illicit trade such as counterfeiting and black market sales.

Anti-counterfeiting measures (ACMs) can be regarded as three different types: Type I (Overt), Type II (Covert) and Type III (Forensic). Type I ACMs are features incorporated into an article that are readily identified and observable to the naked eye. Examples include watermarks, color shifting inks, colored fibers, bands, or strips incorporated into the article, and holograms. Type II ACMs are features that are incorporated into the article that require some form of instrument to identify the feature in the field. The instruments required are generally those that are readily available and transportable. Some examples include the incorporation of very small text (requiring the use of a magnifying glass), UV responsive inks or threads (requiring illumination with a UV light), and barcodes or RFID tags (requiring a specialized reader). Type III ACMs are hidden attributes that require specialized laboratory equipment to identify. Some Type III examples include nano-text, micro-taggants, DNA inks, and chemical additives.

As stated above, there are many widely-used packaging and labelling taggants and anti-counterfeiting measures (ACMs) in many industries, but these more overt solutions are often susceptible to countermeasures such as destruction, modification, duplication, repackaging, or relabeling. Altering the physical features of the raw materials of a product can provide a more covert solution that is much more difficult to evade. These taggants may be used to track the fibers through the supply chain. The taggants may change the physical properties of the fibers, yarn, fiber bands, and/or derivative articles in a manner that is difficult to copy or alter but is detectable using image analysis and/or other mechanical methods.

There is a need to manufacture, test, and track fibers in yarn and/or fiber bands and their derivative articles across a wide spectrum of industries. The ability to identify the source of a yarn, fiber band, and/or an article comprising the yarn or fiber band can be achieved by embedding some form of a code in the fiber(s) during the manufacturing process that can then be later identified, retrieved, and used to identify the yarn, fiber band and/or the article. Identification tags can be incorporated into the yarn or fiber band that can denote, for example, manufacturer, manufacture site, customer, and ship-to location among other supply chain information that might be useful for the track and trace of the yarn, fiber band, and/or article.

The disclosed exemplary embodiments can be used, for example, to combat the continuing and growing illicit-trade problem of tobacco products, particularly cigarettes. It has been estimated that 10-12% of all cigarette sales are illicit, either counterfeit copies or sales that avoid paying excise taxes on the cigarettes (Tobacco International, "Tackling Illicit Trade, Pt. I," December 2013). To combat this illicit trade requires a global effort consisting of manufacturers, distributors, regulators, and customs/law enforcement, as well as retailers who sell the cigarettes to consumers. There is a need to be able to track and ultimately trace components used in the construction of a cigarette. For example, the ability to track part of the supply chain path of acetate tow contained in the filter of a black market cigarette may give helpful information on the source of these illicit cigarettes.

There is a need for a traceable acetate tow that is readily manufactured, does not impact the performance of a cigarette filter, and is detectable, not only in an acetate tow band, but also in a single or a set of cigarettes/cigarette filters. There is a need for a traceable acetate tow that is readily accepted by cigarette manufacturers and consumers, such as an acetate tow that does not require adding chemicals which may impact taste and/or require regulatory approval. There is a need for traceable acetate tow that does not impact the pressure drop and yield of a cigarette filter. There is a need for traceable acetate tow that maintains its traceability when bloomed, plasticized, and formed into a filter.

BRIEF SUMMARY

In a first embodiment, fibers comprise identification fibers. Each of the identification fibers exhibits at least one distinct feature. The identification fibers consist of one or more groups of distinguishable identification fibers, each group of distinguishable identification fibers being formed by the identification fibers having the same distinct feature or the same combination of distinct features. A number of the identification fibers in each group of the distinguishable identification fibers is defined as a fiber count. At least one of the fiber counts corresponds to a taggant fiber count. The distinct features in each group of the distinguishable identification fibers and the one or more taggants fiber counts are representative of at least one supply chain component of the fibers.

In a second embodiment, an acetate tow band comprises fibers. The fibers comprise standard fibers and identification fibers and the standard fibers comprise cellulose acetate. Each of the identification fibers exhibits at least one distinct feature. The identification fibers consist of one or more groups of distinguishable identification fibers, each group of distinguishable identification fibers being formed by the identification fibers having the same distinct feature or the same combination of distinct features. The number of identification fibers in each group of distinguishable identification fibers is defined as a fiber count. At least one of the fiber counts corresponds to a taggant fiber count. The distinct features in each group of distinguishable identification fibers and the one or more taggant fiber counts are representative of at least one supply chain component associated with the acetate tow band.

In a third embodiment, a filter comprises an acetate tow band comprising fibers. The fibers comprise standard fibers comprising cellulose acetate and identification fibers. Each of the identification fibers exhibits at least one distinct feature. The identification fibers consist of one or more groups of distinguishable identification fibers, each group of the distinguishable identification fibers being formed by the identification fibers having the same distinct feature or the same combination of distinct features. The number of the identification fibers in each group of the distinguishable identification fibers is defined as a fiber count. At least one of the fiber counts corresponds to a taggant fiber count. The distinct features in each group of distinguishable identification fibers and the one or more taggant fiber counts are representative of at least one supply chain component associated with the acetate tow band.

In a fourth embodiment, a method of making an acetate tow band comprises fibers. The fibers comprise identification fibers and standard fibers comprising cellulose acetate. The method comprises: (a) producing the identification fibers on a first fiber production process; (b) producing the standard fibers on a second fiber production process; and (c) combining the identification fibers and the standard fibers into an acetate tow band. Each of the identification fibers exhibits at least one distinct feature. The identification fibers consist of one or more groups of distinguishable identification fibers, each group of distinguishable identification fibers being formed by the identification fibers having the same distinct feature or the same combination of distinct features. The number of the identification fibers in each group of the distinguishable identification fibers is defined as a fiber count. At least one of the fiber counts corresponds to a taggant fiber count. The distinct features in each group of the distinguishable identification fibers and the one or more taggant fiber counts are representative of at least one supply chain component of the acetate tow band.

In a fifth embodiment, a method of characterizing a fiber sample comprises (1) applying imaging technology to the fiber sample comprising fibers. The fibers comprise identification fibers and standard fibers and each of the identification fibers exhibits at least one distinct feature. The identification fibers consist of one or more groups of distinguishable identification fibers, each group of distinguishable identification being formed by the identification fibers having the same distinct feature or the same combination of distinct features. The method further comprises (2) detecting the groups of the distinguishable identification fibers, and (3) counting a number of each of the distinguishable identification fibers. The number of identification fibers in each group of the distinguishable identification fibers is defined as a fiber count. At least one of the fiber counts corresponds to a taggant fiber count. The distinct features in each group of the distinguishable identification fibers and the one or more taggant fiber counts are representative of at least one supply chain component of the fiber sample.

BRIEF DESCRIPTION OF THE DRAWINGS

FIG. 1 illustrate fiber bands containing cellulose acetate fibers with three cross-section sizes.

FIG. 2 illustrates a fiber band containing cellulose acetate fibers with three cross-section shapes.

FIG. 3 illustrates a stitched-together photomicrograph of a filter rod of Example 3.

FIG. 4 illustrates the spinneret hole shapes and fiber images for Examples 12-15.

DETAILED DESCRIPTION

Figure 5A:
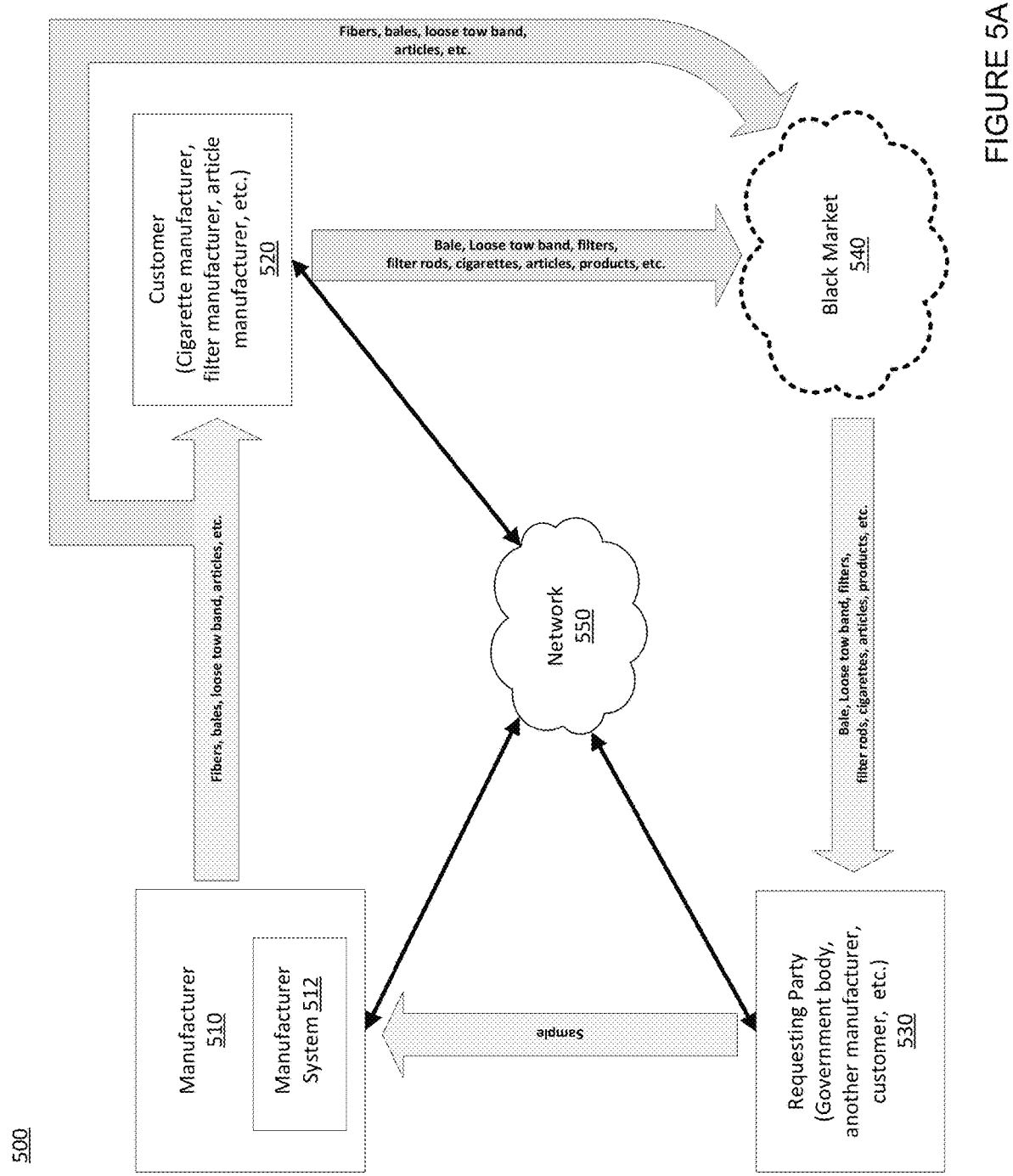
FIGS. 5(a) and 5(b) illustrate a non-limiting example of communication and shipping channels consistent with disclosed embodiments.

In an embodiment, fibers comprise identification fibers. Each of the identification fibers exhibits at least one distinct feature. The identification fibers consist of one or more groups of distinguishable identification fibers, each group of distinguishable identification fibers being formed by the identification fibers having the same distinct feature or the same combination of distinct features. A number of the identification fibers in each group of the distinguishable identification fibers is defined as a fiber count. At least one of the fiber counts corresponds to a taggant fiber count. The distinct features in each group of the distinguishable identification fibers and the one or more taggant fiber counts are representative of at least one supply chain component of the fibers.

Unless otherwise indicated, all numbers expressing quantities of ingredients, properties such as molecular weight, reaction conditions, and so forth used in the specification and claims are to be understood as being modified in all instances by the term "about."

It is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

As used herein the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The term "fibers", as used herein, refers to thin flexible threadlike objects. Fibers can be natural fibers or man-made. The term "polymer", as used herein refers to the base material from which the fibers are made. Non-limiting examples of polymers include acrylic, modacrylic, aramid, nylon, polyester, polypropylene, rayon, polyacrylonitrile, polyethylene, PTFE, and cellulose acetate. The term "filament", as used herein, refers to a single fiber. The term "fiber band", as used herein, refers to multiple fibers placed adjacent to each other along their lengths such that the fibers remain untwisted or entangled and form a substantially rectangular cross section with a high width-to-depth ratio. Fiber bands are often formed to allow for effective crimping of the fibers and can be cut into a staple or processed as a continuous band, depending on the end use. Fiber bands are typically not woven or knitted into a fabric article unless first converted into staple to form a thread. Fibers can also be in the form of yarn. The term "yarn", as used herein, refers to multiple fibers placed adjacent to each other along their lengths, often twisted or entangled together to improve fiber cohesiveness and performance, and typically forming a substantially rounded cross section. Yarn can be processed as continuous strands or cut into smaller lengths, depending on the end use.

Fibers can be identification fibers and/or standard fibers. The term "standard fibers", as used herein, refers to fibers which are manufactured for the primary purpose and use in producing articles. Standard fibers have not been purposefully manipulated to comprise distinct features used to identify and track the standard fibers, yarn, a fiber band, and/or an article comprising standard fibers. The term "identification fibers", as used herein, refers to the fibers having distinct features such that the identification fibers can be used to identify and track the standard fibers, yarn, a fiber band, and/or an article comprising the standard fibers and the identification fibers.

The term "distinct features", as used herein, refers to variances among fibers that can be identified using imaging technology. Non-limiting examples of distinct features include cross-section shapes, cross-section sizes, optical properties, and surface markings. The term "combination of distinct features", as used herein, refers to the two or more distinct features exhibited by an identification fiber. The term "distinguishable identification fibers", as used herein, refers to identification fibers having the same distinct feature or combination of distinct features. The term a "group of the distinguishable identification fibers", as used herein, refers to one or more filaments of the distinguishable identification fibers. The term "reference fiber", as used herein, refers to a particular distinguishable identification fiber that can be used, for example, to calibrate distinct features, such as cross-section size, of other distinguishable identification fibers. The identification fibers consist of all of the groups of the distinguishable identification fibers.

The term "fiber counts", as used herein, refers to the numbers of each of the distinguishable identification fibers present in the fibers, yarn, fiber band, and/or article. The term "taggant fiber counts", as used herein, refers to the collection of fiber counts for each of the distinguishable identification fibers which can be used by one or more entity (e.g., manufacturer) in a system for embedding and/or determining standard fibers, yarn, fiber band, and/or article supply chain information.

The term, "cross-section shapes", as used herein, refers to the contours of fibers when viewed on the plane cutting through the fibers at right angles to their length. The term "taggant cross-section shapes", as used herein refers to a collection of cross-section shapes used by one or more entity (e.g., manufacturer) in a system for embedding and/or determining standard fibers, yarn, and/or fiber band supply chain information. Reference cross-section shape refers to the cross-section shape of the reference fiber.

The term, "cross-section sizes", as used herein, refers to the quantitative dimension of fibers when viewed on the plane cutting through the fibers at right angles to their length. For a circular cross-section shape, the cross-section size can be the diameter of the cross-section. For a noncircular cross-section shape, the area of the cross-section can be determined and the cross-section size can be characterized as the effective diameter. The effective diameter is the corresponding diameter of a circular cross-section having the same area. For noncircular cross sections, the cross section size can also be characterized by the circumcised diameter, defined as the diameter of the smallest circle that can completely encompass the cross section. The term "taggant cross-section sizes", as used herein refers to a collection of cross-section sizes used by one or more entity (e.g., manufacturer) in a system for embedding and/or determining standard fibers, yarn, and/or fiber band supply chain information. Reference cross-section size refers to the cross-section size of the reference fiber.

The term "majority of fibers", as used herein, refers to greater than 50 percent of the fibers in the yarn or fiber band based on the total number of fibers.

The term "total identification fibers number", as used herein, refers to the sum of each of the identification fibers in the yarn or fiber band. The term "taggant total identification fibers number", as used herein, refers to the total number of identification fibers used by one or more entity (e.g., manufacturer) in a system for embedding and/or determining fibers, yarn, and/or fiber band supply chain information.

The term "cellulose acetate", as used herein, refers to an acetate ester of cellulose wherein the hydrogen in the hydroxyl groups of the cellulose glucose unit is replaced by acetyl groups through an acetylation reaction. In some embodiments, suitable cellulose acetates may have a degree of substitution less than about 3 acetyl groups per glucose unit, preferably in the range of 2.2 to about 2.8, and most preferably in the range of 2.4 to 2.7.

The terms, "cellulose acetate tow", "acetate tow", or "acetate tow band" as used herein, refers to a continuous, crimped fiber band comprising of cellulose acetate fibers.

The term, "article", as used herein, refers to a unit produced from standard fibers, yarn, and/or a fiber band, including other components and additives needed to meet the functional requirements of the intended use. Non-limiting examples include, fabrics and other textile products, non-wovens, absorbent products, filters, filter rods, cigarette filters and liquid storage reservoirs. The term "article comprising fibers, yarn, or fiber bands", as used herein, refers to the article comprising the fibers, yarn, or fiber bands with a recognition that, in some embodiments, significant physical changes can occur to the fibers, yarn, or fiber band when it is used to make an article.

The term, "filter", as used herein refers to a semi-permeable fibrous material. Non-limiting examples of filters include a filter rod, and items made from a filter rod such as a cigarette filter. The term "filter rod", as used herein, refers to a rod-like article, of any cross-sectional shape, produced from a fiber band and other components or additives, which can be subsequently used as a whole unit, or cut into lengths to form multiple units, for filtration of a vapor stream. Filter rods can be used to filter tobacco products, for example, traditional cigarette filters and/or other applications for other tobacco products including heat-not-burn products. Filter rods can also be used for new products comprising tobacco and other ingredients such as, for example, other plants or plant derivatives. Filter rods can be used to filter other plants and plant derivatives, with or without tobacco present. Additionally filter rods can be used to filter any vapor stream used to deliver an active ingredient such as in e-cigarette.

The term, "cigarette filter", as used herein, refers to a component of the cigarette or other smoking device which removes or decreases one or more elements from a smoke stream. The term cigarette filter is intended to encompass the filter on any smoking device including the non-limiting examples of a cigarette, a cigarette holder, a cigar, a cigar holder, a pipe, a water pipe, a hookah, an electronic smoking device, a roll-your-own cigarette, a roll-your-own cigar, and a paper.

The term, "supply chain information" as used herein, refers to information regarding the production of the standard fibers, yarn, and/or fiber band and information regarding the distribution of the standard fibers, yarn, and/or fiber band after its production. Supply chain information includes "supply chain components" such as, for example, manufacturer, manufacture site, manufacture line, production run, production date, package, bale, customer, customer ship-to location, warehouses, freight carrier, and/or shipment paths or routes. Supply chain components can apply to fibers, yarn, fiber bands, and/or articles.

The term, "manufacturer", as used herein, refers to the entity that produces the standard fibers, yarn, and/or fiber band.

The term "manufacture site", as used herein, refers to the geographic location or locations of the manufacturer, designated by any level of specificity including full address, continent, country, state, province, county, or city.

The term "manufacture line", as used herein, refers to specific process equipment or set of equipment used by the manufacturer to produce the standard fibers, yarn, and/or fiber band.

The term "production run", as used herein, refers to a group or set of similar or related goods that are produced by using a particular set of manufacturing procedures, processes, or conditions, and/or product specifications.

The term "customer", as used herein, refers to an entity to which the fibers, yarn, and/or fiber band is sold and shipped for further processing into an intermediate article or a finished product article; or an entity that purchases the yarn or the fiber band for resale.

The term, "ship-to location", as used herein, refers to the geographic location of the customer designated for delivery of the fibers, yarn, or fiber band by any level of specificity including full address, continent, country, state, province, county, or city.

The term, "bale" as used herein, refers to a packaged unit of fiber bands, typically of a cubical shape, compressed to a high density, and wrapped, contained, and protected by packaging material.

The term, "warehouse" as used herein, refers to the geographical location of the warehouse designated for delivery of the fibers, yarn, and/or fiber band by any level of specificity including full address, continent, country, state, province, country, or city.

The term, "correlating", as used herein refers to establishing the relationship between two or more pieces of information.

The term, "manufacturer specific taggants", as used herein, refers to the particular taggants incorporated into fibers, a yarn, and/or a fiber band by a particular manufacturer. The term, "manufacturer specific taggant set" refers to the taggant cross-section shapes and/or taggant cross-section sizes associated with a particular manufacturer.

The term, "fibers are produced", "producing fibers", and "fiber production process", as used herein, refers to the process steps of spinning fibers up through the gathering of the fibers.

The term, "identification fibers are packaged", as used herein, refers to the process steps of transferring identification fibers from the spinning machine and packaging the identification fibers, for example, onto a spool or into a bale. The identification fibers would subsequently need to be removed from the package in order to be incorporated into fibers, a yarn, or a fiber band comprising standard fibers.

The term, "spinneret hole geometry", as used herein, refers to the overall structure of the spinneret hole which can be described most completely and generally, although not exclusively, by the cross-section shape and size of the hole at any point in its line through the spinneret. The term, "distinguishable spinneret hole", as used herein, refers to the spinneret hole with a distinguishable spinneret hole geometry. Each of the distinguishable identification fibers are produced using the same distinguishable spinneret hole geometry. The term "reference spinneret holes", as used herein, refers to the spinneret holes used to produce the reference fibers.

The term "fiber sample", as used herein, refers to the item comprising fibers, in any physical form, being analyzed using imaging technology. The fiber sample can comprise a portion of a set of fibers, yarn, a fiber band, or an article which has been prepared for image analysis.

The terms, "imaging technology", and "image analysis techniques" as used herein, refer to the equipment and software used to detect and quantify differences in reflection, absorption, transmission, and emittance of electromagnetic radiation. Imaging technology encompasses both electromagnetic radiation level detection and automated shape and/or size recognition.

The term, "fibers are incorporated into a matrix", as used herein refers to the immobilizing at least some of the fibers, yarn, a fiber band, or an article, typically in a polymer that will not interfere with testing.

Fibers, yarn, or a fiber band comprise individual fibers. The material from which the fibers are made is not particularly limiting. The fibers can comprise, for example, acrylic, modacrylic, aramid, nylon, polyester, polypropylene, rayon, polyacrylonitrile, polyethylene, PTFE, or cellulose acetate. In one aspect, the fibers comprise cellulose acetates, cellulose triacetates, cellulose propionates, cellulose butyrates, cellulose acetate-propionates, cellulose acetate-butyrates, cellulose propionate-butyrates, cellulose acetate-phthalates, starch acetates, acrylonitriles, vinyl chlorides, vinyl esters, vinyl ethers, and the like, any derivative thereof, any copolymer thereof, and any combination thereof. In one aspect, the fibers comprise cellulose acetate. In one aspect, the fibers comprise natural fibers such as, for example, cotton, hemp, and/or silk.

In one aspect, the fibers, yarn, or a fiber band comprise standard fibers and one or more identification fibers. Fibers are typically produced from a polymer. In one aspect, one or more of the identification fibers comprise the same polymer as the standard fibers. In another aspect, one or more of the identification fibers comprise a different polymer than the standard fibers band.

The size of the individual fibers is not particularly limiting. The size can be given in terms of effective diameter, and in one aspect, the effective diameter of the fibers range, for example, from 0.1 µm to 1000 µm, 1 µm to 500 µm, 1 µm to 100 µm, 1 µm to 30 µm, 10 µm to 1000 µm, 10 µm to 500 µm, 10 µm to 100 µm, 10 µm to 30 µm. In one aspect, the standard fibers comprise cellulose acetate for which size is often given in terms of denier per filament (dpf) which is defined as the weight, in grams, of a single filament 9000 meters in length. In one aspect, the size of the fibers ranges from 0.5 to 1000 dpf; 0.5 to 500 dpf; 0.5 to 100; 0.5 to 5 dpf; 0.5 to 30 dpf; 0.5 to 10 dpf; 1 to 1000 dpf; 1 to 500 dpf; 1 to 100 dpf; 1 to 30 dpf; 1 to 10 dpf; or 1 to 5 dpf. In one aspect, the dpf of the fibers ranges from, for example, 1 to 30 dpf, 1 to 20 dpf, 1 to 10 dpf, 2 to 30 dpf, 2 to 20 dpf, or 2 to 10 dpf.

The number of fibers making up a fiber band is not particularly limiting. In one aspect, the number of fibers in a fiber band can range from 10 to 50,000. In other non-limiting examples, the number of fibers in a fiber band ranges from 10 to 40,000; 10 to 30,000; 10 to 20,000; 10 to 10,000; 10 to 1000; 100 to 50,000; 100 to 40,000; 100 to 30,000; 100 to 20,000; 100 to 10,000; 100 to 1000; 200 to 50,000; 200 to 40,000; 200 to 30,000; 200 to 20,000; 200 to 10,000; 200 to 1000; 1000 to 50,000; 1000 to 40,000; 1000 to 30,000; 1000 to 20,000; 1000 to 10,000; 5000 to 50,000; 5000 to 40,000; 5000 to 30,000; 5000 to 20,000; 5000 to 10,000; 10,000 to 50,000; 10,000 to 40,000; 10,000 to 30,000; or 10,000 to 20,000.

In one aspect, essentially all of the fibers in the yarn or fiber band are identification fibers. In this aspect, the identification fibers can be distinguishable from standard fibers in a different yarn or fiber band (and will be combined with standard fibers to produce an article) or the identification fibers can be used interchangeably with standard fibers for the production of articles. In another aspect, one or more identification fibers are distinguishable from the majority of fibers in the same yarn or fiber band. In yet another aspect, the number of identification fibers ranges from 0.001 to 100 percent of the fibers; or 0.01 to 50 percent of the fibers; or 0.01 to 25 percent of the fibers; or 0.01 to 10 percent of the fibers; or 0.01 to 5 percent of the fibers; or 0.01 to 1 percent of the fibers, each based on the total number of fibers. In another aspect, the number of identification fibers ranges from 0.01 to 100 percent of the fibers; or 1 to 100 percent of the fibers; or 25 to 100 percent of the fibers; or 50 to 100 percent of the fibers; or 30 to 80 percent of the fibers.

Each of the identification fibers exhibit at least one distinct feature. In one aspect, the distinct features can include cross-section shapes. In another aspect, the distinct features can include cross-section sizes. In another aspect, the distinct features can include cross-section shapes and cross-section sizes. In one aspect, distinct features are representative of at least one supply chain component of fibers, yarn, fiber band, and/or an article. In one aspect, the distinct features in each group of the distinguishable identification fibers and the fiber counts are representative of at least one supply chain component of fibers, yarn, fiber band, and/or an article.

In one aspect, the identification fibers exhibit 1 to 50 distinct features. In other aspects, the number of distinct features ranges from 1 to 20, 1 to 15, or 1 to 10, or 1 to 5, 1 to 3, 2 to 50, 2 to 20, 2 to 15, 2 to 10, 2 to 5, 3 to 50, 3 to 20, 3 to 15, 3 to 10, 3 to 5, 4 to 50, 4 to 20, 4 to 15, or 4 to 10.

In one aspect, fiber cross-section shapes can be used as a taggant. In one aspect, distinct features comprise one or more taggant cross-section shapes. Cross-section shapes vary such that either the human eye or an image analysis technique can differentiate shapes. For example, two shapes are significantly different when compared to the variability among the fibers of either cross-section shape. In one aspect, fibers, yarn, or a fiber band comprises one or more identification fibers with one or more taggant cross-section shapes each. In one aspect, the number of taggant cross-section shapes ranges from 1 to 50. In other aspects, the number of taggant cross-section shapes ranges from 1 to 25; 1 to 20; 1 to 10; 1 to 5; 1 to 4; 1 to 3; 2 to 20; 2 to 10; 2 to 5; or 3 to 10.

In one aspect, the number of identification fibers with distinct features which comprise one or more taggant cross-section shapes ranges from 0.01 to 100 percent of the fibers; or 0.01 to 50 percent of the fibers; for 0.01 to 25 percent of the fibers; for 0.01 to 10 percent of the fibers; or 0.01 to 5 percent of the fibers; or 0.01 to 1 percent of the fibers.

Many cross-section shapes have been commercialized for various fiber types, materials, and processes. These shapes are most typically governed and created by altering the hole geometry in the extrusion jet or spinneret used in the fiber production process. In a dry spinning process, like that of cellulose acetate in an acetone "dope" solution, a number of unique fiber cross-section shapes can be obtained through the use of various spinneret hole geometries. The variety and distinctiveness of the cross-section shapes are enhanced due to the shrinkage of the cross section as the acetone evaporates. Many of these shapes are sufficiently unique and differentiated such that they can be easily identified and/or counted in yarn or fiber bands, and/or acetate tow bands, either by the human eye with the aid of magnification, or with automated image analysis techniques.

For some fiber applications, the fiber cross-section shape is not critical to the functionality of an article made from the fibers, yarn, or fiber band. For these applications, the number of taggant cross-section shapes and the number of identification fibers having different taggant cross-section shapes are not particularly limited. For other fiber applications, however, the fiber cross-section shape is used to impart functionality to an article made from the fibers, yarn, or fiber band. For these applications, the number of taggant cross-section shapes and/or the number of identification fibers having different taggant cross-section shapes may be smaller. One skilled in the art can select the number of taggant cross-section shapes and the number of identification fibers having distinct features of taggant cross-section shapes so as to enable determination of the supply chain information without significantly impacting article properties.

In the application of filter rods and/or cigarette filters comprising acetate tow, the total number of identification fibers may be limited by the impact of the taggant cross-section shape on final product performance, particularly yield, defined as the pressure drop that can be obtained for a certain weight of product in the filter. By far, the most common shape used for acetate tow in cigarette filtration is the Y cross section (made from an equilateral triangular spinneret hole geometry) and the most common shape used for acetate yarn is multi-lobed (made from a circular or octagonal spinneret hole geometry). As the number of non-Y shape fibers increases, the impact (positive or negative) on yield may materially impact article functionality. One method, among others, for compensating for this yield shift is adjusting the average denier per filament (dpf) of the fibers.

Non-limiting examples of cross-section shapes include crescent, dogbone, triangle, square, pacman, multilobe, X-shaped, Y-shaped, H-shaped. Non-limiting examples of spinneret hole geometries used to make various cross-section shapes include triangle, circle, rectangle, square, flattened round, trapezoid, hexagon, pentagon, and D-shaped. In another aspect, spinneret hole geometry is selected from the group consisting of circle, rectangle, square, flattened round, trapezoid hexagon, pentagon, and D-shaped.

The disclosed embodiments may, for example, enable the use of fiber cross-section sizes as a taggant. In one aspect, distinct features comprise one or more taggant cross-section sizes each. Cross-section sizes vary such that either the human eye or an image analysis technique can differentiate sizes. The yarn or fiber band can have one or more identification fibers with one or more taggant cross-section sizes. The number of taggant cross-section sizes ranges from, for example, 1 to 50, 1 to 25; 1 to 20; 1 to 10; 1 to 5; 1 to 4; 1 to 3; 2 to 20; 2 to 10; 2 to 5; or 3 to 10.

In one aspect, the number of identification fibers with distinct features which comprise taggant cross-section sizes ranges from 0.01 to 100 percent of the fibers; or 0.01 to 50 percent of the fibers; for 0.01 to 25 percent of the fibers; for 0.01 to 10 percent of the fibers; or 0.01 to 5 percent of the fibers; or 0.01 to 1 percent of the fibers, based on the total number of fibers.

In one aspect, one or more identification fibers have one or more taggant cross-section sizes that are larger than the average cross-section size of the standard fibers. In one aspect, the ratio of the larger taggant cross-section size to the average cross-section size ranges from 20:1 to 1.5:1, or 10:1 to 1.5:1, or 5:1 to 1.5:1, or 3:1 to 1.5:1, 20:1 to 1.3:1, or 10:1 to 1.3:1, or 5:1 to 1.3:1, or 3:1 to 1.3:1, or 20:1 to 1.1:1, or 10:1 to 1.1:1, or 5:1 to 1.1:1, or 3:1 to 1.1:1. In one aspect, one or more identification fibers have cross-section sizes that are smaller than the average cross-section size of the standard fibers. In one aspect, the ratio of the smaller cross-section sizes to the average cross-section size ranges from 1:20 to 1:1.5, or 1:10 to 1:1.5, or 1:5 to 1:1.5, or 1:2 to 1:1.5, or 1:20 to 1:1.3, or 1:10 to 1:1.3, or 1:5 to 1:1.3, or 1:2 to 1:1.3, or 1:20 to 1:1.1, or 1:10 to 1:1.1, or 1:5 to 1:1.1, or 1:2 to 1:1.1. The cross-section sizes can be determined by either the effective diameter or the circumcised diameter.

The number or percentage of identification fibers with taggant cross-section sizes that can be incorporated into a multiple-filament product, like acetate tow for cigarette filters, is potentially limited by a few factors. First, the number may be limited by the impact of the diameter differences on final product performance, particularly yield. This yield shift could be compensated by adjusting the average denier per filament (dpf) of the standard fibers. Second, the number may be dictated by the capability of the analytical technique to accurately count individual fibers of unique cross-section diameter. If the correlation among the distinct features and the manufacturer-specific taggants includes the number of identification fibers with one or more cross-section sizes, discrete gaps in filament number or percentage may be desired in order to facilitate number differentiation.

In one aspect, each of the identification fibers exhibit at least one distinct feature. In one aspect, the identification fibers consist of 1 to 50 groups of the distinguishable identification fibers with each group of distinguishable identification fibers being formed by the identification fibers having the same distinct feature or the same combination of distinct features. In another aspect the number of groups of distinguishable identification fibers ranges from 1 to 25, 1 to 15, 1 to 10, 2 to 25, 2 to 20, 2 to 15, 3 to 24, or 3 to 15.

Groups of distinguishable identification fibers can contain one or more identification fibers having the same distinct feature for the same combination of distinct features. The number of the identification fibers in each group of the distinguishable identification fibers is defined as a fiber count. The fiber count is the actual number of fibers in each group of distinguishable identification fibers. The fiber count corresponds to a taggant fiber count. One skilled in the art recognizes that if there were no variability in manufacturing and no variability in detection, the fiber count would always equal its corresponding taggant fiber count. A robust system for building code into fibers must account for the fact that there is variability. One skilled in the art recognizes that if more than one taggant fiber count is to be used, the two or more taggant fiber counts must be different enough to allow for normal variation in the manufacture and detection of identification fibers and provide a high probability of a correct matching of fiber counts to taggant fiber counts. For example, if the normal variation in fiber counts is +−20%, taggant fiber counts of 20, 40, and 70 may provide correct matching with very high probability.

In one aspect, the fibers, yarn, or fiber band can have taggant fiber counts which correspond to the numbers of fibers (e.g., fiber counts) for each group of distinguishable identification fiber that can be present in the fibers, yarn, or fiber band. The taggant fiber counts of each group of distinguishable identification fiber can be the same or different. In one aspect, taggant fiber counts can be correlated to supply chain information. Also, the number of taggant fiber counts of each group of the distinguishable identification fibers can be the same or different. The taggant fiber counts and the number of taggant fiber counts are selected, in part, based upon the ability to manufacture and reliably detect discrete numbers of each group of the distinguishable identification fibers. The taggant fiber counts can also be limited by the maximum number of identification fibers desired. In one aspect, the number of taggant fiber counts ranges from 1 to 25, 1 to 15, 1 to 10, 1 to 5, 2 to 20, 2 to 15, 2 to 10, 3 to 20, 3 to 15, 3 to 10, 4 to 20, 4 to 15, or 4 to 10.

In one aspect, the distinguishable identification fibers can each exhibit one distinct feature, wherein each type of distinct feature is unique. For example, a first identification fiber can have a taggant cross-section shape, a second identification fiber can have a taggant cross-section size, and a third identification fiber can have a taggant optical property.

In another aspect, distinguishable identification fibers can each exhibit one distinct feature wherein each type of distinct feature is identical. For example a first identification fiber can have a first taggant cross-section shape, a second identification fiber can have a second taggant cross-section shape, a third identification fiber can have third taggant cross-section shape, etc.

In another aspect, distinguishable identification fibers can each exhibit one distinct feature wherein the types of distinct features can be identical or different. For example, a first identification fiber can have a first taggant optical property, a second identification fiber can have a first taggant cross-section size, a third identification fiber can have a second taggant optical property, and a fourth identification fiber can have a first taggant cross-section shape.

In one aspect, each group of distinguishable identification fibers can exhibit one distinct feature or the same combination of distinct features. For example, with 3 distinct features comprising a taggant cross-section shape, a taggant cross-section size, and a taggant optical property, the 7 possible groups of distinguishable identification fibers have the following distinct features: (1) identification fibers having taggant cross-section shape, (2) identification fibers having taggant cross-section size, (3) identification fibers having taggant optical property, (4) identification fibers having taggant cross-section shape at taggant cross-section size, (5) identification fiber having taggant cross-section shape with taggant optical property, (6) identification fibers having taggant cross-section size with taggant optical property, and (7) identification fibers having taggant cross-section shape at taggant cross-section size with taggant optical property.

The number of taggant fiber counts can be varied to produce different codes. For example, if any number from 1-25 specific distinguishable identification fibers can be present in fibers, yarn, or a fiber band (e.g. the fiber count for that group), the number of taggant fiber counts for that group of distinguishable identification fiber is 25 with 1-25 distinguishable identification fibers in each taggant fiber count. Alternatively, if either 10, 25, or 50 of a group of distinguishable identification fiber can be present in fibers, yarn, or a fiber band, the number of taggant fiber counts for that group of distinguishable identification fibers is 3 with 10, 25, or 50 of that specific distinguishable identification fiber as the possible taggant fiber count. The taggant fiber counts and numbers of taggant fiber counts for each group of distinct identification fibers give an additional element that can be correlated to supply chain information.

In another aspect, the distinguishable identification fibers comprise reference fibers. Reference fibers typically have a reference cross-section shape which is different from all of the other identification fibers and the standard fibers. Reference fibers also have a reference cross-section size. In one aspect, the number of reference fibers is larger than the fiber count of any other group of distinguishable identification fibers. In one aspect, the number of reference fibers is larger than the sum of the fiber counts of all of the other groups of distinguishable identification fibers. The cross-section sizes of distinguishable identification fibers can be characterized relative to the reference cross-section size. In one aspect, a group of distinguishable identification fibers can exhibit a relative cross-section size which can be smaller than, the same as, or larger than the reference cross-section size. In another aspect, a group of distinguishable identification fibers can exhibit a relative cross-section size which can be smaller than or larger than the reference cross-section size.

In one aspect, one or more identification fibers have one or more taggant cross-section sizes that are larger than the reference cross-section size. In one aspect, the ratio of the larger taggant cross-section sizes to the reference cross-section size ranges from 20:1 to 1.5:1, or 10:1 to 1.5:1, or 5:1 to 1.5:1, or 3:1 to 1.5:1, 20:1 to 1.3:1, or 10:1 to 1.3:1, or 5:1 to 1.3:1, or 3:1 to 1.3:1, or 20:1 to 1.1:1, or 10:1 to 1.1:1, or 5:1 to 1.1:1, or 3:1 to 1.1:1. In one aspect, one or more identification fibers have cross-section sizes that are smaller than the reference cross-section size. In one aspect, the ratio of the smaller cross-section sizes to the reference cross-section size ranges from 1:20 to 1:1.5, or 1:10 to 1:1.5, or 1:5 to 1:1.5, or 1:2 to 1:1.5, or 1:20 to 1:1.3, or 1:10 to 1:1.3, or 1:5 to 1:1.3, or 1:2 to 1:1.3, or 1:20 to 1:1.1, or 1:10 to 1:1.1, or 1:5 to 1:1.1, or 1:2 to 1:1.1.

An article can comprise the fibers, yarn, and/or fiber band. The article is not particularly limited. Non-limiting examples of articles comprising the fibers, yarn, and/or the fiber band include fabrics and other textile products, nonwovens, absorbent products, filters, filter rods, cigarette filters, liquid storage reservoirs, paper and/or currency. In one aspect, the article comprises a filter rod. In another aspect, the article comprises a cigarette filter. In one aspect, the article comprises a medical device such as a medical cloth or bandage. In another aspect, the article comprises a wicking device.

In one aspect, the fibers, yarn, or fiber band has determinable supply chain information. The supply chain information can include manufacturer, manufacture site, manufacturing line, production run, production date, package, bale, warehouse, customer, and/or ship-to location. In one aspect, the distinct features in each group of the distinguishable identification fibers and the fiber counts are representative of at least one supply chain component of the acetate tow band.

In one aspect, the supply chain information comprises supply chain components. In one aspect, at least one supply chain component comprises a manufacturer of the standard fibers, a manufacture site of the standard fibers, a manufacturing line of the standard fibers, a production run of the standard fibers, a production date of the standard fibers, a package of the standard fibers, a warehouse of the standard fibers, a customer of the standard fibers, a ship-to location of the standard fibers, a manufacturer of a yarn or fiber band comprising the standard fibers, a manufacturing site of the yarn or fiber band, a manufacturing line of the yarn or fiber band, a production run of the yarn or fiber band, a production date of the yarn or fiber band, a package of the yarn or fiber band, a warehouse of the yarn or fiber band, a customer of the yarn or fiber band, a ship-to location of the yarn or fiber band, a manufacturer of an article comprising the standard fibers, a manufacture site of the article, a manufacturing line of the article, a production run of the article, a production date of the article, a package of the article, a warehouse of the article, a customer of the article, or a ship-to location of the article.

In another aspect at least one supply chain component comprises the manufacturer of the fiber band. In one aspect, the supply chain component comprises the manufacture site of the fiber band. In one aspect the supply chain component comprises the manufacturing line of the fiber band. The manufacturing line of the fiber band is the manufacturing line on which the fiber band was produced. In one aspect, the supply chain component comprises the production run of the fiber band. The production run of the fiber band is the production run within which the fiber band was produced. In one aspect, the supply chain component comprises the production date of the fiber band. The production date of the fiber band is the production date on which the fiber band was produced. In one aspect, the supply chain component comprises the bale of the fiber band. In one aspect, the supply chain component comprises the warehouse of the fiber band. The warehouse of the fiber band is the warehouse to which the manufacturer plans to send or has sent the fiber band. In one aspect, the supply chain component comprises the customer of the fiber band. The customer of the fiber band is the customer to whom the manufacturer plans to send or has sent the fiber band. In one aspect, the supply chain component comprises the ship-to location of the fiber band. The ship-to location of the fiber band is the specific geographic location to which the manufacturer plans to send or has sent the fiber band.

The fibers, yarn, or fiber band can comprise determinable supply chain information. The possible number of groups of distinguishable identification fibers for identification fibers exhibiting, for example, 1-50 distinct features is great. The following non-limiting examples are intended to (1) illustrate the vast array of distinguishable identification fibers possible based upon a relatively low number of and/or combinations of distinct features and (2) illustrate varied approaches by which the distinct features in each group of the distinguishable identification fibers and the fiber counts can be representative of at least one supply chain component of the fibers, yarn, or fiber band.

Although not particularly limited, selection of the distinct features, combinations of distinct features, and coding system can be influenced by several factors. These factors include, but are not limited to, ease of manufacturing identification fibers, yarn, and/or fiber bands comprising identification fibers; ease of detecting identification fibers, either in the fibers, yarn, the fiber band, or in an article comprising the fibers, yarn or the fiber band; impact of the identification fibers on performance characteristics of an article comprising the fibers, yarn, or the fiber band; and ease of countering the track and trace objective.

The disclosed embodiments may also allow for flexible implementation of a coding system for correlating the identification fibers exhibiting distinct features and/or combinations of distinct features, one or more groups of distinguishable identification fibers and corresponding taggant fiber counts, as well as the number of taggant fiber counts to supply chain information. Described below are non-limiting examples of how coding systems can be readily implemented based upon the above described identification fibers.

In a non-limiting example, standard fibers are medium-sized circles and four manufacturer-specific taggants are used. A first taggant cross-section size, a second taggant cross-section size, a first taggant cross-section shape, and a second taggant cross-section shape. The manufacturer specific taggant cross-section sizes are small and large and the manufacturer specific taggant cross-section shapes are squares and triangles. In this example, eight possible groups of distinguishable identification fibers can be produced: small-sized circles (an example of taggant cross-section size), large-sized circles, small-sized squares (an example of the combination of taggant cross-section size and taggant cross-section shape), medium-sized squares (an example of taggant cross-section shape), large-sized squares, small-sized triangles, medium-sized triangles, and large-sized triangles. For example, when using a code comprised of one circle-shaped, one square-shaped, and one triangle-shaped identification fiber, eighteen sets of distinguishable identifications fibers are possible. If, additionally, one of two taggant colors are present for each identification fiber, the number of distinguishable identification fibers grows to 16 and the number of combinations grows to 144 (8 optical combinations per size/shape combinations of identification fibers times 18 size/shape combinations of identification fibers).

The example as described above also illustrates the selection of coding systems for ease of detection of each group of distinguishable identification fibers. The example coding system requires that one and only one of each taggant cross-section shape be detected in the fiber band. Once each taggant cross-section shape has been found, detection and analysis can end with confidence that all groups of distinguishable identification fibers present have been found.

In a another example, if one circle, one square, and one triangle of the original 8 distinguishable identification fibers above are present in one of 3 taggant fiber counts (e.g., taggant fiber counts of 10, 20, or 30), the number of possible sets grows to 486.

The method one uses for including distinct features, combinations of distinct features, taggant fiber counts, and/or number of taggant fiber counts into a code is not particularly limiting. One skilled in the art can readily see that there exists a large number of ways to generate several sets and/or codes based upon a relatively small number of distinct features, groups of distinguishable identification fibers, taggant fiber counts, and/or number of taggant fiber counts.

In a second embodiment, an acetate tow band comprises fibers. The fibers comprise standard fibers and identification fibers and the standard fibers comprise cellulose acetate. Each of the identification fibers exhibits at least one distinct feature. The identification fibers consist of one or more groups of distinguishable identification fibers, each group of distinguishable identification fibers being formed by the identification fibers having the same distinct feature or the same combination of distinct features. The number of identification fibers in each group of distinguishable identification fibers is defined as a fiber count. At least one of the fiber counts corresponds to the taggant fiber count. The distinct features in each group of distinguishable identification fibers and the one or more taggant fiber counts are representative of at least one supply chain component of the acetate tow band.

The acetate tow band of the second embodiment encompasses acetate tow bands comprising the fibers with any combination of attributes disclosed above. Specifically, the identification fiber composition, the sizes and numbers of fibers, the percentage of identification fibers in a fiber band, the distinct features, number of distinct features, combinations of distinct features, groups of distinguishable identification fibers, fiber counts, the taggant cross-section shapes and number of identification fibers exhibiting the taggant cross-section shapes, the taggant cross-section sizes and number of identification fibers exhibiting the taggant cross-section sizes, the reference fibers, the taggant fiber counts, the supply chain information, and the non-limiting coding/correlation systems apply to the acetate tow band of the second embodiment.

In one aspect the identification fibers comprise cellulose acetate. In one aspect, the acetate tow band consists essentially of cellulose acetate.

In a third embodiment, a filter comprises an acetate tow band comprising fibers. The fibers comprise standard fibers comprising cellulose acetate and identification fibers. Each of the identification fibers exhibits at least one distinct feature. The identification fibers consist of one or more groups of distinguishable identification fibers, each group of the distinguishable identification fibers being formed by the identification fibers having the same distinct feature or the same combination of distinct features. The number of the identification fibers in each group of the distinguishable identification fibers is defined as a fiber count. At least one of the fiber counts corresponds to the taggant fiber count. The distinct features in each group of distinguishable identification fibers and the one or more taggant fiber counts are representative of at least one supply chain component of the acetate tow band.

The filter of the third embodiment encompasses filters comprising the acetate tow band of the second embodiment which comprises fibers with any combination of attributes disclosed above. Specifically, the identification fiber composition, the sizes and numbers of fibers, the percentage of identification fibers in a fiber band, the distinct features, number of distinct features, combinations of distinct features, groups of distinguishable identification fibers, fiber counts, the taggant cross-section shapes and number of identification fibers exhibiting the taggant cross-section shapes, the taggant cross-section sizes and number of identification fibers exhibiting the taggant cross-section sizes, the reference fibers, the taggant fiber counts, the supply chain information, and the non-limiting coding/correlation systems apply to the filter of the third embodiment.

A fourth embodiment provides a method for making a fiber band. The fiber band comprises identification fibers and standard fibers. The method comprises (a) obtaining identification fibers; (b) obtaining standard fibers and (c) combining the standard fibers and identification fibers into a fiber band. The identification fibers consist of one or more groups of distinguishable identification fibers, each group of distinguishable identification fibers being formed by the identification fibers having the same distinct feature or the same combination of distinct features. A number of the identification fibers in each group of the distinguishable identification fibers is defined as a fiber count. At least one of the fiber counts corresponds to the taggant fiber count. The distinct features in each group of the distinguishable identification fibers and the one or more taggant fiber counts are representative of at least one supply chain component of the fibers.

One aspect of the fourth embodiment is a method of making an acetate tow band comprising fibers. The fibers comprise identification fibers and standard fibers comprising cellulose acetate. The method comprises: (a) producing the identification fibers on a first fiber production process; (b) producing the standard fibers on a second fiber production process; and (c) combining the identification fibers and the standard fibers into an acetate tow band. Each of the identification fibers exhibits at least one distinct feature. The identification fibers consist of one or more groups of distinguishable identification fibers, each group of distinguishable identification fibers being formed by the identification fibers having the same distinct feature or the same combination of distinct features. The number of the identification fibers in each group of the distinguishable identification fibers is defined as a fiber count. At least one of the fiber counts corresponds to the taggant fiber count. The distinct features in each group of the distinguishable identification fibers and the one or more taggant fiber counts are representative of at least one supply chain component of the acetate tow band.

The method for making a fiber band encompasses making a fiber band comprising the fibers with any combination of attributes disclosed above. Specifically, the fiber composition, the sizes and numbers of fibers, the percentage of identification fibers in a fiber band, the distinct features, number of distinct features, combinations of distinct features, groups of distinguishable identification fibers, fiber counts, the taggant cross-section shapes and number of identification fibers exhibiting the taggant cross-section shapes, the taggant cross-section sizes and number of identification fibers exhibiting the taggant cross-section sizes, the reference fibers, the taggant fiber counts, the supply chain information, and the non-limiting coding/correlation systems apply to the method of making a fiber band of the fourth embodiment.

In one aspect, at least a portion of the standard fibers are produced on a fiber production process. In another aspect, standard fibers are received from a third party. Obtaining the identification fibers comprises at least one of (i) producing at least a portion of the identification fibers on the standard fibers' fiber production process, (ii) producing at least a portion of the identification fibers on a process distinct from the standard fibers' fiber production process, or (iii) receiving at least a portion of the identification fibers from a third party.

In one aspect, the identification fibers are coproduced with the standard fibers and all of the fibers making up a fiber band are spun and combined directly downstream of the fiber production process. One skilled in the art will recognize that this can be done by imparting distinct features to groups of identification fibers, such as distinct cross-section shapes or cross-section sizes imparted to a portion of the fibers from a given spinneret or a given spinning cabinet in the fiber production line. In another aspect, distinct features can be uniformly dispersed throughout the fiber band by imparting distinct features to some or all of the fibers uniformly throughout the production line. In one aspect, all of the distinguishable spinneret holes are contained in a single spinneret.

In another aspect, the identification fibers are produced and packaged separately from the standard fibers and the identification fibers are combined with the standard fibers to produce a fiber band. The standard fibers may also have been packaged before combining with the identification fibers, or the identification fibers may be combined with the standard fibers before packaging of the fiber band.

The spinning process used for producing the fibers is not particularly limited. In one aspect, the fibers are produced using dry spinning, solution spinning, melt spinning, electro spinning, gel spinning, multi-component spinning, melt blowing, and/or solution blowing. In another aspect, the fibers are produced using dry spinning, solution spinning, melt spinning, electro spinning, gel spinning, and/or multi-component spinning. In a further aspect, the fibers comprise cellulose acetate and are produced using dry spinning.

In one aspect, the distinct features comprise taggant cross-section shapes and/or taggant cross-section sizes. In one aspect, the number of identification fibers ranges from 0.01 to 50 percent of fibers, based on the total of identification fibers and standard fibers. In other examples of the number of identification fibers ranges from 0.01 to 25 percent, 0.01 to 10 percent, or 0.01 to 5 percent of the fibers.

In one aspect, the distinct features comprise taggant cross-section shapes. The taggant cross-section shapes are produced using spinneret design and process conditions including spinneret hole geometry, draft ratio, and/or mass transfer rates. One skilled in the art of fiber production recognizes how each of these factors can be manipulated to impact taggant cross-section shape. For example, spinneret holes can vary in shape from non-limiting examples of circular, square, triangular, pentagon, octagon, half circle, and three-quarter circle. In one aspect, at least a portion of the spinneret hole geometries are selected from the group consisting of triangle, circle, rectangle, square, flattened round, trapezoid, hexagon, pentagon, and D-shaped. In another aspect, at least a portion of the spinneret hole geometries are selected from the group consisting of circle, rectangle square, flattened round, trapezoid hexagon, pentagon, and D-shaped.

The draft ratio can also impact the shape. Finally, in spinning processes that include the mass transfer of a solvent or other material from the polymer of the fiber, one skilled in the art recognizes that process conditions which impact the rate of mass transfer, such as temperature and gas flow, can impact taggant cross-section shape.

In one aspect, the distinct features comprise taggant cross-section sizes. The taggant cross-section sizes are produced using design and process conditions including spinneret hole geometry, extrusion flow rate, draft ratio, and/or solids level. When each of the other design and process conditions is held constant, one skilled in the art recognizes the impact of a change in one factor on taggant cross-section size. For example taggant cross-section size increases with increased spinneret hole size. Taggant cross-section size increases with increased extrusion rate. Taggant cross-section size decreases with increased draft ratio. Finally, taggant cross-section size increases with increased solids.

In one aspect, the identification fibers consist of 1 to 50 groups of distinguishable identification fibers, each group of the distinguishable identification fibers being formed by the identification fibers having the same distinct feature or combination of distinct features. The number of the identification fibers in each group of the distinguishable identification fibers is defined as a fiber count. The distinct features in each group of the distinguishable identification fibers and the fiber counts are representative of at least one supply chain component of the acetate tow band.

In one aspect, the identification fibers are produced using distinguishable spinneret holes, each group of the distinguishable spinneret holes being formed by spinneret holes having the same distinguishable spinneret hole geometry. Each group of the distinguishable identification fibers are produced using a corresponding group of the distinguishable spinneret holes. There is a one-to-one relationship between a specific distinguishable spinneret hole geometry and a specific distinguishable identification fiber produced using the specific distinguishable spinneret hole geometry. The number of each of the distinguishable spinneret holes used to make a corresponding group of distinguishable identification fibers is equal to the fiber count for the corresponding group of distinguishable identification fibers.

In one aspect the number of groups of the distinguishable identification fibers ranges from 1 to 25, 1 to 15, 1 to 10, 2 to 20, 2 to 15, 3 to 20, and 3 to 15.

In one aspect, distinguishable identification fibers comprise a reference fiber. The reference fibers comprises a reference cross-section size and a reference cross-section shape. The reference fibers are produced using distinguishable spinneret holes consisting of reference spinneret holes. In one aspect, the number of reference fibers is larger than the fiber count of each other group of the distinguishable identification fibers. In one aspect, the number of reference fibers is larger than the sum of the fiber counts of all other of the distinguishable identification fibers.

The reference fibers can serve to differentiate, for example, large and small sizes of the same cross-section shape. In one aspect, the geometry of the distinguishable spinneret holes is selected relative to the geometry of the reference spinneret hole. In one aspect, the distinguishable identification fibers, excluding the reference fibers, exhibit taggant cross-section sizes either smaller than, the same as, or larger than the reference cross-section size as determined by effective diameter.

In one aspect the number of reference fibers is selected such that the total number of all distinguishable identification fibers equals a taggant total identification fiber number.

The spinneret configuration for producing identification fibers is not particularly limiting. In one aspect, all of the identification fibers are produced from a single spinneret or from multiple spinnerets in a single spinning cabinet Such a configuration can concentrate the identification fibers in a single region of the tow band or article, depending on the band and/or article production arrangement, allowing for more efficient and effective location and characterization of the identification fibers. In another aspect, identification fibers are produced from multiple spinnerets or from multiple spinnerets in multiple spinning cabinets. Such a configuration can allow for higher total counts of identification fibers or could improve overall spinnanability of the identification fibers by reducing concentration of the identification fibers being produced from any one spinneret.

Different groups of the distinguishable identification fibers can be produced from separate spinnerets or from several spinnerets in various combinations. For example, each group of distinguishable identification fibers can be produced using a spinneret different from the one used to produce every other group of the distinguishable identification fibers. Such a configuration might allow for improved spinnability of the identification fibers through the optimization of the spinneret and/or the spinning conditions for each group of the distinguishable identification fibers. In another aspect, all groups of the distinguishable identification fibers can be produced from the same spinneret. Such a configuration might allow for reduced variation in the shape or size of the distinguishable identification fibers.

The arrangement of the distinguishable spinneret holes with distinguishable spinneret hole geometry on a particular spinneret is not particularly limiting. In one aspect, all of the holes having a particular spinneret hole geometry can be arranged in the same row or in adjacent rows, or could be arranged in the same concentric ring or adjacent concentric rings, or can be grouped in a specific region of the spinneret. Such configurations may improve the spinnability of the identification fibers or reduce the variation of the shape or size of a distinguishable identification fiber, thereby enabling improved characterization. In another aspect, distinguishable spinneret holes for each group of the distinguishable identification fibers can be distributed uniformly in various patterns, or can be distributed randomly with standard spinneret holes.

A fifth embodiment provides a method of characterizing a fiber sample comprising (1) applying imaging technology to the fiber sample comprising fibers. The fibers comprise identification fibers and standard fibers and each of the identification fibers exhibits at least one distinct feature. The identification fibers consist of one or more groups of distinguishable identification fibers, each group of distinguishable identification fibers being formed by the identification fibers having the same distinct feature or the same combination of distinct features. The method further comprises (2) detecting the groups of the distinguishable identification fibers, and (3) counting a number of each of the distinguishable identification fibers. The number of identification fibers in each group of the distinguishable identification fibers is defined as a fiber count. At least one of the fiber counts corresponds to the taggant fiber count. The distinct features in each group of the distinguishable identification fibers and the one or more taggant fiber counts are representative of at least one supply chain component of the fiber sample.

The method for testing a fiber sample encompasses testing a fiber sample comprising the fibers with any combination of attributes disclosed above. The fiber sample can comprise fibers, a portion of a yarn comprising fibers, a portion of a fiber band comprising fibers, or a portion of an article comprising fibers, yarn, or a fiber band. Specifically, the identification fiber composition, the sizes and numbers of fibers, the percentage of identification fibers in a fiber band, the distinct features, number of distinct features, combinations of distinct features, groups of distinguishable identification fibers, fiber counts, the taggant cross-section shapes and number of identification fibers exhibiting the taggant cross-section shapes, the taggant cross-section sizes and number of identification fibers exhibiting the taggant cross-section sizes, the reference fibers, the taggant fiber counts, the supply chain information, and the non-limiting coding/correlation systems apply to the fiber sample of the fifth embodiment. Also, the fiber sample can comprise the acetate tow band of the second embodiment with any combinations of its features or the filter of the third embodiment with any combinations of its features.

In one aspect, the fiber counts are added together to calculate a taggant total identification fibers number.

In one aspect, the imaging technology comprises the use of electromagnetic radiation at visible wavelengths. In another aspect, the image technology comprises the use of electromagnetic radiation at invisible wavelengths. The equipment useful for imaging technology is not particularly limited. Non-limiting examples include human visual inspection, microscopy, electron microscopy, confocal microscopy, fluorescence microscopy, and optical scanning.

The imaging technology can be applied to the fiber sample transverse to the length of the fibers. This direction allows, for example, a view of the cross-section shapes of the fibers. The imaging technology can also be applied along the length of fibers. This direction allows, for example, a view of a pattern of surface markings on the fibers.

In one aspect, the fibers are incorporated into a matrix prior to applying the imaging technology. For example, fibers can be immobilized in a polymer that does not interfere with the imaging technology and cut into appropriate sample sizes.

The imaging technology can also be applied to an article comprising the fibers, yarn, or the fiber band.

In one aspect, the method for characterizing the fiber sample further comprises (a) correlating the distinct features in each group of the distinguishable identification fibers and the one or more fiber counts to a database comprising manufacturer-specific taggants; and (b) determining at least one supply chain component of the fiber sample. The at least one supply chain component comprises a manufacturer of the standard fibers, a manufacture site of the standard fibers, a manufacturing line of the standard fibers, a production run of the standard fibers, a production date of the standard fibers, a package of the standard fibers, a warehouse of the standard fibers, a customer of the standard fibers, a ship-to location of the standard fibers, a manufacturer of a yarn or fiber band comprising the fibers, a manufacturing site of the yarn or fiber band, a manufacturing line of the yarn or fiber band, a production run of the yarn or fiber band, a production date of the yarn or fiber band, a package of the yarn or fiber band, a warehouse of the yarn or fiber band, a customer of the yarn or fiber band, a ship-to location of the yarn or fiber band, a manufacturer of an article comprising the fibers, a manufacture site of the article, a manufacturing line of the article, a production run of the article, a production date of the article, a package of the article, a warehouse of the article, a customer of the article, or a ship-to location of the article. In one aspect the correlating is among the distinct features and/or the combinations of distinct features. In another aspect, the correlating is among the distinct features, the combinations of distinct features, the fiber counts, the taggant fiber counts, the total number of each of the distinguishable identification fibers, and/or the taggant total identification fiber number.

When determining the supply chain information of a yarn, fiber band, and/or an article comprising the yarn or fiber band, the fibers to be analyzed may be in raw form such as a yarn or fiber band, (a collection of fibers) or tow (a crimped fiber band). Additionally, the article can be in a finished form such as a cylindrical filter (cigarette), a pleated filter, a fabric or a non-woven material. A goal of identifying the fibers, yarn, or the fiber band is to prevent counterfeiting, and/or illicit sales, of articles by enabling the identification of supply chain information from testing the yarn, fiber band and/or the article.

Listed below are non-limiting embodiments A1-A30.

A1. Fibers comprising identification fibers, wherein each of the identification fibers exhibits at least one distinct feature, wherein the identification fibers consists of one of more groups of distinguishable identification fibers, each group of distinguishable identification fibers being formed by identification fibers having the same distinct feature or the same combination of distinct features, wherein a number of the identification fibers in each group of the distinguishable identification fibers is defined as a fiber count, wherein at least one of the fiber counts corresponds to a taggant fiber count, and wherein (i) the distinct features in each group of distinguishable fibers and (ii) the one or more taggant fiber counts are representative of at least one supply chain component of the fibers.

A2. The fibers of embodiment A1, further comprising standard fibers.

A3. The fibers of any of embodiments A1-A2, wherein the distinct features comprise one or more taggant cross-section shapes and/or one or more taggant cross-section sizes and wherein a number of taggant fiber counts for each group of the distinguishable identification fibers ranges from 1 to 10.

A4. The fibers of embodiment A3, wherein a number of the taggant cross-section shapes ranges from 1 to 25; 1 to 20; 1 to 10; 1 to 5; 1 to 4; 1 to 3; 2 to 20; 2 to 10; 2 to 5; or 3 to 10.

A5. The fibers of any of embodiments A3-A4, wherein a portion of the taggant cross-section shapes are produced using spinneret hole geometries selected from the group consisting of triangle, circle, rectangle, square, flattened round, trapezoid hexagon, pentagon, and D-shaped.

A6. The fibers of any of embodiments A3-A5, wherein a number of the taggant cross-section sizes ranges from 1 to 25; 1 to 20; 1 to 10; 1 to 5; 1 to 3; 2 to 20; 2 to 10; 2 to 5; or 3 to 10, wherein a ratio of at least one of the taggant cross-section sizes to an average cross-section size of the standard fibers ranges from 20:1 to 1.1:1, or 10:1 to 1.1:1, or 5:1 to 1.1:1, or 3:1 to 1.1:1, and wherein the taggant cross-section size and the average cross-section size are determined based upon an effective diameter.

A7. The fibers of any of embodiments A3-A6, wherein a number of the taggant cross-section sizes ranges from 1 to 25; 1 to 20; 1 to 10; 1 to 5; 1 to 3; 2 to 20; 2 to 10; 2 to 5; or 3 to 10, wherein a ratio of at least one of the taggant cross-section sizes to the average cross-section size of the standard fibers ranges from 1:20 to 1:1.1, or 1:10 to 1:1.1, or 1:5 to 1:1.1, or 1:2 to 1:1.1, and wherein the taggant cross-section size and the average cross-section size are determined based upon an effective diameter.

A8. The fibers of any of embodiments A3-A7, wherein the identification fibers comprise reference fibers, wherein the reference fibers exhibit a reference cross-section size and a reference cross-section shape, wherein a ratio of each of the taggant cross-section sizes to the reference cross-section size ranges from 20:1 to 1:20, and wherein the reference cross-section size and the taggant cross-section sizes are determined based upon an effective diameter.

A9. The fibers any of embodiments A2-A8, wherein the standard fibers comprise cellulose acetate.

A10. The fibers of any of embodiments A2-A8, wherein the standard fibers comprise acrylic, modacrylic, aramid, nylon, polyester, polypropylene, rayon, polyacrylonitrile, polyethylene, PTFE, or cellulose acetate.

A11. The fibers of any of embodiments A2-A10, wherein the at least one supply chain component comprises at least one of a manufacturer of the standard fibers, a manufacture site of the standard fibers, a manufacturing line of the standard fibers, a production run of the standard fibers, a production date of the standard fibers, a package of the standard fibers, a warehouse of the standard fibers, a customer of the standard fibers, a ship-to location of the standard fibers, a manufacturer of a fiber band comprising the fibers, a manufacturing site of the fiber band, a manufacturing line of the fiber band, a production run of the fiber band, a production date of the fiber band, a package of the fiber band, a warehouse of the fiber band, a customer of the fiber band, a ship-to location of the fiber band, a manufacturer of an article comprising the fibers, a manufacture site of the article, a manufacturing line of the article, a production run of the article, a production date of the article, a package of the article, a warehouse of the article, a customer of the article, or a ship-to location of the article.

A12. The fibers of embodiment A11, wherein the at least one supply chain component comprises the manufacturer of the standard fibers and the customer of the standard fibers.

A13. The fibers of embodiment A11, wherein the at least one supply chain component comprises the manufacturer of a fiber band comprising the fibers and the customer of the fiber band.

A14. Fibers comprising identification fibers, wherein each of the identification fibers exhibits at least one distinct feature, wherein the identification fibers consist of one or more groups of distinguishable identification fibers, each group of the distinguishable identification fibers being formed by identification fibers having the same distinct feature or the same combination of distinct features, wherein a number of the identification fibers in each group of distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of an acetate tow band comprising the fibers.

A15. The fibers of embodiment A14, wherein the fibers further comprise standard fibers, and wherein the standard fibers comprise cellulose acetate.

A16. The fibers of any of embodiments A14-A15, wherein the distinct features comprise one or more taggant cross-section shapes and/or one or more taggant cross-section sizes and wherein a number of taggant fiber counts for each group of the distinguishable identification fibers ranges from 1 to 10.

A17. The fibers of embodiment A16, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

A18. The fibers of any of embodiments A16-A17, wherein a portion of the taggant cross-section shapes are produced using spinneret hole geometries selected from the group consisting of circle, rectangle, square, flattened round, trapezoid hexagon, pentagon, and D-shaped.

A19. The fibers of any of embodiments A16-A18, wherein a number of the taggant cross-section sizes ranges from 1 to 10, 1 to 5; 1 to 4; 1 to 3; 2 to 10; 2 to 5; or 3 to 10, wherein a ratio of at least one of the taggant cross-section sizes to an average cross-section size of the standard fibers ranges from 10:1 to 1.1:1, or 5:1 to 1.1:1, or 3:1 to 1.1:1, and wherein the taggant cross-section size and the average cross-section size are determined based upon an effective.

A20. The fibers of any of embodiments A16-A19, wherein a number of the taggant cross-section sizes ranges from 1 to 10, 1 to 5; 1 to 4; 1 to 3; 2 to 10; 2 to 5; or 3 to 10, wherein a ratio of at least one of the taggant cross-section sizes to the average cross-section size of the standard fibers ranges from 1:10 to 1:1.1, or 1:5 to 1:1.1, or 1:2 to 1:1.1, and wherein the taggant cross-section size and the average cross-section size are determined based upon an effective diameter.

A21. The fibers of any of embodiments A16-A20, wherein the taggant cross-section sizes range from 1 to 30 dpf, 1 to 20 dpf, 4 to 30 dpf, or 8 to 20 dpf.

A22. The fibers of any of embodiments A16-A20, wherein the identification fibers comprise reference fibers, wherein the reference fibers exhibit a reference cross-section size and a reference cross-section shape, wherein a ratio of each of the taggant cross-section sizes to the reference cross-section size ranges from 20:1 to 1:20, 10:1 to 1:10. or 5:1 to 1:5, and wherein the reference cross-section size and the taggant cross-section sizes are determined based upon an effective diameter.

A23. The fibers of any of embodiments A16-A22, wherein a number of the taggant cross-section shapes ranges from 1 to 12; 1 to 10; 1 to 5; 1 to 4; 1 to 3; 2 to 12; 2 to 10; 2 to 5; or 3 to 10 and wherein a number of the taggant cross-section sizes ranges from 1 to 4, 1 to 3, or 2 to 4.

A24. The fibers of any of embodiments A17-A26, wherein the number of the taggant cross-section shapes ranges from 1 to 12; 1 to 10; 1 to 5; 1 to 4; 1 to 3; 2 to 12; 2 to 10; 2 to 5; or 3 to 10.

A25. The fibers of any of embodiments A19-A24, wherein the number of the taggant cross-section sizes ranges from 1 to 4, 1 to 3, or 2 to 4.

A26. The fibers of any of embodiments A22-A25, wherein a number of the reference fibers is larger than each of the fiber counts.

A27. The fibers of any of embodiments A14-A26, wherein the at least one supply chain component comprises at least one of a manufacturer of the acetate tow band, a manufacture site of the acetate tow band, a manufacturing line of the acetate tow band, a production run of the acetate tow band, a production date of the acetate tow band, a bale of the acetate tow band, a warehouse of the acetate tow band, a customer of the acetate tow band, or a ship-to location of the acetate tow band.

A28. The fibers of embodiment A27, wherein the at least one supply chain component comprises the manufacturer of the acetate tow band and the customer of the acetate tow band.

A29. The fibers of embodiment A27, wherein the at least one supply chain component comprises the manufacturer of the acetate tow band and the ship-to location of the acetate tow band.

A30. Fibers comprising identification fibers and standard fibers, wherein the standard fibers comprise cellulose acetate, wherein each of the identification fibers exhibit at least one distinct feature, wherein the distinct features comprise 1 to 10 taggant cross-section shapes and 1 to 4 taggant cross-section sizes, wherein the identification fibers consist of one or more groups of distinguishable identification fibers, each group of the distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, and wherein (i) the distinct features in each group of the distinguishable identification fibers wherein each of the fiber counts corresponds to a taggant fiber count, and wherein a number of taggant fiber counts for each group of the distinguishable identification fibers ranges from 1 to 4, and (ii) the taggant fiber counts are representative of a manufacturer an acetate tow band comprising the fibers and a customer of the acetate tow band or a ship-to location of the acetate tow band.

Listed below are additional non-limiting embodiments B1-B30.

B1. An acetate tow band comprising fibers, wherein the fibers comprise standard fibers and identification fibers, wherein the standard fibers comprise cellulose acetate, wherein each of the identification fibers exhibits at least one distinct feature, wherein the identification fibers consist of one or more groups of distinguishable identification fibers, each group of the distinguishable identification fibers being formed by the identification fibers having the same distinct feature or the same combination of distinct features, wherein a number of the identification fibers in each group of the distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of the acetate tow band.

B2. The acetate tow band of embodiment B1, wherein the distinct features comprise one or more taggant cross-section shapes and/or one or more taggant cross-section sizes and wherein a number of taggant fiber counts for each group of the distinguishable identification fibers ranges from 1 to 10.

B3 The acetate tow band of embodiment B2, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

B4 The acetate tow band of any of embodiments B2-B3, wherein a portion of the taggant cross-section shapes are produced using spinneret hole geometries selected from the group consisting of circle, rectangle, square, flattened round, trapezoid hexagon, pentagon, and D-shaped.

B5. The acetate tow band of any of embodiments B2-B4, wherein a number of the taggant cross-section sizes ranges from 1 to 10, 1 to 5; 1 to 4; 1 to 3; 2 to 10; 2 to 5; or 3 to 10, wherein a ratio of at least one of the taggant cross-section sizes to an average cross-section size of the standard fibers ranges from 10:1 to 1.1:1, or 5:1 to 1.1:1, or 2:1 to 1.1:1, and wherein the taggant cross-section size and the average cross-section size are determined based upon an effective diameter.

B6. The acetate tow band of any of embodiments B2-B5, wherein a number of the taggant cross-section sizes ranges from 1 to 10, 1 to 5; 1 to 3; 2 to 10; 2 to 5; or 3 to 10, wherein a ratio of at least one of the taggant cross-section sizes to the average cross-section size of the standard fibers ranges from 1:10 to 1:1.1, or 1:10 to 1:1.1, or 1:5 to 1:1.1, or 1:2 to 1:1.1, and wherein the taggant cross-section size and the average cross-section size are determined based upon an effective diameter.

B7. The acetate tow band of any of embodiments B2-B6, wherein the taggant cross-section sizes range from 1 to 30 dpf, 1 to 20 dpf, 4 to 30 dpf, or 8 to 20 dpf.

B8. The acetate tow band of any of embodiments B1-B7, wherein the identification fibers comprise acrylic, modacrylic, aramid, nylon, polyester, polypropylene, rayon, polyacrylonitrile, polyethylene, PTFE, or cellulose acetate.

B9. The acetate tow band of any of embodiments B2-B8, wherein the distinguishable identification fibers comprise reference fibers, wherein the reference fibers exhibit a reference cross-section size and a reference cross-section shape, wherein a ratio of each of the taggant cross-section sizes to the reference cross-section size ranges from 20:1 to 1:20, 10:1 to 1:10. or 5:1 to 1:5, and wherein the reference cross-section sizes and taggant cross-section sizes are determined based upon an effective diameter.

B10. The acetate tow band of any of embodiments B2-B9, wherein a number of the taggant cross-section shapes ranges from 1 to 12; 1 to 10; 1 to 5; 1 to 4; 1 to 3; 2 to 12; 2 to 10; 2 to 5; or 3 to 10 and wherein a number of the taggant cross-section sizes ranges from 1 to 4, 1 to 3, or 2 to 4.

B11. The acetate tow band of any of embodiments B9-B10, wherein a number of the reference fibers is larger than each of the other fiber counts.

B12. The acetate tow band of any of embodiments B1-B11, wherein the at least one supply chain component comprises at least one of a manufacturer of the acetate tow band, a manufacture site of the acetate tow band, a manufacturing line of the acetate tow band, a production run of the acetate tow band, a production date of the acetate tow band, a bale of the acetate tow band, a warehouse of the acetate tow band, a customer of the acetate tow band, or a ship-to location of the acetate tow band.

B13. The acetate tow band of embodiment B12, wherein the at least one supply chain component comprises the manufacturer of the acetate tow band and the customer of the acetate tow band.

B14. The acetate tow band of embodiment B12, wherein the at least one supply chain component comprises the manufacturer of the acetate tow band and the ship-to location of the acetate tow band.

B15. A filter comprising an acetate tow band, wherein the acetate tow band comprises fibers, wherein the fibers comprise standard fibers and identification fibers, wherein the standard fibers comprise cellulose acetate, wherein each of the identification fibers exhibits at least one distinct feature, wherein the identification fibers consist of one or more groups of distinguishable identification fibers, each group of the distinguishable identification fibers being formed by the identification fibers having the same distinct feature or the same combination of distinct features, wherein a number of the identification fibers in each group of the distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of the acetate tow band.

B16. The filter of embodiment B15, wherein the distinct features comprise one or more taggant cross-section shapes and/or one or more taggant cross-section sizes and wherein a number of taggant fiber counts for each group of the distinguishable identification fibers ranges from 1 to 10.

B17. The filter of embodiment B16, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

B18. The filter of any of embodiments B16-B17, wherein at least a portion of the taggant cross-section shapes are produced using spinneret hole geometries selected from the group consisting of circle, rectangle, square, flattened round, trapezoid hexagon, pentagon, and D-shaped.

B19. The filter of any of embodiments B16-B18, wherein a number of the taggant cross-section sizes ranges from 1 to 10, 1 to 5; 1 to 4; 1 to 3; 2 to 10; 2 to 5; or 3 to 10, wherein a ratio at least one of the taggant cross-section sizes to an average cross-section size of the standard fibers ranges from 10:1 to 1.1:1, or 5:1 to 1.1:1, or 2:1 to 1.1:1, and wherein the taggant cross-section sizes and the average cross-section size are determined based upon an effective diameter.

B20. The filter of any of embodiments B16-B19, wherein a number of the taggant cross-section sizes ranges from 1 to 10, 1 to 5; 1 to 4; 1 to 3; 2 to 10; 2 to 5; or 3 to 10, wherein a ratio of at least one of the taggant cross-section sizes to the average cross-section size of the standard fibers ranges from 1:10 to 1:1.1, or 1:10 to 1:1.1, or 1:5 to 1:1.1, or 1:2 to 1:1.1, and wherein the taggant cross-section sizes and the average cross-section size are determined based upon an effective diameter.

B21. The filter of any of embodiments B16-B20, wherein the taggant cross-section sizes range from 1 to 30 dpf, 1 to 20 dpf, 4 to 30 dpf, or 8 to 20 dpf.

B22. The filter of any of embodiments B15-B20, wherein the identification fibers comprise acrylic, modacrylic, aramid, nylon, polyester, polypropylene, rayon, polyacrylonitrile, polyethylene, PTFE, or cellulose acetate.

B23. The filter of any of embodiments B16-B21, wherein the distinguishable identification fibers comprise reference fibers, wherein the reference fibers exhibit a reference cross-section size and a reference cross-section shape, wherein a ratio of each of the taggant cross-section sizes to the reference cross-section size ranges from 20:1 to 1:20, 10:1 to 1:10. or 5:1 to 1:5, and wherein each of the cross-section sizes are determined based upon an effective diameter.

B24. The filter of any of embodiments B16-B23, wherein a number of the taggant cross-section shapes ranges from 1 to 12; 1 to 10; 1 to 5; 1 to 4; 1 to 3; 2 to 12; 2 to 10; 2 to 5; or 3 to 10 and wherein a number of the taggant cross-section sizes ranges from 1 to 4, 1 to 3, or 2 to 4.

B25. The filter of any of embodiments B23-B24, wherein a number of the reference fibers is larger than each of the other fiber counts.

B26. The filter of any of embodiments B15-B25, wherein the at least one supply chain supply chain component comprises a manufacturer of the acetate tow band, a manufacture site of the acetate tow band, a manufacturing line of the acetate tow band, a production run of the acetate tow band, a production date of the acetate tow band, a bale of the acetate tow band, a warehouse of the acetate tow band, a customer of the acetate tow band, or a ship-to location of the acetate tow band.

B27. The filter of embodiment B26, wherein the at least one supply chain component comprises the manufacturer of the acetate tow band and the customer of the acetate tow band.

B28. The filter of embodiment B26, wherein the at least one supply chain component comprises the manufacturer of the acetate tow band and the ship-to location of the acetate tow band.

B29. An acetate tow band comprising cellulose acetate fibers, wherein the cellulose acetate fibers comprise standard fibers and identification fibers, wherein each of the identification fibers exhibits at least one distinct feature, wherein the distinct features comprise 1 to 10 taggant cross-section shapes and 1 to 4 taggant cross-section sizes, wherein the identification fibers consist of one or more groups of distinguishable identification fibers, each group of distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, wherein each of the fiber counts corresponds to a taggant fiber count, and wherein a number of taggant fiber counts for each group of the distinguishable identification fibers ranges from 1 to 4, and wherein (i) the distinct features in each group of the distinguishable identification fibers and (ii) the taggant fiber counts are representative of a manufacturer of the acetate tow band and a customer of the acetate tow band or a ship-to location of the acetate tow band.

B30. A filter comprising an acetate tow band, wherein the acetate tow band comprises cellulose acetate fibers, wherein the cellulose acetate fibers comprise standard fibers and identification fibers, wherein each of the identification fibers exhibits at least one distinct feature, wherein the distinct features comprise 1 to 10 taggant cross-section shapes and 1 to 4 taggant cross-section sizes, wherein the identification fibers consist of one or more groups of distinguishable identification fibers, each group of distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, wherein each of the fiber counts corresponds to a taggant fiber count, and wherein a number of taggant fiber counts for each group of the distinguishable identification fibers ranges from 1 to 4, and wherein (i) the distinct features in each group of the distinguishable identification fibers and (ii) the taggant fiber counts are representative of a manufacturer of the acetate tow band and a customer of the acetate tow band or a ship-to location of the acetate tow band.

Listed below are additional non-limiting embodiments C1-C30.

C1. A method of making a acetate tow band comprising fibers, wherein the fibers comprise identification fibers and standard fibers, wherein the standard fibers comprise cellulose acetate, and wherein the method comprises:

(a) producing the identification fibers on a first fiber production process;

(b) producing the standard fibers on a second fiber production process; and (c) combining the identification fibers and the standard fibers into an acetate tow band, wherein each of the identification fibers exhibits at least one distinct feature, wherein the identification fibers consist of one or more groups of distinguishable identification fibers, each group of distinguishable identification fibers being formed by the identification fibers having the same distinct feature or the same combination of distinct features, wherein a number of the identification fibers in each group of distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of the acetate tow band.

C2. The method of embodiment C1, wherein the first fiber production process and the second fiber production process correspond to a common fiber production process.

C3. The method of any of embodiments C1-C2, wherein the distinct features comprise one or more taggant cross-section shapes and/or one or more taggant cross-section sizes and wherein a number of taggant fiber counts for each group of the distinguishable identification fibers ranges from 1 to 10.

C4. The method of embodiment C3, wherein the identification fibers are produced using distinguishable spinneret holes, each group of the distinguishable spinneret holes being formed by spinneret holes having the same distinguishable spinneret hole geometry, wherein each group of the distinguishable identification fibers are produced using a corresponding group of the distinguishable spinneret holes.

C5. The method of embodiments C4, wherein all of the distinguishable spinneret holes are contained in a single spinneret.

C6. The method of any of embodiments C3-05, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

C7. The method of any of embodiments C3-C6, wherein a portion of the distinguishable spinneret hole geometries are selected from the group consisting of triangle, circle, rectangle, square, flattened round, trapezoid, hexagon, pentagon, and D-shaped.

C8. The method of any of embodiments C3-C7, wherein a number of the taggant cross-section sizes ranges from 1 to 10, 1 to 5; 1 to 4; 1 to 3; 2 to 10; 2 to 5; or 3 to 10, wherein a ratio of a larger of the taggant cross-section sizes to an average cross-section size of the standard fibers ranges from 10:1 to 1.1:1, or 5:1 to 1.1:1, or 2:1 to 1.1:1, and/or wherein a ratio of a smaller of the taggant cross-section sizes to the average cross-section size of the standard fibers ranges from 1:10 to 1:1.1, or 1:5 to 1:1.1, or 1:2 to 1:1.1, and wherein the larger taggant cross-section size, the smaller taggant cross-section size, and the average cross-section size are determined based upon an effective diameter.

C9. The method of any of embodiments C3-C8, wherein the taggant cross-section sizes range from 1 to 30 dpf, 1 to 20 dpf, 4 to 30 dpf, or 8 to 20 dpf.

C10. The method of any of embodiments C4-C9, wherein the distinguishable identification fibers comprise reference fibers, wherein the reference fibers exhibit a reference cross-section size and a reference cross-section shape, wherein the reference fibers are produced using the distinguishable spinneret holes comprising reference spinneret holes.

C11. The method of embodiment C10, wherein a ratio of at least one of the taggant cross-section sizes to the reference cross-section size ranges from 20:1 to 1.1:1, or 10:1 to 1.1:1, or 5:1 to 1.1:1, or 2:1 to 1.1:1 and wherein the taggant cross-section size and the reference cross-section size are determined based upon an effective diameter.

C12. The method of any of embodiments C10-C11, wherein a ratio of the reference cross-section size to a at least one of the taggant cross-section sizes ranges from 20:1 to 1.1:1, or 10:1 to 1.1:1, or 5:1 to 1.1:1, or 2:1 to 1.1:1, and wherein the reference cross-section size and the taggant cross-section size are determined based upon an effective diameter.

C13. The method of any of embodiments C4-C12, wherein a number of each of the distinguishable spinneret holes is selected to produce each of the fiber counts.

C14. The method of any of embodiments C10-C13, wherein a number of the reference spinneret holes is selected to produce a larger number of the reference fibers than any of the fiber counts for other groups of the distinguishable identification fibers.

C15. The method of any of embodiments C1-C13, wherein the at least one supply chain supply chain component comprises a manufacturer of the acetate tow band, a manufacture site of the acetate tow band, a manufacturing line of the acetate tow band, a production run of the acetate tow band, a production date of the acetate tow band, a bale of the acetate tow band, a warehouse of the acetate tow band, a customer of the acetate tow band, or a ship-to location of the acetate tow band.

C16. The method of embodiment C15, wherein the at least one supply chain component comprises the manufacturer of the acetate tow band and the customer of the acetate tow band.

C17. The method of embodiment C15, wherein the at least one supply chain component comprises the manufacturer of the acetate tow band and the ship-to location of the acetate tow band.

C18. A method of making an acetate tow band comprising cellulose acetate fibers, wherein the cellulose acetate fibers comprise identification fibers and standard fibers, wherein the method comprises:

(a) co-producing the identification fibers and the standard fibers;

and (b) combining the identification fibers and the standard fibers into the acetate tow band, wherein each of the identification fibers exhibits at least one distinct feature, wherein the distinct features comprise taggant cross-section shapes or taggant cross-section sizes, wherein the identification fibers consist of 1 to 20 groups of distinguishable identification fibers, each group of the distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of the acetate tow band.

C19. The method of embodiment C18, wherein the identification fibers are produced using distinguishable spinneret holes, each group of the distinguishable spinneret holes being formed by spinneret holes having the same distinguishable spinneret hole geometry, wherein each group of the distinguishable identification fibers are produced using a corresponding group of the distinguishable spinneret holes.

C20. The method of embodiment C19, wherein all of the distinguishable spinneret holes are contained in a single spinneret.

C21. The method of any of embodiments C18-C20, wherein a number of the taggant cross-section shapes ranges from 1 to 20, 1 to 10; 1 to 5; 1 to 3; 2 to 20; 2 to 10; 2 to 5; or 3 to 10 and wherein at least a portion of the spinneret hole geometries are selected from the group consisting of triangle, circle, rectangle, square, flattened round, trapezoid, hexagon, pentagon, and D-shaped.

C22. The method of any of embodiments C18-C21, wherein a number of the taggant cross-section sizes ranges from 1 to 10, 1 to 5; 1 to 4; 1 to 3; 2 to 20; 2 to 10; 2 to 5; or 3 to 10, wherein a ratio of at least one of the taggant cross-section sizes to an average cross-section size of the standard fibers ranges from 10:1 to 1.1:1, or 5:1 to 1.1:1, or 2:1 to 1.1:1, and/or wherein a ratio of at least one of the taggant cross-section sizes to the average cross-section size of the standard fibers ranges from 1:10 to 1:1.1, or 1:5 to 1:1.1, or 1:2 to 1:1.1, and wherein the taggant cross-section size and the average cross-section size are determined based upon an effective diameter.

C23. The method of any of embodiments C18-C22, wherein a number of taggant cross-section shapes ranges from 1 to 12, 1 to 10; 1 to 5; 1 to 3; 2 to 12; 2 to 10; 2 to 5; or 3 to 10, a number of taggant cross-section sizes ranges from 1 to 4, 1 to 3, or 2 to 4, and, and wherein a number of taggant fiber counts for each group of the distinguishable identification fibers ranges from 1 to 10, 1 to 3, or 2 to 4.

C24. The method of any of embodiments C19-C23, wherein the distinguishable identification fibers comprise a reference fiber, wherein the reference fiber comprises a reference cross-section size and a reference cross-section shape, wherein the reference fibers are produced using the distinguishable spinneret holes comprising reference spinneret holes; wherein a ratio of each of the taggant cross-section sizes to the reference cross-section size ranges from 20:1 to 1:20, 10:1 to 1:10, 5:1 to 1:5, or 2:1 to 1:2 wherein the reference cross-section size and taggant cross-section sizes are determined based upon an effective diameter.

C25. The method of any of embodiments C19-C24, wherein a number of each of the distinguishable spinneret holes is selected to produce each of the fiber counts.

C26. The method of any of embodiments C24-C25, wherein a number the reference spinneret holes is selected to produce a larger number of the reference fibers than any of the fiber counts for other groups of the distinguishable identification fibers.

C27. The method of any of embodiments C18-C25, wherein the at least one supply chain component comprises a manufacturer of the acetate tow band, a manufacture site of the acetate tow band, a manufacturing line of the acetate tow band, a production run of the acetate tow band, a production date of the acetate tow band, a bale of the acetate tow band, a warehouse of the acetate tow band, a customer of the acetate tow band, or a ship-to location of the acetate tow band.

C28. The method of embodiment C27, wherein the at least one supply chain component comprises the manufacturer of the acetate tow band and the customer of the acetate tow band.

C29. The method of embodiment C27, wherein the at least one supply chain component comprises the manufacturer of the acetate tow band and the ship-to location of the acetate tow band.

C30. A method of making an acetate tow band, wherein the acetate tow band comprises cellulose acetate fibers, wherein the cellulose acetate fibers comprise standard fibers and identification fibers, the method comprising (a) coproducing standard fibers and identification fibers and (b) combining the standard fibers and the identification fibers into the acetate tow band, wherein each of the identification fibers exhibits at least one distinct feature, wherein the distinct features comprise 1 to 10 taggant cross-section shapes and 1 to 4 taggant cross-section sizes, wherein the identification fibers consist of one or more groups of distinguishable identification fibers, each group of the distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, wherein each of the fiber counts corresponds to a taggant fiber count, and wherein a number of taggant fiber counts for each group of the distinguishable identification fibers ranges from 1 to 4, and wherein (i) the distinct features in each group of the distinguishable identification fibers and (ii) the taggant fiber counts are representative of a manufacturer of the acetate tow band and a customer of the acetate tow band or a ship-to location of the acetate tow band.

Listed below are additional non-limiting embodiments D1-D30.

D1. A method of characterizing a fiber sample comprising (1) applying imaging technology to a fiber sample comprising fibers, wherein the fibers comprise identification fibers and standard fibers, wherein each of the identification fibers exhibits at least one distinct feature, wherein the identification fibers consist of one or more groups of the distinguishable identification fibers, each group of the distinguishable identification being formed by the identification fibers having the same distinct feature or the same combination of distinct features, (2) detecting the groups of the distinguishable identification fibers, and (3) counting a number of each of the distinguishable identification fibers, wherein the number of identification fibers in each group of the distinguishable identification fibers is defined as a fiber count, wherein at least one of the fiber counts corresponds to a taggant fiber count, and wherein (i) the distinct features in each group of the distinguishable identification fibers and (ii) the one or more taggant fiber counts are representative of at least one supply chain component of the fiber sample.

D2. The method of embodiment D1, wherein the distinct features comprise one or more taggant cross-section shapes and/or one or more taggant cross-section sizes and wherein a number of taggant fiber counts for each group of the distinguishable identification fibers ranges from 1 to 10.

D3. The method of embodiment D2, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

D4. The method of any of embodiments D2-D3, wherein a portion of the taggant cross-section shapes are produced using spinneret hole geometries selected from the group consisting of triangle, circle, rectangle, square, flattened round, trapezoid hexagon, pentagon, and D-shaped.

D5. The method of any of embodiments D2-D4, wherein a number of the taggant cross-section sizes ranges from 1 to 25; 1 to 20; 1 to 10; 1 to 5; 1 to 4; 1 to 3; 2 to 20; 2 to 10; 2 to 5; or 3 to 10, wherein a ratio of at least one of the taggant cross-section sizes to an average cross-section size of the standard fibers ranges from 20:1 to 1.1:1, or 10:1 to 1.1:1, or 5:1 to 1.1:1, or 3:1 to 1.1:1, and wherein the taggant cross-section size and the average cross-section size are determined based upon an effective diameter D6. The method of any of embodiments D2-D5, wherein a number of the taggant cross-section sizes ranges from 1 to 25; 1 to 20; 1 to 10; 1 to 5; 1 to 4; 1 to 3; 2 to 20; 2 to 10; 2 to 5; or 3 to 10, wherein a ratio of at least one of the taggant cross-section sizes to the average cross-section size of the standard fibers ranges from 1:20 to 1:1.1, or 1:10 to 1:1.1, or 1:5 to 1:1.1, or 1:2 to 1:1.1, and wherein the taggant cross-section size and the average cross-section size are determined based upon an effective diameter.

D7. The method of any of embodiments D2-D6, wherein the distinguishable identification fibers comprise reference fibers, wherein the reference fibers exhibit a reference cross-section size and a reference cross-section shape, wherein a ratio of each of the taggant cross-section sizes to the reference cross-section size ranges from 20:1 to 1:20, 10:1 to 1:10. or 5:1 to 1:5, and wherein the reference cross-section size and the taggant cross-section sizes are determined based upon an effective diameter.

D8. The method of any of embodiments D1-D7, wherein the standard fibers comprise cellulose acetate, wherein the fiber sample comprises a portion of an article comprising the fibers, and wherein the article is selected from the group consisting of a filter rod and a cigarette filter.

D9. The method of any of embodiments D1-D8, wherein the fiber sample comprises a portion of an article and wherein the article is selected from the group consisting of fabrics and other textile products, non-wovens, and absorbent products.

D10. The method of any of embodiments D1-D9, wherein the imaging technology is selected from the group consisting of human visual inspection, microscopy, electron microscopy, confocal microscopy, florescence microscopy, and optical scanning; or wherein the imaging technology is selected from the group consisting of microscopy, electron microscopy, confocal microscopy, florescence microscopy, and optical scanning.

D11. The method of any of embodiments D1-D10, wherein the imaging technology is applied transverse to the length of the fibers.

D12. The method of any of embodiments D1-D11, further comprising (a) correlating the (i) the distinct features in each group of the distinguishable identification fibers and (ii) the one or more taggant fiber counts to a database, wherein the database comprises manufacturer specific taggants; and (b) determining the at least on supply chain component, wherein the at least one supply chain component comprises at least one of a manufacturer of the standard fibers, a manufacture site of the standard fibers, a manufacturing line of the standard fibers, a production run of the standard fibers, a production date of the standard fibers, a package of the standard fibers, a warehouse of the standard fibers, a customer of the standard fibers, a ship-to location of the standard fibers, a manufacturer of a fiber band comprising the standard fibers, a manufacturing site of the fiber band, a manufacturing line of the fiber band, a production run of the fiber band, a production date of the fiber band, a package of the fiber band, a warehouse of the fiber band, a customer of the fiber band, a ship-to location of the fiber band, a manufacturer of an article comprising the fibers, a manufacture site of the article, a manufacturing line of the article, a production run of the article, a production date of the article, a package of the article, a warehouse of the article, a customer of the article, or a ship-to location of the article.

D13. The embodiment of D12, wherein the at least one supply chain component comprises the manufacturer of the fiber band comprising the standard fibers and customer of the fiber band.

D14. The embodiment of D12, wherein the at least one supply chain component comprises the manufacturer of the fiber band comprising the standard fibers and ship-to location of the fiber band.

D15. A method of characterizing a fiber sample comprising (1) applying imaging technology to the fiber sample, wherein the fiber sample comprises fibers, wherein the fibers comprise identification fibers and standard fibers, wherein the standard fibers comprise cellulose acetate, wherein each of the identification fibers exhibits at least one distinct feature, wherein the identification fibers consist of one or more groups of the distinguishable identification fibers, each group of the distinguishable identification fibers being formed by the identification fibers having the same distinct feature or the same combination of distinct features, (2) detecting the groups of the distinguishable identification fibers, and (3) counting a number of each of the distinguishable identification fibers, wherein the number of the identification fibers in each group of the distinguishable identification fibers is defined as a fiber count, wherein at least one of the fiber counts corresponds to a taggant fiber count, and wherein (i) the distinct features in each group of the distinguishable identification fibers and (ii) the one or more taggant fiber counts are representative of at least one supply chain component of an acetate tow band, wherein the acetate tow band comprises the fibers, and wherein the fiber sample comprises a portion of the acetate tow band or a portion of an article comprising the acetate tow band.

D16. The method of embodiment D15, wherein the distinct features comprise one or more taggant cross-section shapes and/or one or more taggant cross-section sizes and wherein a number of taggant fiber counts for each group of the distinguishable identification fibers ranges from 1 to 10.

D17. The method of embodiment D16, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

D18. The method of any of embodiments D16-D17, wherein a portion of the taggant cross-section shapes are produced using spinneret hole geometries selected from the group consisting of triangle, circle, rectangle, square, flattened round, trapezoid hexagon, pentagon, and D-shaped.

D19. The method of any of embodiments D16-D18, wherein a number of the taggant cross-section sizes ranges from 1 to 10; 1 to 5; 1 to 4; 1 to 3; 2 to 10; 2 to 5; or 3 to 10, wherein a ratio of at least one of the taggant cross-section sizes to an average cross-section size of the standard fibers ranges from 10:1 to 1.1:1, or 5:1 to 1.1:1, or 2:1 to 1.1:1, and wherein the taggant cross-section size and the average cross-section size are determined based upon an effective diameter D20. The method of any of embodiments D16-D19, wherein a number of the taggant cross-section sizes ranges from 1 to 10; 1 to 5; 1 to 4; 1 to 3; 2 to 10; 2 to 5; or 3 to 10, wherein a ratio of at least one of the taggant cross-section sizes to the average cross-section size of the standard fibers ranges from 1:10 to 1:1.1, or 1:5 to 1:1.1, or 1:2 to 1:1.1, and wherein the taggant cross-section size and the average cross-section size are determined based upon an effective diameter.

D21. The method of any of embodiments D16-D20, wherein the taggant cross-section sizes range from 1 to 30 dpf, 1 to 20 dpf, 4 to 30 dpf, or 8 to 20 dpf.

D22. The method of any of embodiments D15-D21, wherein the identification fibers comprise cellulose acetate.

D23. The method of any of embodiments D16-D22, wherein a number of the taggant cross-section shapes ranges from 1 to 12, 1 to 10; 1 to 5; 1 to 4; 1 to 3; 2 to 12; 2 to 10; 2 to 5; or 3 to 10 and a number of the taggant cross-section sizes ranges from 1 to 4, 1 to 3, or 2 to 4.

D24. The method of any of embodiments D15-D23, wherein the imaging technology is selected from the group consisting of human visual inspection, microscopy, electron microscopy, confocal microscopy, florescence microscopy, and optical scanning; or wherein the imaging technology is selected from the group consisting of microscopy, electron microscopy, confocal microscopy, florescence microscopy, and optical scanning.

D25. The method of any of embodiments D15-D24, wherein the imaging technology is applied transverse to the length of the fibers.

D26. The method of any of embodiments D16-D25, wherein the distinguishable identification fibers comprise reference fibers, wherein the reference fibers exhibit a reference cross-section size and a reference cross-section shape, wherein a ratio of each of the taggant cross-section sizes to the reference cross-section size ranges from 20:1 to 1:20, 10:1 to 1:10. or 5:1 to 1:5, and wherein the reference cross-section size and the taggant cross-section sizes are determined based upon an effective diameter.

D27. The method of any of embodiments D15-D26, further comprising (a) correlating the (i) the distinct features in each group of the distinguishable identification fibers and (ii) the one or more taggant fiber counts to a database, wherein the database comprises manufacturer specific taggants; and (b) determining the at least on supply chain component, wherein the at least one supply chain component comprises at least one of a manufacturer of the acetate tow band, a manufacture site of the acetate tow band, a manufacturing line of the acetate tow band, a production run of the acetate tow band, a production date of the acetate tow band, a bale of the acetate tow band, a warehouse of the acetate tow band, a customer of the acetate tow band, or a ship-to location of the acetate tow band.

D28. The method of embodiment D27, wherein the at least one supply chain component comprises the manufacturer of the acetate tow band and the customer of the acetate tow band.

D29. The method of embodiment D27, wherein the at least one supply chain component comprises the manufacturer of the acetate tow band and the ship-to location of the acetate tow band.

D30. A method of characterizing a fiber sample comprising (1) applying imaging technology to the fiber sample, wherein the fiber sample comprises standard fibers and identification fibers, wherein the standard fibers comprise cellulose acetate, wherein each of the identification fibers exhibits at least one distinct feature, wherein the distinct features comprise 1 to 10 taggant cross-section shapes and 1 to 4 taggant cross-section sizes, wherein the identification fibers consist of one or more groups of distinguishable identification fibers, each group of the distinguishable identification fibers being formed by identification fibers having the same taggant cross-section shape, the same taggant cross-section size, or the same combination of taggant cross-section shape and taggant cross-section size, (2) detecting the groups of the distinguishable identification fibers, and (3) counting a number of the distinguishable identification fibers in each of the groups, wherein the number of the distinguishable identification fibers in each of the distinct groups is defined as a fiber count, wherein each of the fiber counts corresponds to a taggant fiber count, and wherein a number of taggant fiber counts for each group of the distinguishable identification fibers ranges from 1 to 4, and (4) correlating (i) the distinct features in each group of the distinguishable identification fibers and (ii) the taggant fiber counts to a database comprising manufacture specific taggants and determining a manufacturer of an acetate tow band and a customer of the acetate tow band or a ship-to location of the acetate tow band, wherein the acetate tow band comprises the identification fibers and the standard fibers, and wherein the fiber sample comprises a portion of the acetate tow band or a portion of an article comprising the acetate tow band.

Listed below are additional non-limiting embodiments, E1-E38.

E1. A method for embedding supply chain information into fibers, the method comprising:
  obtaining standard fibers;
  obtaining identification fibers, the identification fibers comprising one or more groups of distinguishable identification fibers, each of the groups of distinguishable identification fibers exhibiting a corresponding distinct feature or a corresponding combination of distinct features, and the identification fibers being associated with taggant fiber counts, the taggant fiber counts being indicative a number of the identification fibers in each of the groups; and
  combining the standard fibers with the identification fibers, the distinct features, the combinations of distinct features, and/or the taggant fiber counts being representative of at least one component of a supply chain.

E2. The method of embodiment E1, wherein the distinct features comprise cross-section shapes and/or cross-section sizes.

E3. The method of embodiment E1, wherein the combinations of distinct features exhibited by the groups comprise combinations of the cross-section shapes and/or the cross-section sizes.

E4. The method of any of embodiments E1-E3, wherein the at least one supply chain component comprises a manufacturer, a manufacture site, a manufacturing line, a production run, a production date, a bale, a warehouse, a customer, and/or a ship-to location.

E5. The method of any of embodiments E1-E4, further comprising establishing a number of distinguishable identification fibers included within each of the groups as the fiber count and determining the corresponding taggant fiber count.

E6. The method of embodiment E5, wherein (i) the distinct features, (ii) the combinations of distinct features, (iii) the taggant fiber counts, and/or (iv) a number of taggant fiber counts are representative of the at least one supply chain component.

E7. The method of any of embodiments E1-E6, further comprising receiving, from a third party, information identifying (i) the cross-section shapes, (ii) the cross-section sizes, (iii) the combinations of the distinct features exhibited by the groups. (iv) the taggant fiber counts and/or (v) the number of taggant fiber counts.

E8. The method of any of embodiments E1-E7, further comprising:
  identifying proposed cross-section shapes, proposed cross-section sizes, proposed distinct features, proposed combinations of distinct features, proposed taggant fiber counts, and/or proposed number of taggant fiber counts to represent the at least one component of the supply chain;
  providing the proposed cross-section shapes, the proposed cross-section sizes, the proposed distinct features, the proposed combinations of distinct features, the proposed taggant fiber counts, and/or the proposed number of taggant fiber counts to a third party; and
  receiving, from the third party, information indicative of an assignment of the proposed cross-section shapes, the proposed cross-section sizes, the proposed distinct features, the proposed combinations of distinct features, the proposed taggant fiber counts, and/or the proposed number of taggant fiber counts to the at least one component of the supply chain.

E9. The method of any of embodiment E1-E7, further comprising
  identifying proposed cross-section shapes, proposed cross-section sizes, proposed distinct features, proposed combinations of distinct features, proposed taggant fiber counts, and/or proposed number of taggant fiber counts capable of representing the at least one component of the supply chain;
  assigning the proposed cross-section shapes, the proposed cross-section sizes, the proposed distinct features, the pro- posed combinations of distinct features, the proposed taggant fiber counts, and/or the proposed number of taggant fiber counts to the at least one component of the supply chain.

E10. The method of any of embodiments E8 and E9, wherein the at least one component of the supply chain corresponds to a manufacturer.

E11. The method of any of embodiments E1-E10, wherein the distinguishable identification fibers include reference fibers, the reference fibers having a corresponding reference cross-section shape and a corresponding reference cross-section size.

E12. The method of embodiment E11, wherein the reference cross-section size corresponds to an average effective diameter of a plurality of the reference fibers, the average effective diameter being larger than or smaller than the cross-section sizes associated with each of the groups of the distinguishable identification fibers.

E13. The method of any of embodiments E11 and E12, wherein a sum of a number of the reference fibers and a number of the other distinguishable identification fibers have a predetermined value.

E14. The method of any of embodiments E1-E13, wherein a portion of at least one of the standard fibers or the identification fibers comprises cellulose acetate fibers.

E15. The method of embodiment E14, further comprising combining the standard fibers with the identification fibers to form a cellulose acetate tow band.

E16. The method of embodiment E15, further comprising producing a portion of at least one of a filter rod or cigarette filter from the cellulose acetate tow band.

E17. The method of any of embodiments E1-E16, further comprising combining the standard fibers with the identification fibers to form a portion of at least one of fabrics, other textile products, non-wovens, or absorbent products.

E18. The method of any of embodiments E1-E17, wherein obtaining the standard fibers comprises producing at least a portion of the standard fibers on a first fiber production process.

E19. The method of embodiment E18, wherein the first fiber production process comprises a dry-spinning process, a solution-spinning process, a melt-spinning process, an electro-spinning process, a gel-spinning process, a multi-component-spinning process, a melt-blowing process, and/or a solution-blowing process.

E20. The method of any of embodiments E18 and E19, wherein obtaining the identification fibers comprises receiving at least a portion of the identification fibers from a third party.

E21. The method of any of embodiments E18-E20, wherein obtaining the identification fibers comprises producing at least a portion of the identification fibers on a second fiber production process.

E22. The method of embodiment E21, wherein the second fiber production process comprises a dry-spinning process, a solution-spinning process, a melt-spinning process, an electro-spinning process, a gel-spinning process, a multi-component-spinning process, a melt-blowing process, and/or a solution-blowing process.

E23. The method of any of embodiments E21 and E22, wherein the first production process and the second fiber production process correspond to a common fiber production process.

E24. The method of any of embodiments E1-E23, further comprising generating correlation data mapping the distinct features, the combinations of distinct features, and/or the taggant fiber counts to the at least one supply chain component E25. The method of any of embodiments E1-E23, wherein generating the correlation data comprises mapping the distinct features, the combinations of distinct features, the taggant fiber counts, and/or a number of taggant fiber counts to the at least one supply chain component.

E26. The method of any of embodiments E1-E25, further comprising:
generating a first structured list of components of the supply chain, the supply chain components having one or more corresponding attributes; establishing measurable gradations in the distinct features;
generating a second structured list comprising distinct combinations of the established measurable gradations of the distinct features;
generating a third structured list identifying potential groups of the distinguishable identification fibers that exhibit corresponding ones of the distinct combinations included within the third structured list, the potential groups of the distinguishable identification fibers being capable of representing the supply chain components included within the first structured list;
mapping the attributes of the supply chain components to the potential groups of the distinguishable identification fibers; and
storing correlation data reflecting the mapping of the attributes of the supply chain components to the potential groups of the distinguishable identification fibers.

E27. The method of embodiment E26, further comprising:
establishing a taggant fiber count for each of the potential groups; and
mapping the attributes of the supply chain components to the potential groups of the distinguishable identification fibers and the established taggant fiber count of each of the potential groups.

E28. The method of embodiment E26, further comprising:
mapping subsets of the attributes of the supply chain components to the potential groups of the distinguishable identification fibers; and
storing correlation data reflecting the mapping of the subsets of the attributes of the supply chain components to the potential groups of the distinguishable identification fibers.

E29. The method of any of embodiments E1-E26, further comprising:
generating a first structured list of the supply chain components, the supply chain components having one or more corresponding attributes; generating a second structured list of the distinct features;
establishing measurable gradations of the distinct features included in the second structured list;
mapping elements of the first structured list to elements of the second structured list;
mapping the attributes of the supply chain components to the established measurable gradations; and
storing correlation data reflecting the mapping of the elements of the first and second structured lists and the mapping of the supply attributes of the supply chain components to the established measurable gradations.

E30. The method of embodiment E29, wherein the supply chain components comprise an indication of a manufacturer, a manufacture site, a manufacturing line, a production run, a production date, a bale, a warehouse, a customer, and/or a ship-to location.

E31. The method of any of embodiments E29 and E30, wherein:
obtaining the identification fibers comprises producing at least a portion of the identification fibers; and producing the portion of the identification fibers comprises:
  receiving an indication of one or more supply chain components to reflect in the identification fibers;
  accessing the stored correlation data;
  identifying, from the stored correlation data, at least one applicable distinct feature mapped to the one or more selected supply chain information components;
  selecting at least one manufacturing method associated with producing the identification fibers based on the at least one applicable distinct feature; and
  producing the identification fibers according to the selected at least one manufacturing method.

E32. The method of embodiment E31, wherein selecting the at least one manufacturing method comprises:
  determining whether an introduction of the at least one of applicable distinct features of the identification fibers includes manipulating physical properties of the identification fibers;
  identifying one or more manufacturing methods for the identification fibers based on the determination regarding the introduction of the at least one applicable distinct feature of the identification fibers; and producing the identification fibers according to the identified one or more manufacturing methods.

E33. The method of embodiment E32, further comprising:
  determining that the introduction of the at least one applicable distinct feature of the identification fibers includes at least a manipulation of physical properties; and
  determining one or more cross-section shapes for the identification fibers.

E34. The method of embodiment E33, further comprising determining a number of identification fibers that exhibit each of the one or more cross-section shapes.

E35. The method of any of embodiments E33 and E34, further comprising:
  determining a cross-section size for identification fibers exhibiting each of the one or more cross-section shapes.

E36. The method of any of embodiments E33-E35, further comprising:
  determining that the introduction of the at least one applicable distinct feature of the identification fibers includes at least a manipulation of physical properties; and
  determining a number of identification fibers that exhibit each of the one or more cross-section shapes.

E37. The method of any of embodiments E33-E36, further comprising:
  determining that the introduction of the at least one applicable distinct feature of the identification fibers includes at least a manipulation of physical properties; and
  determining one or more sizes exhibited by the identification fibers.

E38. The method of any of embodiments E33-E37, further comprising:
  determining that the introduction of the at least one applicable distinct feature of the identification fibers includes at least a manipulation of physical properties; and
  determining a number of identification fibers exhibiting each of the one or more cross-section sizes.

Listed below are further non-limiting embodiments, F1-F30.

F1. A method for identifying supply chain information from fiber samples, the method comprising:
  analyzing a fiber sample for identification fibers, the identification fibers comprising one or more groups of distinguishable identification fibers, each of the groups of the distinguishable identification fibers exhibiting a corresponding distinct feature or a corresponding combination of distinct features;
  establishing taggant fiber counts for the identification fibers, the taggant fiber counts being indicative of a number of the identification fibers in each of the groups;
  accessing correlation data mapping components of a supply chain to the exhibited distinct features, the exhibited combinations of distinct features, and/or the established taggant fiber counts; and
  based on the accessed correlation data, the exhibited distinct features, the exhibited combinations of distinct features, and/or the established taggant fiber counts, identifying at least one component of the supply chain associated with the fiber sample.

F2. The method of embodiment F1, wherein the fiber sample comprises standard fibers and the identification fibers.

F3. The method of any of embodiments F1 and F2, wherein the distinct features comprise cross-section shapes and/or cross-section sizes of the distinguishable identification fibers.

F4. The method of embodiment F2, wherein the exhibited combinations of distinct features comprise distinct combinations of the cross-section-shapes and/or cross-section sizes.

F5. The method of any of embodiments F1-F4, wherein the supply chain components comprise a manufacturer, a manufacture site, a manufacturing line, a production run, a production date, a bale, a warehouse, a customer, and/or a ship-to location.

F6. The method of any of claims F1-F5, wherein the at least one identified supply chain component comprises a manufacturer, a manufacture site, a manufacturing line, a production run, a production date, a bale, a warehouse, a customer, and/or a ship-to location.

F7. The method of any of claims F1-F6, further comprising establishing a number of distinguishable identification fibers within each of the groups as the fiber count and determining the corresponding taggant fiber count.

F8. The method of embodiment F7, wherein:
  the correlation data maps the supply chain components to (i) the exhibited distinct features, (ii) the exhibited combinations of distinct features, (iii) the taggant fiber counts, and/or (iv) the number of taggant fiber counts of each of the groups; and
  the method further comprises identifying the at least one supply chain component associated with the fiber sample based on the accessed correlation data, and the exhibited distinct features, the exhibited combinations of distinct features, the established taggant fiber counts, and/or the number of taggant fiber counts of each of the groups.

F9. The method of any of embodiments F1-F8, wherein the distinguishable identification fibers comprise reference fibers, the reference fibers having a corresponding reference cross-section shape and a corresponding reference cross-section size.

F10. The method of embodiment F9, wherein:
  analyzing the fiber sample comprises identifying the reference fibers within the fiber sample; and
  the method further comprises establishing a number of the reference fibers identified within the fiber sample.

F11. The method of any of embodiments F9 and F10, wherein the reference cross-section size corresponds to an average effective diameter of at least a portion of the reference fibers, the effective diameter being larger than or smaller than cross-section sizes of the distinguishable identification fibers.

F12. The method of embodiments F9-F11, wherein analyzing the fiber sample comprises:
identifying the groups of distinguishable identification fibers within the fiber sample;
establishing a cross-section size of the distinguishable identification fibers included within each of the groups;
determining that the cross-section size of the distinguishable identification fibers included within a first one of the groups is larger than or smaller than the cross-section size of the distinguishable identification fibers within each of the other groups; and
based on the determination, establishing the distinguishable identification fibers included within the first group as the reference fibers.

F13. The method of embodiments F9-F11, wherein analyzing the fiber sample comprises:
identifying the groups of distinguishable identification fibers within the fiber sample;
establishing the number of the distinguishable identification fibers included within each of the groups;
determining that the number of the distinguishable identification fibers included within a first one of the groups exceeds the numbers of the distinguishable identification fibers within each of the other groups; and
based on the determination, establishing the distinguishable identification fibers included within the first group as the reference fibers.

F14. The method of embodiment F13, wherein the determining comprises determining that the number of the distinguishable identification fibers included within the first group exceeds a sum of the numbers of the distinguishable identification fibers within the other groups.

F15. The method of embodiment F13, wherein the determining comprises determining that the number of the distinguishable identification fibers included within the first group exceeds a maximum of the numbers of the distinguishable identification fibers included within the other groups.

F16. The method of embodiment F15, wherein a ratio between (i) the maximum of the numbers of the distinguishable identification fibers included within the other groups and (ii) the number of the distinguishable identification fibers included within the first group is at least 2:1.

F17. The method of any of embodiments F9-F11, wherein:
the accessed correlation data maps the supply chain components to the exhibited distinct features, the exhibited combinations of distinct features, the established taggant fiber counts, the number of taggant fiber counts of each group, and/or the number of the reference fibers included within the fiber sample; and
the method further comprises identifying the at least one component of the supply chain based on the accessed correlation data, and the exhibited distinct features, the exhibited combinations of distinct features, the taggant fiber counts, the number of taggant fiber counts of each group, and/or the reference fiber count.

F18. The method of any of embodiments F1-F17, wherein the fiber sample comprises cellulose acetate fibers.

F19. The method of any of embodiments F1-F18, wherein the fiber sample comprises a portion of a cellulose acetate tow band.

F20. The method of any of embodiments F1-F19, wherein the fiber sample comprises a portion of at least one of a filter rod or cigarette filter.

F21. The method of any of embodiments F1-F20, wherein the fiber sample comprises a portion of at least one of a textile product, a woven fabric, a non-woven fabric, or an absorbent product.

F22. The method of any of embodiments F1-F21, further comprising:
receiving a request to identify supply chain information associated with the fiber sample from a requesting entity; and
transmitting information identifying the at least one supply chain component to the requesting entity.

F23. The method of embodiment F22, wherein the requesting entity comprises a manufacturer, a customer, a governmental entity, a law enforcement entity, or a third-party requestor.

F24. The method of any of embodiments F22 and F23, wherein:
identifying the at least one supply chain component comprises identifying a plurality of supply chain components based on the correlation data, and the exhibited distinct features, the exhibited combinations of distinct features, the established taggant fiber counts, and/or a number of the taggant fiber counts for each group; and
the transmitting comprises transmitting information identifying a subset of the plurality of supply chain components to the requesting entity.

F25. The method of any of embodiments F22-F24, wherein the transmitting further comprises transmitting information identifying a manufacturer to the requesting entity.

F26. The method of any of embodiments F22-F25, further comprising transmitting a portion of at least one of the exhibited distinct features, combinations of distinct features, or the established taggant fiber counts to the requesting entity.

F27. The method of any of claims F1-F26, wherein the analyzing comprises subjecting the fiber sample to an imaging technology.

Listed below are further non-limiting embodiments, H1-H20.

H1. A method of making a yarn or a fiber band comprising fibers, wherein the fibers comprise identification fibers and standard fibers, wherein the standard fibers comprise cellulose acetate, and wherein the method comprises:
(a) obtaining the identification fibers
(b) producing the standard fibers on a first fiber production process; and
(c) combining the identification fibers and the standard fibers into an acetate tow band,
wherein each of the identification fibers exhibits at least one distinct feature, wherein the identification fibers consist of one or more groups of distinguishable identification fibers, each group of distinguishable identification fibers being formed by the identification fibers having the same distinct feature or the same combination of distinct features, wherein a number of the identification fibers in each group of distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of the acetate tow band.

H2. The method of embodiment H1, wherein the obtaining of the identification fibers comprises at least one of (i)

producing a portion of the identification fibers on the first fiber production process, (ii) producing a portion of the identification fibers on a second fiber production process, or (iii) receiving at least a portion of the identification fibers from a third party.

H3. The method of any of embodiments H1-H2, wherein the distinct features comprise one or more taggant cross-section shapes and/or one or more taggant cross-section sizes and wherein a number of taggant fiber counts for each group of the distinguishable identification fibers ranges from 1 to 20, 1 to 10, 1 to 5, 1 to 4, 1 to 3.

H4. The method of embodiment H3, wherein the identification fibers are produced using distinguishable spinneret holes, each group of the distinguishable spinneret holes being formed by spinneret holes having the same distinguishable spinneret hole geometry, wherein each group of the distinguishable identification fibers are produced using a corresponding group of the distinguishable spinneret holes.

H5. The method of embodiments H4, wherein all of the distinguishable spinneret holes are contained in a single spinneret.

H6. The method of any of embodiments H3-H5, wherein a number of the taggant cross-section shapes ranges from 1 to 25, 1 to 20; 1 to 10; 1 to 5; 1 to 4; 1 to 3; 2 to 20; 2 to 10; 2 to 5; or 3 to 10.

H7. The method of any of embodiments H3-H6, wherein a portion of the distinguishable spinneret hole geometries are selected from the group consisting of triangle, circle, rectangle, square, flattened round, trapezoid, hexagon, pentagon, and D-shaped.

H8. The method of any of embodiments H3-H7, wherein a number of the taggant cross-section sizes ranges from 1 to 10, 1 to 5; 1 to 4; 1 to 3; 2 to 10; 2 to 5; or 3 to 10, wherein a ratio of a larger of the taggant cross-section sizes to an average cross-section size of the standard fibers ranges from 10:1 to 1.1:1, or 5:1 to 1.1:1, or 2:1 to 1.1:1, and/or wherein a ratio of a smaller of the taggant cross-section sizes to the average cross-section size of the standard fibers ranges from 1:10 to 1:1.1, or 1:5 to 1:1.1, or 1:2 to 1:1.1, and wherein the larger taggant cross-section size, the smaller taggant cross-section size, and the average cross-section size are determined based upon an effective diameter.

H9. The method of any of embodiments H3-H8, wherein the identification fibers comprise acrylic, modacrylic, aramid, nylon, polyester, polypropylene, rayon, polyacrylonitrile, polyethylene, PTFE, or cellulose acetate.

H10. The method of any of embodiments H4-H9, wherein the distinguishable identification fibers comprise reference fibers, wherein the reference fibers exhibit a reference cross-section size and a reference cross-section shape, wherein the reference fibers are produced using the distinguishable spinneret holes comprising reference spinneret holes.

H11. The method of embodiment H10, wherein a ratio of at least one of the taggant cross-section sizes to the reference cross-section size ranges from 20:1 to 1.1:1, or 10:1 to 1.1:1, or 5:1 to 1.1:1, or 2:1 to 1.1:1 and wherein the taggant cross-section size and the reference cross-section size are determined based upon an effective diameter.

H12. The method of any of embodiments H10-H11, wherein a ratio of the reference cross-section size to a at least one of the taggant cross-section sizes ranges from 20:1 to 1.1:1, or 10:1 to 1.1:1, or 5:1 to 1.1:1, or 2:1 to 1.1:1, and wherein the reference cross-section size and the taggant cross-section size are determined based upon an effective diameter.

H13. The method of any of embodiments H4-H12, wherein a number of each of the distinguishable spinneret holes is selected to produce each of the fiber counts.

H14. The method of any of embodiments H10-H13, wherein a number of the reference spinneret holes is selected to produce a larger number of the reference fibers than any other of the fiber counts.

H15. The method of any of embodiments H1-H13, wherein the at least one supply chain supply chain component comprises manufacturer of the standard fibers, a manufacture site of the standard fibers, a manufacturing line of the standard fibers, a production run of the standard fibers, a production date of the standard fibers, a package of the standard fibers, a warehouse of the standard fibers, a customer of the standard fibers, a ship-to location of the standard fibers, a manufacturer of a yarn or fiber band comprising the standard fibers, a manufacturing site of the yarn or fiber band, a manufacturing line of the yarn or fiber band, a production run of the yarn or fiber band, a production date of the yarn or fiber band, a package of the yarn or fiber band, a warehouse of the yarn or fiber band, a customer of the yarn or fiber band, a ship-to location of the yarn or fiber band, a manufacturer of an article comprising the standard fibers, a manufacture site of the article, a manufacturing line of the article, a production run of the article, a production date of the article, a package of the article, a warehouse of the article, a customer of the article, or a ship-to location of the article.

H16. The method of embodiment H15, wherein the at least one supply chain component comprises the manufacturer of the yarn or fiber band and the customer of the yarn or fiber band.

H17. The method of embodiment 15, wherein the at least one supply chain component comprises the manufacturer of the yarn of fiber band and the ship-to location of the yarn or fiber band.

H18. The method of any of embodiments H1-H17, wherein the standard fibers comprise acrylic, modacrylic, aramid, nylon, polyester, polypropylene, rayon, polyacrylonitrile, polyethylene, PTFE, or cellulose acetate.

H19. The method of any of embodiments H1-H18, wherein the standard fibers are produced using at least one of dry spinning, solution spinning, melt spinning, electro spinning, gel spinning, multi-component spinning, melt blowing, and/or solution blowing; or the fibers are produced using at least one of dry spinning, solution spinning, melt spinning, electro spinning, gel spinning, and/or multi-component spinning; or the fibers are produced using at least one of dry spinning, solution spinning, and/or melt spinning.

H20. The method of any of embodiments H2-H19, wherein the identification fibers are produced using at least one of dry spinning, solution spinning, melt spinning, electro spinning, gel spinning, multi-component spinning, melt blowing, and/or solution blowing; or the fibers are produced using at least one of dry spinning, solution spinning, melt spinning, electro spinning, gel spinning, and/or multi-component spinning; or the fibers are produced using at least one of dry spinning, solution spinning, and/or melt spinning.

EXAMPLES

Sample Preparation for Fibers—Examples 1 and 2

The fibers were washed with ether solvent to remove the spin finish and dyed red. The fibers were then stretched across a frame and epoxied together to form a rigid rod of encapsulated fibers. The epoxied rod of fibers was cut perpendicular to the fiber axis to form a sample of 3 micron thickness. The sample was placed endwise on a microscope slide with cover plate and observed and photographed under a microscope.

Sample Preparation for Filter Rods—Examples 3-16

25 g of Electron Microscopy Sciences® Epo-Fix low viscosity resin with 3 g of hardener were mixed together. To the mixture was added 0.5 mL of dye mixture (14 g of ORCO® Orcocil Red B dye in 760 mL of ethanol). The mixture was stirred slowly until it was homogeneous. A 1.5-mL micro centrifugation tube was filled to ¾ capacity with the epoxy mixture. A 10 mm thick specimen from a filter rod was cut and placed on top of the epoxy. The filter was allowed to absorb the epoxy and the tube was placed in a tray and left in a controlled laboratory environment for up to 12 hours to allow the epoxy mixture to harden and embed the filter rod specimen. The specimen was removed from the tube by pitching the bottom of the tube with pliers.

The specimen was placed in a vice and a jeweler's saw was used to cut the specimen to a size suitable for the polishing chuck. The specimen was polished using the Allied MultiPrep polishing system with the following media and rotation speed sequence.
  (1) 600 grit silicon carbide at 200 rpm
  (2) 800 grit silicon carbide paper at 125 rpm
  (3) Pan-B polishing mat with 6 micron diamond suspension at 100 rpm
  (4) Pan-B polishing mat with 3 micron diamond suspension at 75 rpm
  (5) Pan-B polishing mat with 1 micron diamond suspension at 50 rpm
  (6) Final-A polishing mat with 0.5 micron diamond suspension at 30 rpm The diamond suspensions were in polycrystalline glycol. After each polishing step, the specimen was rinsed with water, dried under nitrogen, and visually inspected using a compound microscope to ensure that the scratches from the previous step were sufficiently removed.

Image analysis of the polished specimen was generated by the following technique. The polished specimen was placed on an Olympus MZ-130×85 motorized microscope stage. Either the 5× or 10× magnification setting was activated. BX61 STREAM Motion system software was opened. The "Define MIA scanning area with stage" function in the software's "Process Manager" was used to identify the top left and bottom right corners of the polished specimen. Each frame was focused as indicated by the software, the image collection process was run, and the data was saved. The software can be used to produce a single stitched image of the full filter rod cross-section.

Example 1

A cellulose acetate yarn was produced with three different filament sizes. A single 19-hole spinneret contained the three differently sized holes. The 7 medium-size holes represented 36.8% of the total number of spinneret holes. The 6 large size holes were 1.32 times the area of the medium-size holes and represented 31.6% of the spinneret holes. The 6 small size holes were 0.67 times the area of the medium-size holes and represented 31.6% of the spinneret holes.

The yarn was produced using the above-described spinneret with typical production conditions for acetate yarn. Multiple plies of the yarn were wound to produce a fiber band with several hundred filaments. The sample of the fibers was prepared according to the sample preparation method discussed above. A representative photomicrograph of the cross-sections is shown in FIG. 1. The areas of 275 individual filament cross-sections were measured. The filament areas were grouped into bins to produce a filament area distribution.

The measured filament area distribution was fit with the sum of three independent Gaussian distributions using the Solver function in Microsoft EXCEL. The mean, standard deviation, and a scalar (amplitude factor) were determined for each of the three Gaussian distributions with the constraint that the three scalars summed to 1.0. Area measurements and statistical analysis for the fibers produced from small size holes, medium-size holes, and large size holes are given in Table 1 under columns labeled 1, 2, and 3 respectively. Pair-wise t-tests showed that the three Gaussian distributions are significantly different at the 99% confidence level. For each Gaussian distribution, 'n' was taken to be the corresponding scalar times the total number of filaments. This statistical analysis is summarized in Table 1.

These results show that filaments of different sizes can be produced from the same spinneret and can be recognized as significantly different by routine image analysis.

TABLE 1

Parameters and statistical comparison of optimized Gaussian distributions for Example 1

|  | 1 | 2 | 3 |
|---|---|---|---|
| Mean | 0.587 | 1.003 | 1.406 |
| Standard Deviation | 0.094 | 0.092 | 0.099 |
| Scalar | 0.364 | 0.335 | 0.301 |
| 'n' = scalar × 275 | 100 | 92 | 82 |
| Statistical comparison | #2 - #1 | #3 - #2 | #3 - #1 |
| t-statistic | 31.07 | 27.60 | 56.75 |
| Degrees of freedom | 190 | 172 | 180 |
| t-critical, 95% | 1.97 | 1.97 | 1.97 |
| t-critical, 99% | 2.60 | 2.60 | 2.60 |

Example 2

A cellulose acetate yarn was produced using a 19 hole spinneret with triangle, circle, and square holes. FIG. 2 gives a photomicrograph showing the cross-section shapes of the fibers.

Example 3

Taggant spinnerets were manufactured with the same hole pattern and hole size as is typically used to produce an acetate tow item with a nominal 3.0 filament denier and 32,000 total denier. Each taggant spinneret had 20 round holes and 20 square holes with the remaining holes all being triangles as typically used to make tri-lobal or "Y" cross section fibers. One taggant spinneret was installed on an acetate tow production line to produce a nominal 3.0 filament denier and 32,000 total denier band which corresponds to 11,160 filaments. The number of spinneret holes with taggant cross-section shapes and total number of spinneret holes is given in Table 2. The tow was produced, conditioned, and baled using standard manufacturing conditions.

Filter rods were produced from the tow on an AF4/KDF4 plug maker at a tape speed of 600 m/m. The rod length was 120 mm. The combined weight of the paper and glue was 91 mg/rod, and the plasticizer weight was 44 mg/rod. Table 3 shows the average tow weight, pressure drop, and circumference, as well as the standard deviation, for 30 filter rods of each Example. FIG. 3 shows a stitched image of a full filter rod cross-section with an expanded region; the filter rod was made with acetate tow from Example 3. All 40 taggant fibers were counted in the filter rod.

TABLE 2

The number of each of two taggant cross-section shapes in each Example

| Example | Taggant spinnerets | Number of holes | | | |
|---|---|---|---|---|---|
| | | Round | Square | Triangle | Total |
| 3 | 1 | 20 | 20 | 11,120 | 11,160 |
| 4 | 2 | 40 | 40 | 11,080 | 11,160 |
| 5 | 3 | 60 | 60 | 11,040 | 11,160 |
| 6 | 4 | 80 | 80 | 11,000 | 11,160 |
| 7 | 5 | 100 | 100 | 10,960 | 11,160 |
| 8 | 6 | 120 | 120 | 10,920 | 11,160 |
| 9 | 7 | 140 | 140 | 10,880 | 11,160 |
| 10 | 8 | 160 | 160 | 10,840 | 11,160 |
| 11 | 0 | 0 | 0 | 11,160 | 11,160 |

TABLE 3

Properties of filter rods comprising identification fibers

| Sample | Tow Weight, MG | | Pressure Drop, mm w.g. | | Circumference, mm | |
|---|---|---|---|---|---|---|
| | Average | Std. Dev. | Average | Std. Dev. | Average | Std. Dev. |
| 3 | 550.6 | 5.5 | 316.5 | 6.4 | 24.27 | 0.04 |
| 4 | 554.8 | 4.5 | 316.5 | 5.6 | 24.28 | 0.05 |
| 5 | 555.1 | 7.0 | 317.7 | 7.2 | 24.28 | 0.04 |
| 6 | 558.4 | 5.7 | 314.3 | 5.9 | 24.29 | 0.03 |
| 7 | 552.6 | 5.9 | 315.1 | 7.1 | 24.29 | 0.05 |
| 8 | 550.5 | 5.2 | 315.6 | 6.1 | 24.28 | 0.04 |
| 9 | 556.2 | 6.5 | 318.9 | 6.2 | 24.29 | 0.04 |
| 10 | 553.3 | 4.9 | 311.5 | 5.2 | 24.29 | 0.03 |
| 11 | 552.8 | 5.3 | 320.0 | 7.2 | 24.28 | 0.04 |
| Average | 553.8 | | 316.2 | | 24.28 | |
| Std. Dev. | 2.6 | | 2.5 | | 0.01 | |

Examples 4-11

Example 3 was repeated using the number of taggant spinnerets and corresponding number of holes as given in Table 2. Example 11 used no taggant spinnerets. The number of taggant fibers were also counted in a filter rod made from Example 4 and all of the expected taggant fibers were detected.

The average weight, pressure drop, and circumference of the filter rods made using the acetate tow from each of the examples is given in Table 3. The average weight and pressure drop for each of the 9 Examples are within two-sigma of the grand averages which indicates that inclusion of the identification fibers produced using round and square spinneret holes did not have a statistically significant effect on the measured rod properties.

Example 12

An acetate yarn sample was produced with a single spinneret having 19 flattened round holes. The taggant yarn sample was wound onto a package. The yarn sample was withdrawn from its package and fed into a tow band prior to crimping. The cellulose acetate tow was a typical commercial, "Y" cross section tow item with a nominal 3.0 filament denier and 32,000 total denier.

The tow sample with the taggant yarn was produced, conditioned, and baled using the same manufacturing conditions as normally used for the tow item. Filter rods were produced from the tow on an AF4/KDF4 plug maker at a tape speed of 600 m/m. The rod length was 120 mm. The combined weight of the paper and glue was 91 mg/rod, and the plasticizer weight was 44 mg/rod.

A sample of a filter rod from each Example was prepared for analysis by the analytical procedure described above. All 19 taggant filaments included in the tow band were identified in the sample.

Examples 13-16

Example 12 was repeated using hexagon, pentagon, "D", and circle shaped spinneret holes, respectively. The yarns of Example 16 were dyed red. All 19 taggant filaments included in each tow band were identified in the sample of the corresponding filter rod. FIG. 4 shows the spinneret hole shapes in the fiber images made from each of the hole shapes for Examples 12-15.

Examples 12-16 show the ability to insert taggant yarns with different cross-section shapes into a tow band and successfully identify the taggant yarns in a filter rod.

Figure 5B:
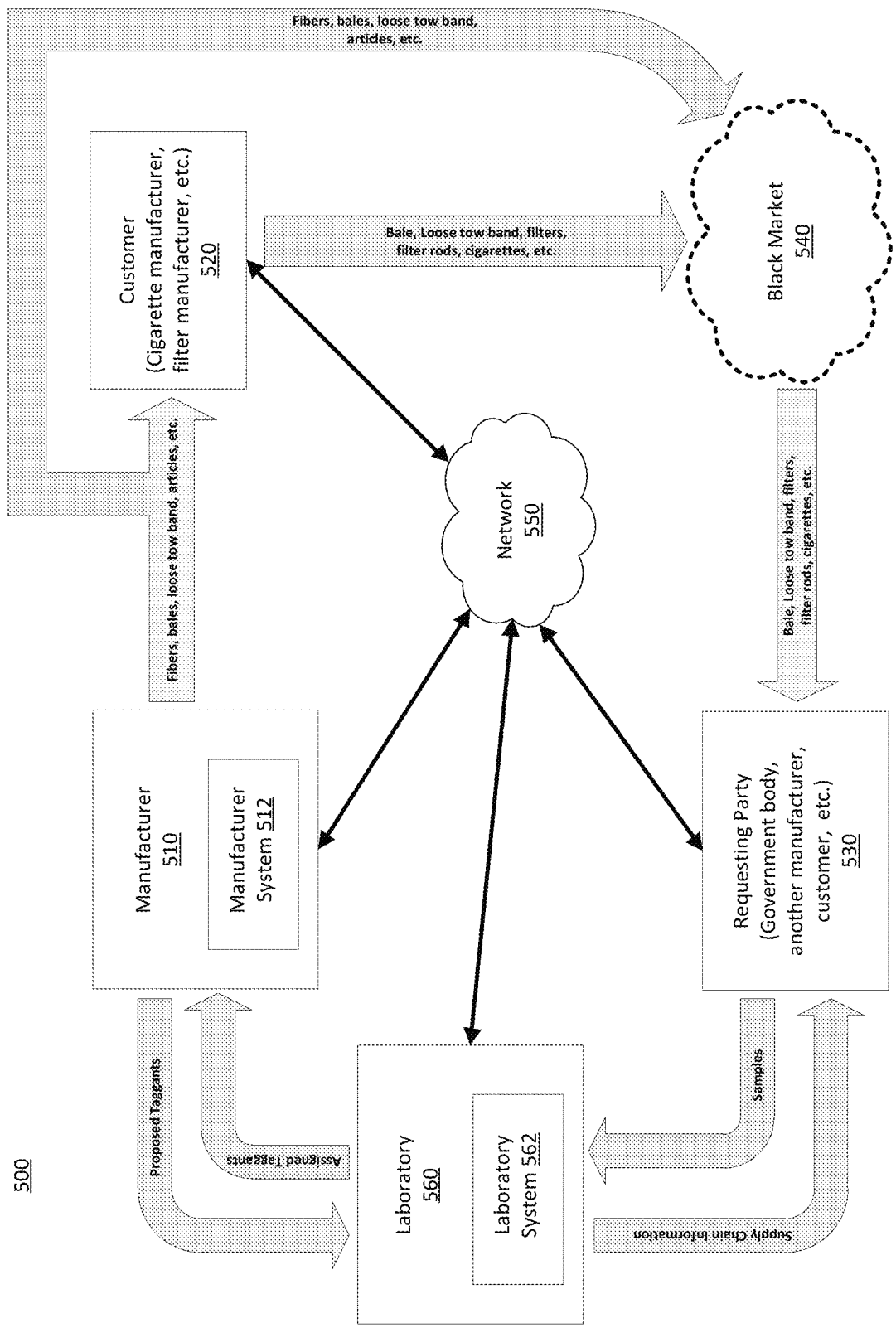

FIGS. 5A and 5B illustrate non-limiting examples of an environment 500 depicting communication and shipping channels among entities consistent with disclosed embodiments. In one embodiment, environment 500 of FIGS. 5A and 5B may include one or more manufacturers 510, one or more customers 520, a black market 540 or other illicit trade network, one or more requesting parties 530, one or more laboratories 560, and communication network 550. The components and arrangement of the components included in environment 500 (e.g., as illustrated in FIGS. 5A and 5B) may vary. Thus, environment 500 may include other components that perform or assist in the performance of one or more processes consistent with the disclosed embodiments.

In some aspects, network 550 may be any type of network configured to provide communication means between systems of components of environment 500 (e.g., manufacturing system 512 and/or laboratory system 562). For example, network 550 may be any type of network (including infrastructure) that facilitates communications, exchanges information, etc., such as the Internet, a Local Area Network, near field communication, and/or other suitable connection(s) that enables the sending and receiving of information between the component systems associated with environment 500. In other embodiments, one or more component systems of environment 500 may communicate directly through a dedicated communication link(s), such as links between manufacturer 510, customer 520, requesting party 530, and/or laboratory 560.

Further, and as stated above, manufacturers (e.g., manufacturer 510) may produce cellulose acetate fibers and fiber products that incorporate the cellulose acetate fibers on an industrial scale. In some embodiments, the produced cellulose acetate fibers and fiber products may include standard fibers and identification fibers. Each of the identification fibers exhibits one or more distinct features (e.g., distinct cross-section sizes, and additionally or alternatively, distinct cross-section shapes) that visually distinguish the identification fibers from the standard fibers. In additional aspects, the identification fibers may include groups of distinguishable identification fibers that exhibit the same distinct feature or the same combination of the distinct features. Further, in some aspects, each of the groups may be associated with a corresponding number of the distinguishable identification fibers, defined as the fiber count which may correspond to a taggant fiber count. In some aspects a number of taggant fiber counts may be associated with each group of the distinguishable identification fibers may.

In some embodiments, the inclusion of identification fibers in the cellulose acetate fibers may enable manufacturer 510 to tag the cellulose acetate fibers, and thus, the fiber products that include the cellulose acetate fibers, with supply chain information prior to shipment to customers 520. By way of example, fiber products consistent with the disclosed embodiments may include, but are not limited to, cellulose acetate tow, loose bands of cellulose acetate tow, bales of cellulose acetate tow, and fabrics and other articles that include the cellulose acetate fibers and/or tow.

For example, and in the context of cigarette manufacturing, customer 520 may use a bale of acetate tow to produce various intermediate and/or final stage products (e.g., loose tow band, filter rods, filters, and/or cigarettes) and a fraction of these products can ultimately find their way onto the black market (e.g., black market 440). Thus, because supply chain information can be determined from a sample of any black market product having tagged identification fibers, a party interested in combating illicit trade (e.g., requesting party 530) may obtain a black market product and submit a sample for analysis in order to identify supply chain information associated with the black market product.

Thus, in one embodiment, requesting party 530 may provide the sample to manufacturer 510, as depicted in FIG. 5A. Manufacturer 510 may, in certain aspects, analyze the sample to identify at least one component of a supply chain associated with the sample. For example, the sample may include standard and identification fibers, and in some instances, manufacturer 510 may analyze the sample using any of the exemplary techniques outlined above.

Based on the analysis, manufacturer 510 may identify groups of distinguishable identification fibers that exhibit corresponding distinct features or combinations of distinct features. As noted above, the distinct features include, but are not limited to, cross-section size and/or cross-section shape. Manufacturer 510 may also identify the fiber count, the number of identification fibers in each of the groups of distinguishable identification fibers. Manufacturer 510 may also establish a number of taggant fiber counts for the exhibited groups of distinguishable identification fibers that, in some instances, represent the number of the taggant fiber count alternatives available for each group of the distinguishable identification fibers.

In certain aspects, manufacturer 510 may access correlation data mapping components of the supply chain to the exhibited distinct features, combinations of distinct features and/or the established taggant fiber counts. Manufacturer 510 may identify the at least one component of the supply chain based on, for example, a comparison of the exhibited distinct features, combinations of distinct features and/or the established taggant fiber counts to the accessed correlation data. In some instances, manufacturer 510 may transmit information identifying the at least one supply chain component to requesting party 530 (e.g., across network 550).

In further embodiments, the accessed correlation data may map the supply chain components to not only the exhibited distinct features, combinations of distinct features, the taggant fiber counts, but also to a number of taggant fiber counts for each group of distinguishable identification fibers. Thus, in some aspects, manufacturer 510 may also establish (i.e., count) the number of the distinguishable identification fibers included within each of the groups and determine the corresponding taggant fiber count, and may identify the at least one component of the supply chain based on, for example, a comparison of the exhibited distinct features, combinations of distinct features, the established taggant fiber counts, and/or the number of taggant fiber count to the accessed correlation data.

Further, as noted above, the distinguishable identification fibers may include reference fibers having a corresponding reference cross-section shape and a corresponding reference cross-section size. The reference cross-section may, for example, represent an average effective diameter of at least a portion of the reference fibers, and in some aspects, the reference cross-section size may exceed, or alternatively, be smaller than, the cross-section sizes of each of the other distinguishable identification fibers in the sample. Thus, in an embodiment, manufacturer 510 may determine that a cross-section size of a first group of the distinguishable identification fibers is larger than or smaller than the cross-section sizes of each of the other groups of the distinguishable identification fibers (e.g., using any of the exemplary techniques described above), and may establish the first group of the distinguishable identification fibers as the reference fibers.

In further aspects, a number of the reference fibers within the sample may exceed the numbers of the distinguishable identification fibers within the other groups of distinguishable identification fibers. Thus, in an embodiment, manufacturer 510 may count the number of identification fibers included within each of the groups of distinguishable identification fibers, determine that the number of the distinguishable identification fibers included within a first groups of the distinguishable identification fibers exceeds the numbers of the distinguishable identification fibers within one or more of the other groups of distinguishable identification fibers, and based on the determination, establish the first group of distinguishable identification fibers as the reference fibers. For example, the number of reference fibers in the sample may exceed a sum of the numbers of the distinguishable identification fibers within each other of the groups of distinguishable identification fibers, and additionally or alternatively, the number of reference fibers may exceed a maximum of the numbers of the distinguishable identification fibers included within corresponding ones of the other groups of distinguishable identification fibers.

Furthermore, correlation data consistent with the disclosed embodiments may map the supply chain components to not only the exhibited distinct features, combinations of distinct features, the established taggant fiber counts, and/or the number of taggant fiber counts, but also to the number of reference fibers counted within the sample. Thus, in some aspects, manufacturer 510 may identify the at least one component of the supply chain based on, for example, a comparison of the exhibited distinct features and combinations of distinct features, the established taggant fiber counts, the number of taggant fiber counts and/or the number of reference fibers counted within the sample to the accessed correlation data.

In the exemplary embodiments described above, manufacturer 510 may analyze the sample to identify at least one component of a supply chain associated with the sample. The disclosed embodiments are, however, not limited to exemplary analyses conducted by manufacturer 510, and in further embodiments, customer 520, requesting party 530, or a third-party (not shown) may conduct the analysis for identifying supply chain information from tagged fibers.

For example, as illustrated in FIG. 5B, a laboratory 560 may act on behalf of requesting party 530 and perform the analysis on the sample to identify the at least one supply chain component associated with the sample. In some instances, laboratory 560 may represent a governmental entity, a quasi-governmental entity, or a private entity capable of performing the analysis, and requesting party 530 may contract with or retain laboratory 560 to perform the analysis on a one-time or recurring basis.

In other instances, however, laboratory 560 may be established by one of more of manufacturer 510, customers 520, and/or requesting party 530 in order to regularly and reliably identify supply chain components associated with samples taken from illicitly traded cellulose acetate fibers or fiber products that incorporate the cellulose acetate fibers (e.g., as obtained by requesting party 530 from black market 540). Laboratory 560 may, in certain aspects, perform the analysis of the sample in accordance with one or more procedures established by a manufacturer 510, customers 520, and/or requesting party 530. For example, one or more of manufacturer 510, customers 520, and/or requesting party 530 may collectively establish standardized procedures and protocols for receiving and handling samples, analyzing the samples to identify the supply chain components in an accurate and repeatable manner, and reporting portions of the identified supply chain components to manufacturer 510, customers 520, and/or requesting party 530. Further, in additional embodiments, laboratory 560 may also assign the distinct features, combinations of distinct features, the taggant fiber counts, and/or the number of taggant fiber counts to various components of the supply chain (e.g., manufacturers) to uniquely identify these supply chain components. In further embodiments, customer 520, requesting party 530, or a third-party (not shown) may assign this distinct features, the combinations of distinct features, the taggant fiber counts, and/or the number of taggant fiber counts to various components of the supply chain (e.g., manufacturers) to uniquely identify these supply chain components.

In one embodiment, as illustrated in FIG. 5B, requesting party 530 may provide the sample to laboratory 560. Laboratory 560 may, in certain aspects, analyze the sample to identify at least one component of a supply chain associated with the sample (e.g., a manufacturer). For example, using any of the exemplary techniques described above, laboratory 560 may analyze the sample to identify each of the groups of distinguishable identification fibers that exhibits the same distinct features and/or the same combination of distinct features, count a number of distinguishable identification fibers included within each of the groups (establishing the taggant fiber count for each group of distinguishable identification fibers), and additionally or alternatively, identify and count a number of reference fibers within the sample. Further, laboratory 560 may access correlation data, and using any of the exemplary techniques described above, identify the at least one supply chain component based on a comparison of the exhibited distinct features, combinations of distinct features, the established taggant fiber counts, the number of taggant fiber counts, and/or the number of reference fibers included within the sample to the accessed correlation data.

In additional embodiments, laboratory 560 may function as a centralized facility that assigns unique distinct features, combinations of distinct features (e.g., as exhibited by groups of distinguishable identification fibers), taggant fiber counts (e.g., representative of the number of fibers in each group of distinguishable identification fibers), and/or a number of taggant fiber counts (e.g., as representative of a number of the of alternative fiber counts) to various components of the supply chain (e.g., to manufacturer 510). For example, laboratory 560 may assign, to manufacturer 510, a particular taggant fiber count (e.g., a taggant fiber count of ten) and/or particular combinations of cross-section size and shape (e.g., large and small Y-shaped identification fibers, and large and small D-shaped identification fibers).

When exhibited by identification fibers included within cellulose acetate fibers and corresponding fiber products produced by manufacturer 510, the assigned combinations of cross-section size and cross-section shape and/or taggant fiber counts may uniquely represent manufacturer 510 and may enable laboratory 560 (and additionally or alternatively, any other entity within environment 500) to identify manufacturer 510 as a source of the fiber products using any of the analytical techniques described above. Further, laboratory 560 (and additionally or alternatively, any other entity within environment 500) may also establish and maintain data records (e.g., within a centralized database implemented using the exemplary computing systems outlined below) that identify a correlation between the various supply chain components (e.g., manufacturer 510) and corresponding ones of the assigned distinct features, combinations of distinct features, taggant fiber counts, and/or number of taggant fiber counts.

The disclosed embodiments are, however, not limited to the assignment of exemplary taggant fiber counts, cross-section sizes, and cross-section shapes to manufacturer 510. In further embodiments, laboratory 560 may assign any additional or alternate set or combinations of sets of distinct features to uniquely identify manufacturer 510. For example, laboratory 560 may assign one or more cross-section sizes and/or one or more cross-section shapes to manufacturer 510.

In certain aspects, laboratory 560 may establish a centralized repository for data and data records (e.g., using any of the exemplary computing systems outlined below) that correlate the various supply chain components (e.g., manufacturer 510) to corresponding ones of taggant fiber counts, distinct features, combinations of distinct features, and/or number of taggant fiber counts. Further, in other aspects, laboratory 560 may access the centralized repository and generate one or more reports specifying the taggant fiber counts, the distinct features, the combinations of distinct features, and/or the number of taggant fiber counts that uniquely identify at least one of the supply chain components (e.g., manufacturers). Laboratory 560 may, in some instances, generate the reports at predetermined intervals or in response to received requests (e.g., from requesting party 530, manufacturer 510, etc.), and may provide the generated reports to various parties and entities within environment 500 (e.g., across network 550).

In some embodiments, laboratory 560 may access the centralized repository to identify at least one supply chain component (e.g., manufacturer 510) associated with a distinct feature, combination of distinct features, taggant fiber counts, and/or number of taggant fiber counts determined by laboratory 560 (e.g., using any of the analytical techniques outlined above) and additionally or alternatively, obtained from any third party or other entity within environment 500. Further, and as described below, the centralized repository may enable laboratory 560 to determine whether proposed distinct features, combinations of distinct features, proposed taggant fiber counts, and/or proposed number of taggant fiber counts (e.g., as selected by manufacturer 510) are capable of uniquely representing fibers and fiber products of manufacturer 510 that are introduced into the supply chain.

In certain embodiments, laboratory 560 may receive proposed distinct features, combinations of distinct features (e.g., proposed cross-section sizes and/or cross-section shapes), proposed taggant fiber counts, and/or proposed number of taggant fiber counts from manufacturer 510. Laboratory 560 may, for example, compare the proposed distinct features, combinations of distinct features, proposed taggant fiber counts, and/or proposed number of taggant fiber counts against the established data records (e.g., within the centralized repository) to determine whether these proposed distinct features, combinations of distinct features, proposed taggant fiber counts, and/or proposed number of taggant fiber counts are capable of uniquely identifying manufacturer 510 (e.g., that the proposed distinct features, combinations of distinct features, proposed taggant fiber, pace that counts are assigned to no other supply chain components, such as another manufacturer). If the proposed distinct features, combinations of distinct features, proposed taggant fiber counts, and/or proposed number of taggant fiber counts could uniquely represent manufacturer 510, laboratory 560 may assign the proposed distinct features, combinations of distinct features, proposed taggant fiber counts, and/or proposed number of taggant fiber counts to manufacturer 510, update the data records to reflect the assignment, and provide confirmation of the assignment to manufacturer 510 (e.g., between computing systems of laboratory 560 and manufacturer 510 across network 550).

Alternatively, if laboratory 560 previously assigned the proposed distinct features, combinations of distinct features, proposed taggant fiber counts and/or proposed number of taggant fiber counts to another manufacturer (or the proposed distinct features, combinations of distinct features, proposed taggant fiber counts, and/or proposed number of taggant fiber counts are inappropriate to represent manufacturer 510), laboratory 560 may assign alternate distinct features, combinations of distinct features, alternate taggant fiber counts, and/or alternative number of taggant fiber counts to manufacturer 510, update the data records to reflect the alternate assignment, and provide confirmation of the alternate assignment to manufacturer 510. In other aspects, laboratory 560 could provide, to manufacturer 510, an indication of the assignment of the proposed distinct features, combinations of distinct features, taggant fiber counts, and/or number of taggant fiber counts to another manufacturer, and request that manufacturer 510 propose additional distinct features, combination of distinct features, taggant fiber counts, and/or number of taggant fiber counts for assignment by laboratory 560, as described above.

In certain aspects, upon confirmation of the assignment, manufacturer 510 may obtain and/or produce identification fibers that exhibit the assigned distinct features, combinations of distinct features, the taggant fiber counts, number of taggant fiber counts. For example, the obtained or produced identification fibers may include groups of distinguishable identification fibers that exhibit the assigned distinct features or combinations of distinct features and further, are present in the fiber counts that correspond to the assigned taggant fiber counts.

In other aspects, however, manufacturer 510 may further correlate the assigned distinct features, combinations of distinct features, the taggant fiber counts, and/or number of taggant fiber counts to one or more upstream components of the supply chain (e.g., a manufacture site, a manufacturing line, a production run, a production date, a bale) and/or various downstream components of the supply chain (e.g., a warehouse, a customer, a ship-to location, etc.). For example, manufacturer 510 may further specify fiber counts, in combination with the assigned distinct features, combinations of distinct features, taggant fiber counts, and/or number of taggant fiber counts uniquely represent a particular customer within the supply chain (e.g., customer 520).

The disclosed embodiments are, however, not limited to techniques that enable manufacturer 510 to correlate customer 510 to assigned distinct features, combinations of distinct features, taggant fiber counts, and/or number of taggant fiber counts. In further embodiments, manufacturer 510 may specify any additional or alternate taggant information (e.g., numbers of reference fibers, etc.) to represent other upstream or downstream supply components (or combinations thereof) in conjunction with the assigned distinct features, combinations of distinct features, taggant fiber counts, and/or number of taggant fiber counts.

In some aspects, while laboratory 560, or another entity, may maintain information linking manufacturer 510 to assigned distinct features, combinations of distinct features, taggant fiber counts, and/or number of taggant fiber counts manufacturer 510 may hold confidential additional taggant information (e.g., fiber counts, numbers of reference fibers, non-assigned taggant fiber counts, etc.) that links identification fibers, and thus fiber products produced by manufacturer 510, to other upstream and downstream components of the supply chain. The confidentiality of the additional taggant information may, in certain instances, enable manufacturer 510 to prevent laboratory 560 from identifying customers (e.g., customer 520), ship-to locations, warehouses, and other internal supply chain components (e.g., manufacture site or line, and production run or date) associated with manufacturer 510.

The embodiments described above identify particular combinations of taggant information that correlate to a specific component of a supply chain and, when exhibited in identification fibers of a sample, enable a laboratory, a manufacturer, or other entities to identify the specific supply chain component associated with the sample. One of ordinary skill in the art would, however, understand that the disclosed embodiments are not limited to the particular combinations or taggant information outlined above, and in further embodiments, specific supply chain components may be correlated with any additional or alternate physical, chemical, and/or optical characteristic exhibited by the identification fibers. Moreover, while not depicted in FIGS. 5A and 5B, one of skill in the art would understand that entities associated with environment 500 (shown and not shown) may employ one or more warehouses to store raw materials, intermediate products, final stage products, etc. in conducting operations consistent with disclosed embodiments.

Figure 6:
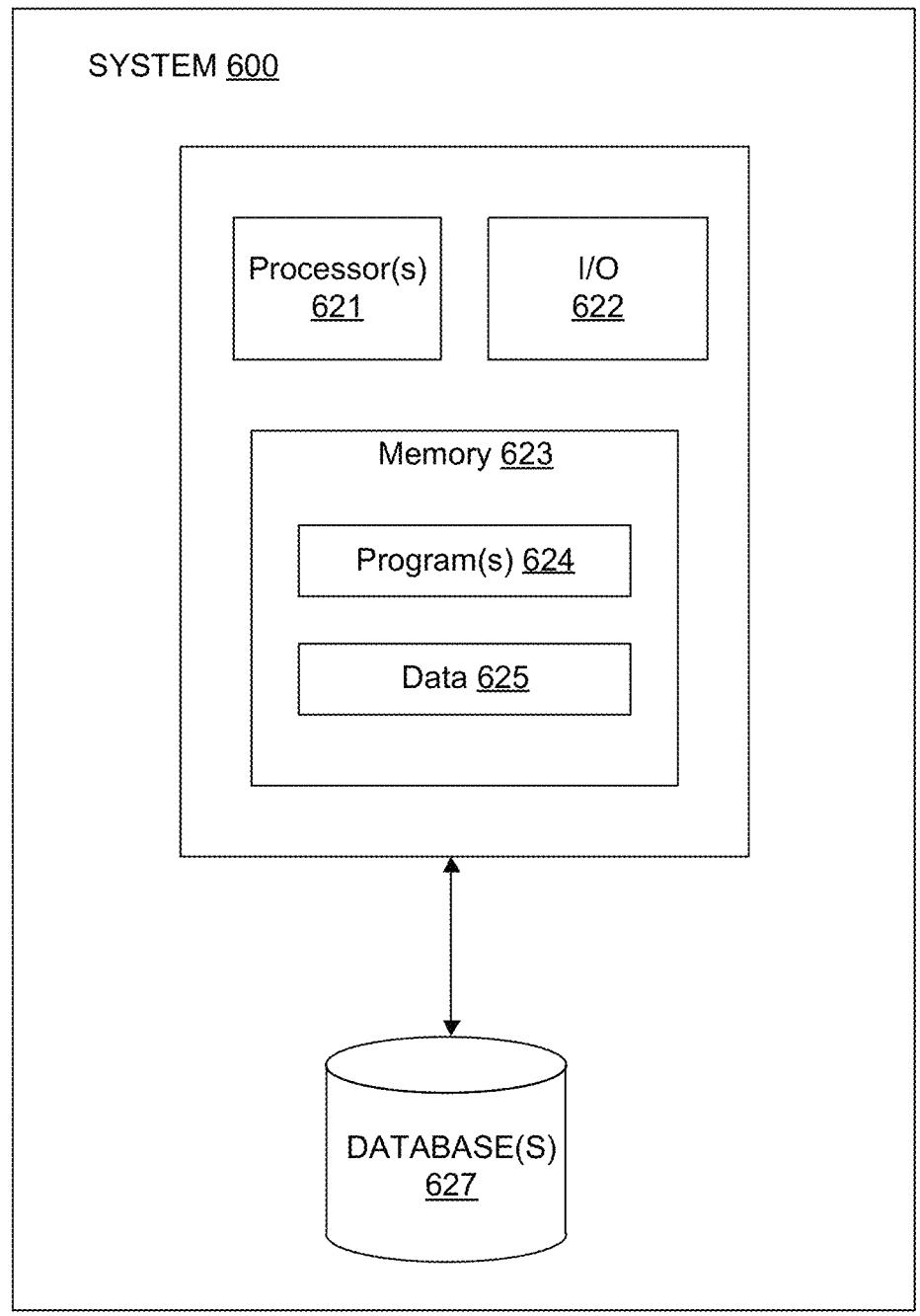
FIG. 6 illustrates a non-limiting example of a computing system used by one or more entities consistent with disclosed embodiments.

FIG. 6 illustrates a non-limiting example of a computing system 600 used by one or more entities consistent with disclosed embodiments. Variations of exemplary system 600 may be used by manufacturer 510 (e.g., as manufacturer system 512), customer 520, requesting party 530, and/or laboratory 560 (e.g., as laboratory system 562). In one embodiment, system 600 may comprise one or more processors 621, one or more input/output (I/O) devices 622, and one or more memories 623. In some embodiments, system 600 may take the form of a server, mainframe computer, or any combination of these components. In some embodiments, system 600 may take the form of a mobile computing device such as a smartphone, tablet, laptop computer, or any combination of these components. Alternatively, system 600 may be configured as a particular apparatus, embedded system, dedicated circuit, and the like based on the storage, execution, and/or implementation of the software instructions that perform one or more operations consistent with the disclosed embodiments.

Processor 621 may include one or more known processing devices, such as mobile device microprocessors or any various other processors. The disclosed embodiments are not limited to any type of processor(s) configured in system 600.

Memory 623 may include one or more storage devices configured to store instructions used by processor 624 to perform functions related to the disclosed embodiments. For example, memory 623 may be configured with one or more software instructions, such as program(s) 624 that may perform one or more operations consistent with disclosed embodiments when executed by processor 621. The disclosed embodiments are not limited to separate programs or computers configured to perform dedicated tasks. For example, memory 623 may include a single program 624 that performs the functions of system 600, or program 624 may comprise multiple programs. Memory 623 may also store data 625 that is used by one or more programs 612, such as correlation data mapping distinct features to one or more components of the supply chain information.

I/O devices 622 may be one or more devices configured to allow data to be received and/or transmitted by system 600. I/O devices 622 may include one or more digital and/or analog devices that allow components of environment 500 to communicate with other machines and devices, such as other components of environment 500. For example, I/O devices 622 may include a screen for displaying messages, distinct feature information, supply chain information, or providing other information to the user, such as an employee of manufacturer 510, customer 520, requesting party 530, and/or laboratory 560. I/O devices 622 may also include one or more digital and/or analog devices that allow a user to interact with system 600 such as a touch-sensitive area, keyboard, buttons, or microphones. I/O devices 622 may also include other components known in the art for interacting with a user.

The components of system 600 may be implemented in hardware, software, or a combination of both hardware and software, as will be apparent to those skilled in the art. For example, although one or more components of system 600 may be implemented as computer processing instructions, all or a portion of the functionality of system 600 may be implemented instead in dedicated electronics hardware.

System 600 may also be communicatively connected to one or more database(s) 627. System 600 may be communicatively connected to database(s) 627 through network 550. Database 627 may include one or more memory devices that store information and are accessed and/or managed through system 600. By way of example, database(s) 627 may include Oracle™ databases, Sybase™ databases, or other relational databases or non-relational databases, such as Hadoop sequence files, HBase, or Cassandra.

The databases or other files may include, for example, data and information related to distinct features, supply chain information, correlation data mapping the distinct features to the supply chain information, data indicative of distinct features assigned to the supply chain information, etc. For example, the databases and other files may include correlation data mapping the supply chain components to distinct features, combinations of distinct features, taggant fiber counts, number of taggant fiber counts, and/or numbers of reference fibers included in fiber samples, as described above. Further, by way of example, the databases and other files may also include distinct features, combinations of the distinct features, the taggant fiber counts, number of taggant fiber counts, and/or the numbers of reference fibers included in fiber samples assigned to supply chain components by laboratory 560, as outlined above.

Systems and methods of disclosed embodiments, however, are not limited to separate databases. In one aspect, system 600 may include database 627. Alternatively, database 627 may be located remotely from the system 600. Database 627 may include computing components (e.g., database management system, database server, etc.) configured to receive and process requests for data stored in memory devices of database(s) 627 and to provide data from database 627.

Although the above description has designated laboratory 560 as the entity assigning various taggants, in other aspects, manufacturer 510, customer 520, requesting party 530 or a third-party entity not shown may be the one assigning taggants for identification fibers. Furthermore, as seen from FIGS. 5A and 5B, although the description has focused on cellulose acetate tow and the black market associated with cigarette filters, the embodiments clearly apply to fibers of any material and any article subject to illicit trade.

Figure 7:
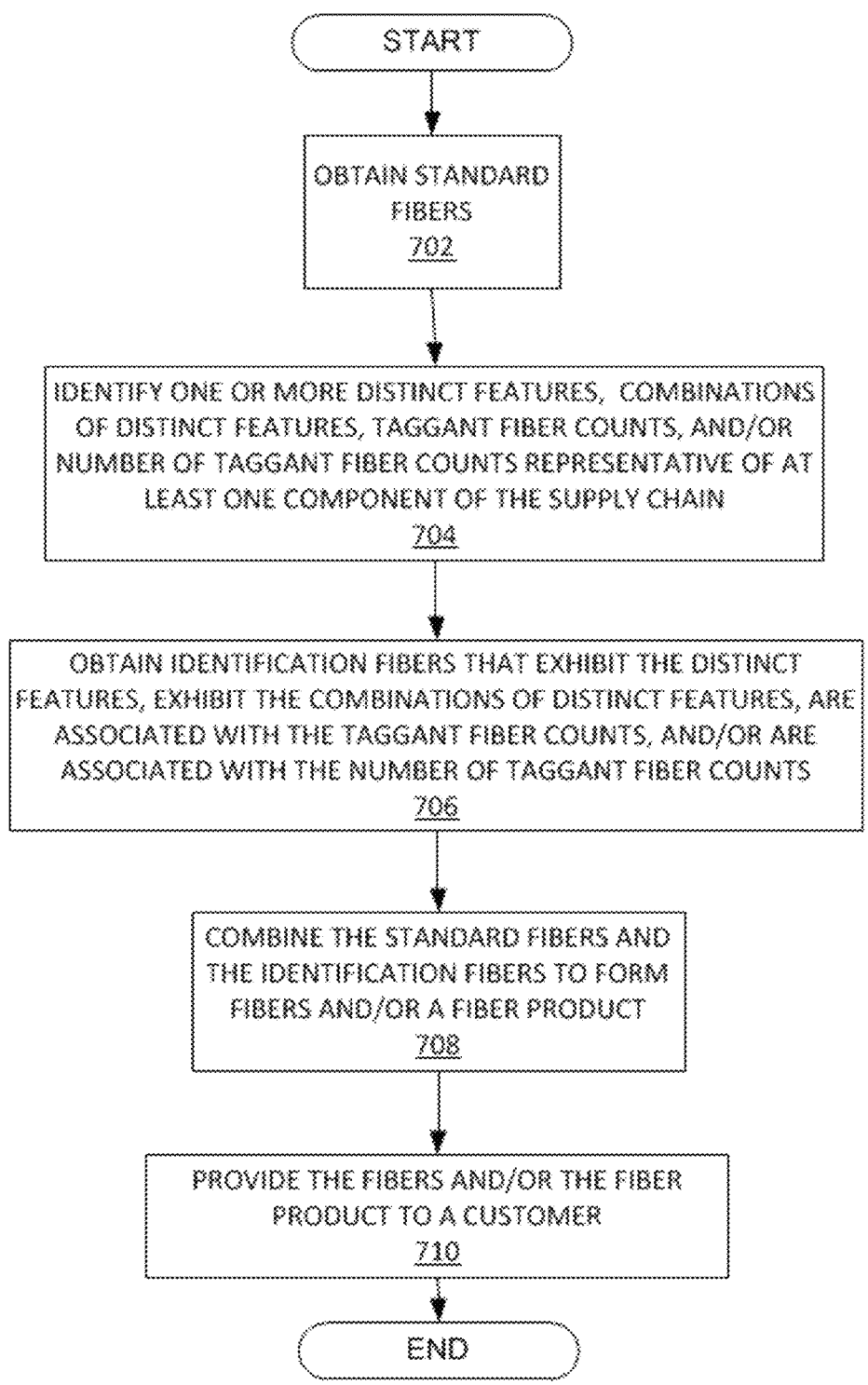
FIG. 7 illustrates a non-limiting example of a process for embedding supply chain information into fibers.

FIG. 7 illustrates a non-limiting example of a process for embedding supply chain information into fibers, as seen and described above with respect to disclosed embodiments.

Figure 8:
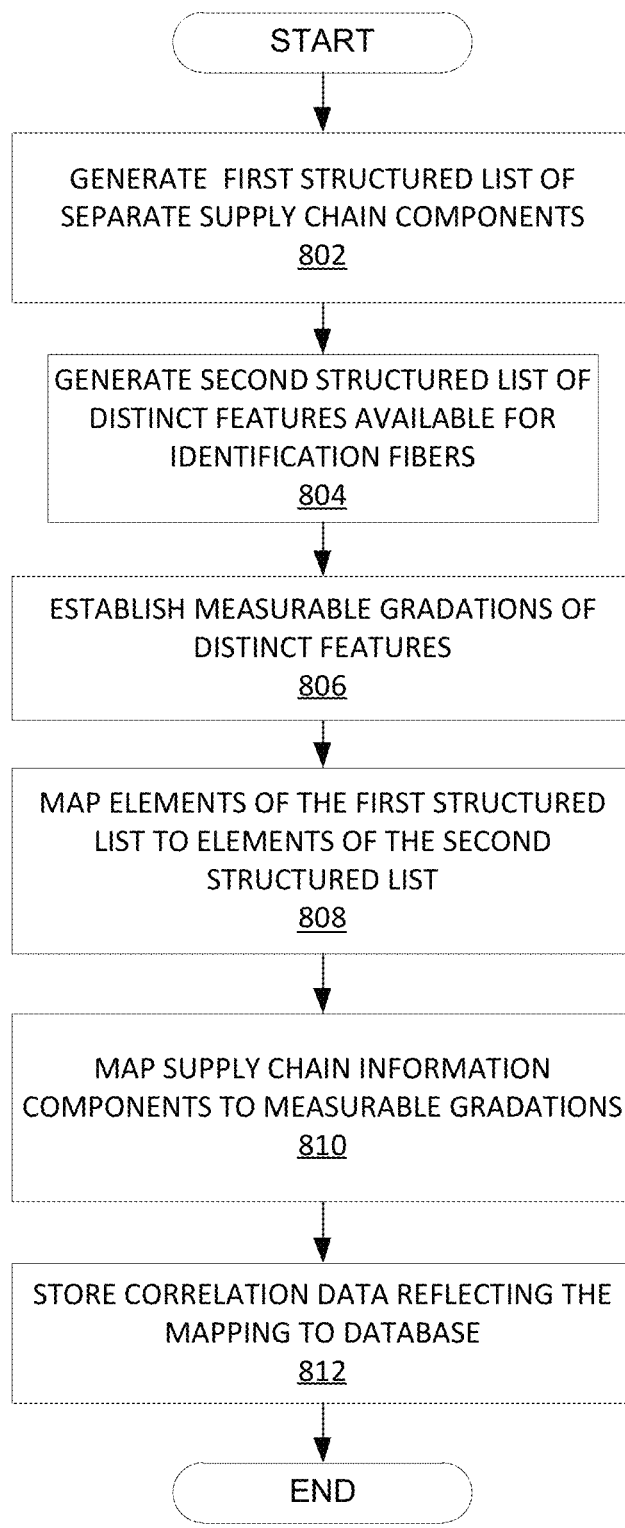
FIG. 8 illustrates a non-limiting example of a process for generating correlation data mapping distinct features to supply chain information.

FIG. 8 illustrates a non-limiting example of a process for generating correlation data, as seen and described above with respect to disclosed embodiments. For example, as described in FIG. 8, manufacturer 510 (and additionally or alternatively, laboratory 560) may generate a first structured list of the supply chain components having one or more corresponding attributes, and may generate a second structured list of the distinct features. In some aspects, manufacturer 510 may establish measurable gradations of the distinct features included in the second structured list, and further, may map (i) elements of the first structured list to elements of the second structured list and (ii) the attributes of the supply chain components to the established measurable gradations. Manufacturer 510 may, in additional aspects, store correlation data (e.g., in database 627) reflecting the mapping of the elements of the first and second structured lists and the mapping of the supply attributes of the supply chain components to the established measurable gradations.

Figure 9:
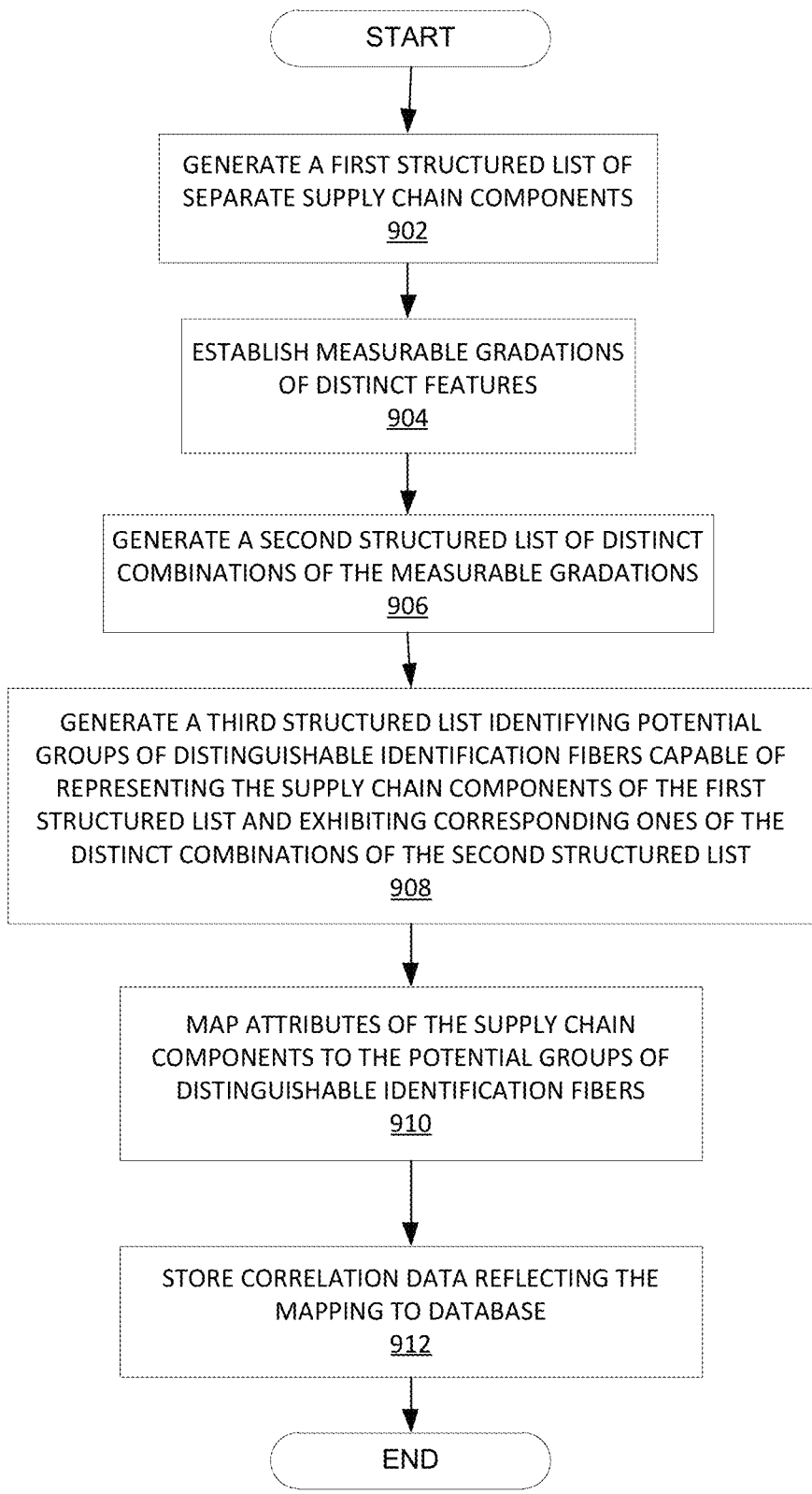
FIG. 9 illustrates a non-limiting example of a process for generating correlation data mapping distinct features to supply chain information.

FIG. 9 illustrates an additional non-limiting example of a process for generating correlation data, as seen and described above with respect to disclosed embodiments. For example, as described in FIG. 9, laboratory 560 (and additionally or alternatively, manufacturer 510) may generate a first structured list of components of the supply chain. In one instance, the supply chain components may represent one or more corresponding attributes. Laboratory 560 may also establish measurable gradations in the distinct features, and may generate a second structured list comprising distinct combinations of the established measurable gradations of the distinct features. In some aspects, laboratory 560 may generate a third structured list identifying potential groups of the distinguishable identification fibers that exhibit corresponding ones of distinct features or combinations of the distinct features included within the third structured list. The potential groups of the distinguishable identification fibers may, for example, be capable of representing the supply chain components included within the first structured list. Laboratory 560 may further map the attributes of the supply chain components to the potential groups of the distinguishable identification fibers, and store correlation data (e.g., in database 627) reflecting the mapping of the attributes of the supply chain components to the potential groups of the distinguishable identification fibers.

Figure 10:
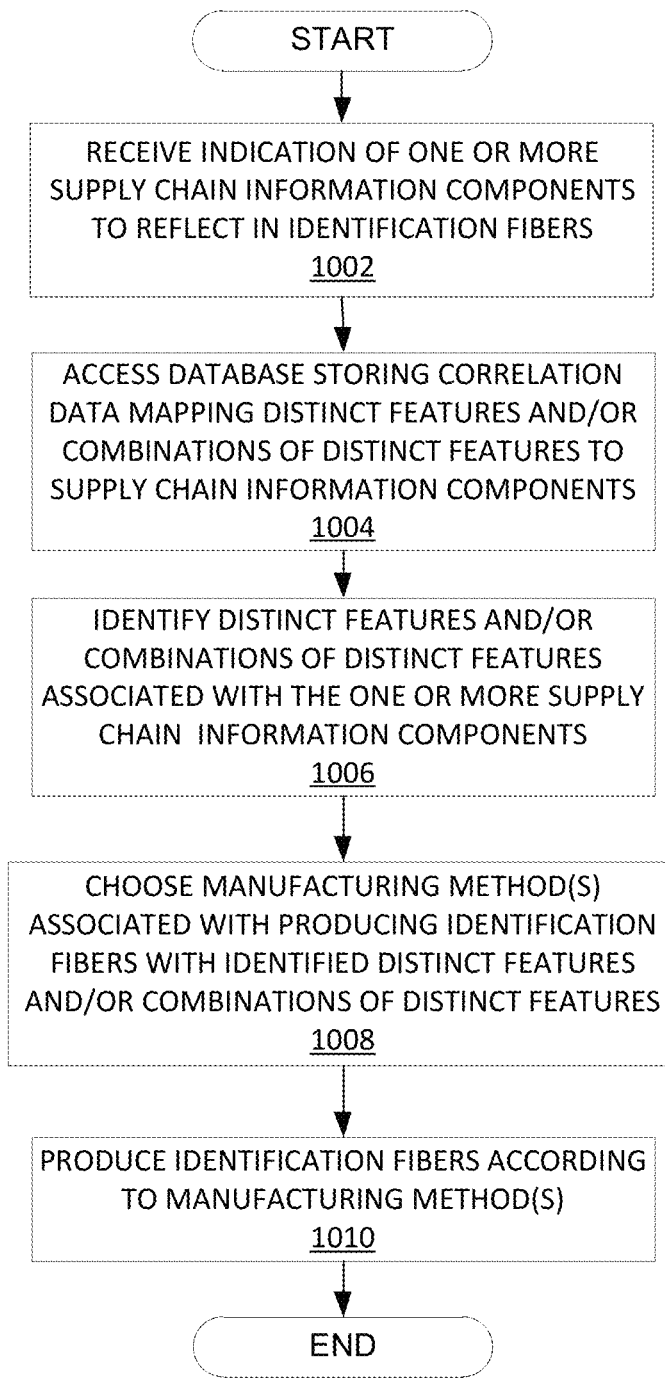
FIG. 10 illustrates a non-limiting example of a process for producing identification fibers.

FIG. 10 illustrates a non-limiting example of a process for producing identification fibers, as seen and described above with respect to disclosed embodiments.

Figure 11:
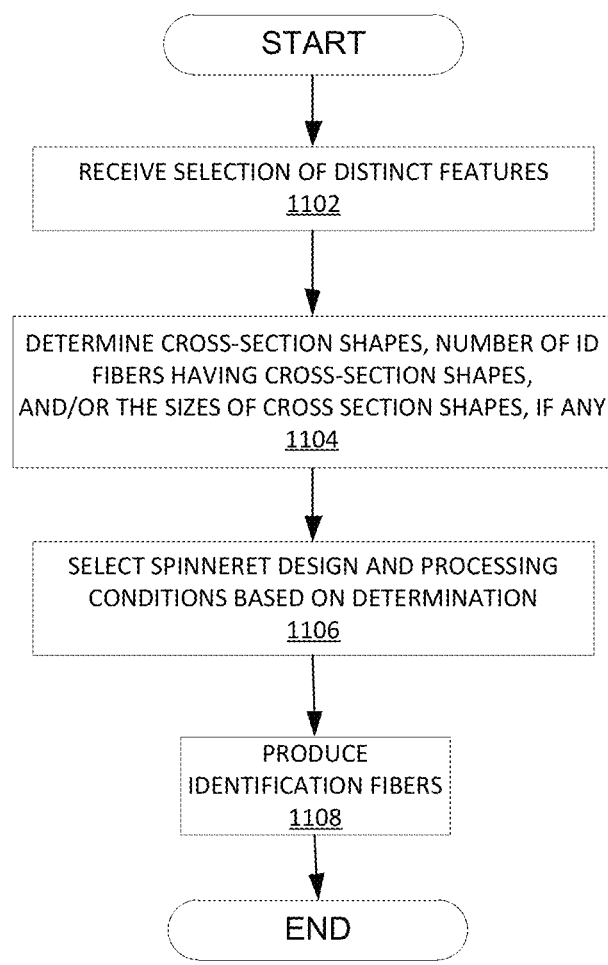
FIG. 11 illustrates a non-limiting example of a process for choosing one or more manufacturing methods for producing identification fibers.

FIG. 11 illustrates a non-limiting example of a process for choosing one or more manufacturing methods, as seen and described above with respect to disclosed embodiments.

Figure 12:
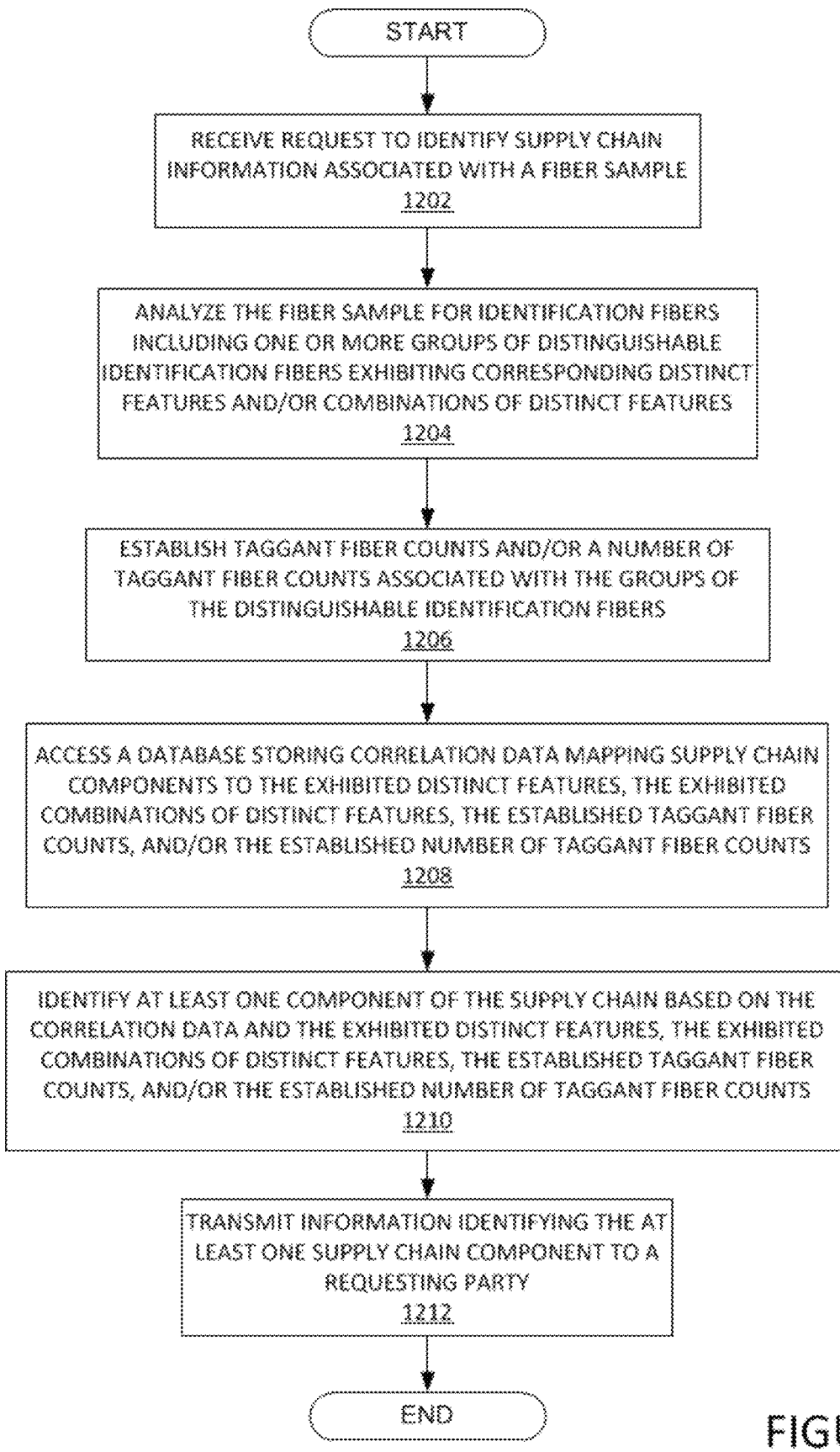
FIG. 12 illustrates a non-limiting example of a process for identifying supply chain information from a sample.

FIG. 12 illustrates a non-limiting example of a process for identifying at least one supply chain component associated with a fiber sample, as seen and described above with respect to disclosed embodiments.

Figure 13:
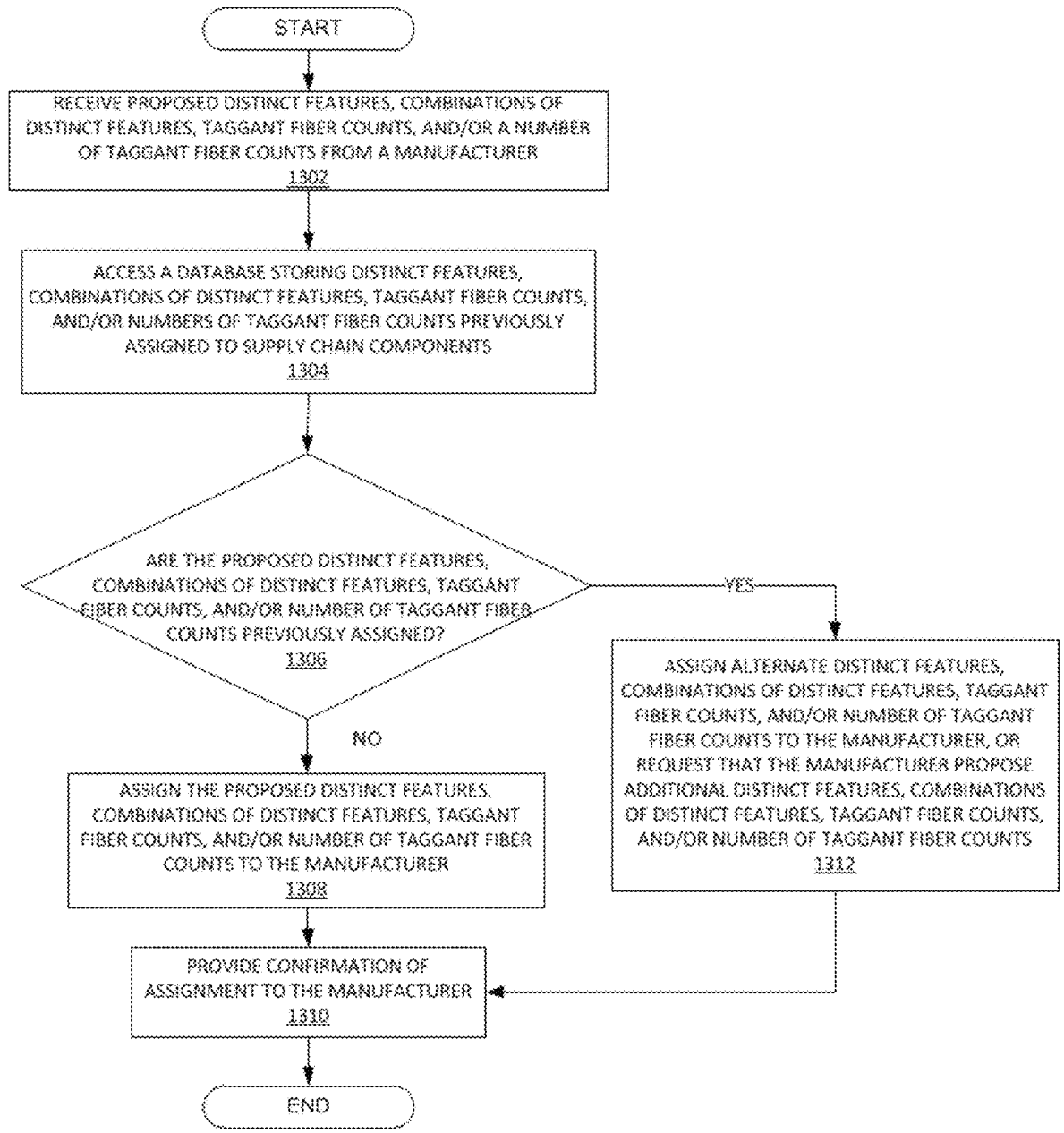
FIG. 13 illustrates a non-limiting example of a process for assigning, to supply chain components, combinations of distinct features and taggant fiber counts that uniquely represent the supply chain components.

FIG. 13 illustrates a non-limiting example of a process for assigning, to supply chain components, combinations of distinct features and taggant fiber counts that uniquely represent the supply chain components, as seen and described above with respect to disclosed embodiments.

Other embodiments will be apparent to those skilled in the art from consideration of the specification and practice of the embodiments disclosed herein. It will be understood that variations and modifications can be effected within the spirit and scope of the disclosed embodiments. It is further intended that the specification and examples be considered as exemplary only, with a true scope and spirit of the disclosed embodiments being indicated by the following claims.

We claim:

1. A method of making an acetate tow band comprising cellulose acetate fibers, wherein the cellulose acetate fibers comprise identification fibers and standard fibers, wherein the method comprises:
    (a) co-producing the identification fibers and the standard fibers; and
    (b) combining the identification fibers and the standard fibers into the acetate tow band,
        wherein each of the identification fibers exhibits at least one distinct feature, wherein the distinct features comprise 1 to 10 taggant cross-section shapes and/or 1 to 10 taggant cross-section sizes, wherein the identification fibers consist of 1 to 20 groups of distinguishable identification fibers, each group of the distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of at least one supply chain component of the acetate tow band.

2. The method of claim 1, wherein the taggant cross section sizes range from 1 dpf to 30 dpf.

3. The method of claim 1, wherein a number of taggant fiber counts for each group of the distinguishable identification fibers ranges from 1 to 10.

4. The method of claim 1, wherein the identification fibers are produced using distinguishable spinneret holes, each group of the distinguishable spinneret holes being formed by spinneret holes having the same distinguishable spinneret hole geometry, wherein each group of the distinguishable identification fibers are produced using a corresponding group of the distinguishable spinneret holes.

5. The method of claim 4, wherein all of the distinguishable spinneret holes are contained in a single spinneret.

6. The method of claim 4, wherein a portion of the taggant cross-section shapes are produced using spinneret hole geometries selected from the group consisting of triangle, circle, rectangle, square, flattened round, trapezoid hexagon, pentagon, and D-shaped.

7. The method of claim 1, wherein a number of the taggant cross-section sizes ranges from 1 to 5, wherein a ratio of at least one of the taggant cross-section sizes to an average cross-section size of the standard fibers ranges from 10:1 to 1.1:1, and wherein the taggant cross-section size and the average cross-section size are determined based upon an effective diameter.

8. The method of claim 1, wherein a number of the taggant cross-section sizes ranges from 1 to 5, wherein a ratio of at least one of the taggant cross-section sizes to an average cross-section size of the standard fibers ranges from 1:10 to 1:1.1, and wherein the taggant cross-section size and the average cross-section size are determined based upon an effective diameter.

9. The method of claim 1, wherein the number of taggant cross-section shapes ranges from 1 to 5, the number of taggant cross-section sizes ranges from 1 to 4, and wherein a number of taggant fiber counts for each group of the distinguishable identification fibers ranges from 1 to 3.

10. The method of claim 1, wherein the identification fibers comprise reference fibers, wherein the reference fibers exhibit a reference cross-section size and a reference cross-section shape, wherein a ratio of each of the taggant cross-section sizes to the reference cross-section size ranges from 10:1 to 1:10, and wherein the reference cross-section size and the taggant cross-section sizes are determined based upon an effective diameter.

11. The method of claim 1, wherein the at least one supply chain component comprises at least one of a manufacturer of the acetate tow band, a manufacture site of the acetate tow band, a manufacturing line of the acetate tow band, a production run of the acetate tow band, a production date of the acetate tow band, a package of the acetate tow band, a warehouse of the acetate tow band, a customer of the acetate tow band, and/or a ship-to location of the acetate tow band.

12. The method of claim 11, wherein the at least one supply chain component comprises the manufacturer of the acetate tow band and the customer of the acetate tow band.

13. The fibers of claim 11, wherein the at least one supply chain component comprises, the manufacturer of the acetate tow band and the ship-to location of the acetate tow band.

14. A method of making an acetate tow band comprising cellulose acetate fibers, wherein the cellulose acetate fibers comprise identification fibers and standard fibers, wherein the method comprises:
    (a) co-producing the identification fibers and the standard fibers; and
    (b) combining the identification fibers and the standard fibers into the acetate tow band,
        wherein each of the identification fibers exhibits at least one distinct feature, wherein the distinct features comprise 1 to 10 taggant cross-section shapes and/or 1 to 10 taggant cross-section sizes, wherein the identification fibers consist of 1 to 20 groups of distinguishable identification fibers, each group of the distinguishable identification fibers being formed by the identification fibers having the same taggant cross-section shape, the same taggant cross-section size, or the same combination of taggant cross-section shape and taggant cross-section size, wherein a number of the identification fibers in each group of the distinguishable identification fibers is defined as a fiber count, wherein at least one of the fiber counts corresponds to a taggant fiber count, and wherein (i) the distinct features in each group of distinguishable identification fibers and (ii) the one or more taggant fiber counts are representative of a manufacturer of the acetate tow band and a customer of the acetate tow band or the manufacturer of the acetate tow band and a ship-to location of the acetate tow band.

15. The method of claim 14 wherein the distinct features comprise 1 to 10 taggant cross-section shapes and 1 to 5 taggant cross-section sized.

16. The method of claim 14, wherein the identification fibers are produced using distinguishable spinneret holes, each group of the distinguishable spinneret holes being formed by spinneret holes having the same distinguishable spinneret hole geometry, wherein each group of the distinguishable identification fibers are produced using a corresponding group of the distinguishable spinneret holes.

17. The method of claim 16, wherein all of the distinguishable spinneret holes are contained in a single spinneret.

18. The method of claim 16, wherein a portion of the taggant cross-section shapes are produced using spinneret hole geometries selected from the group consisting of triangle, circle, rectangle, square, flattened round, trapezoid hexagon, pentagon, and D-shaped.

\* \* \* \* \*